US008320836B2

(12) United States Patent
Harada et al.

(10) Patent No.: US 8,320,836 B2
(45) Date of Patent: Nov. 27, 2012

(54) RADIO COMMUNICATIONS SYSTEM AND RADIO COMMUNICATIONS METHOD

(75) Inventors: Hiroki Harada, Yokosuka (JP); Koji Maeda, Yokohama (JP); Tomoyuki Ohya, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 255 days.

(21) Appl. No.: 12/724,874

(22) Filed: Mar. 16, 2010

(65) Prior Publication Data

US 2010/0248638 A1 Sep. 30, 2010

(30) Foreign Application Priority Data

Mar. 27, 2009 (JP) ................................. 2009-080178

(51) Int. Cl.
H04B 17/00 (2006.01)
(52) U.S. Cl. ..................... 455/67.11; 455/509; 455/423; 455/115.1
(58) Field of Classification Search .................. 455/509, 455/67.11, 63.3, 3.02, 3.05, 450, 452.1, 420, 455/458, 115.1, 423, 456.1, 456.2; 370/208, 370/312, 343, 344, 430, 329; 275/260
See application file for complete search history.

(56) References Cited

U.S. PATENT DOCUMENTS

| 7,961,699 | B2 * | 6/2011 | Morimoto et al. ............ 370/344 |
| 7,974,179 | B2 * | 7/2011 | Morimoto et al. ............ 370/208 |
| 2001/0056565 | A1 * | 12/2001 | Li ................................. 714/786 |
| 2005/0013392 | A1 * | 1/2005 | Mizugaki et al. ............ 375/343 |
| 2005/0130669 | A1 * | 6/2005 | Mizugaki et al. .......... 455/456.1 |
| 2006/0209746 | A1 | 9/2006 | Asai et al. |
| 2008/0026704 | A1 | 1/2008 | Maeda et al. |
| 2008/0268859 | A1 | 10/2008 | Lee et al. |
| 2008/0268892 | A1 | 10/2008 | Hamdi et al. |
| 2009/0196165 | A1 * | 8/2009 | Morimoto et al. ............ 370/208 |
| 2010/0080181 | A1 * | 4/2010 | Yamada et al. ................ 370/329 |
| 2010/0113059 | A1 | 5/2010 | Morimoto et al. |
| 2010/0234014 | A1 * | 9/2010 | Virkki et al. .................. 455/423 |
| 2010/0310025 | A1 * | 12/2010 | Morimoto et al. ............ 375/346 |

(Continued)

FOREIGN PATENT DOCUMENTS

JP 11-186953 7/1999

(Continued)

OTHER PUBLICATIONS

TSG-RAN WG1 Meeting #44, R1-060670, Denver, USA, "Interference Mitigation by Partial Frequency Reuse", Feb. 13-17, 2006, pp. 1-5.

(Continued)

Primary Examiner — Tan Trinh
(74) Attorney, Agent, or Firm — Oblon, Spivak, McClelland, Maier & Neustadt, L.L.P.

(57) ABSTRACT

A radio communications system including a network connecting radio station and a counterparty radio station is disclosed, the network connecting radio station being a radio station connected to a network and the counterparty radio station being in radio communications with the network connecting radio station. In the system, the network connecting radio station includes an information obtaining unit; an information reporting unit; and a radio resource parameter determining unit. The counterparty radio station includes a waveform information extracting unit which calculates a measured value, for each of one or more waveform feature amounts reported from the network connecting radio station; and a received status reporting unit which reports, to the network connecting radio station, the measured value of the waveform feature amount calculated at the waveform information extracting unit.

44 Claims, 33 Drawing Sheets

U.S. PATENT DOCUMENTS

2011/0167264 A1* 7/2011 Takahashi et al. ............ 713/168

FOREIGN PATENT DOCUMENTS

| JP | 2006-222665 | 8/2006 |
|---|---|---|
| JP | 2007-258844 | 10/2007 |
| JP | 2008-61214 | 3/2008 |
| JP | 2008-278273 | 11/2008 |
| JP | 2009-060601 | 3/2009 |
| WO | WO 2007/108449 A1 | 9/2007 |

OTHER PUBLICATIONS

ANSI/IEEE Std 802.11, "Wireless LAN Medium Access Control (MAC) and Physical Layer (PHY) Specifications", Local and Metropolitan Area Networks: Wireless LAN, Aug. 20, 1999, pp. 70-97.

Hiroyoshi Matsuda, et al., "Voice Activity Detection with 3rd Order Cumulant", The Institute of Electronics, Information and Communication Engineers, IEICE (Japan), Technical Report of IEICE, vol. 106, No. 263 (Sep. 19, 2006), pp. 1-6, with English Abstract and English Translation.

IEEE 802.2 Working Group of the LAN MAN Standards Committee, "IEEE P802.22™/D0.2, Draft Standard for Wireless Regional Area Networks Part 22: Cognitive Wireless RAN Medium Access Control (MAC) and Physical Layer (PHY) specifications: Policies and procedures for operation in the TV Bands", The Institute of Electrical and Electronics Engineers, Nov. 2006, pp. 1-306 with 6 additional pages.

Extended European Search Report issued Apr. 5, 2012, in European Patent Application No. 10250494.1.

IEEE 802.22 Working Group of the Lan/man Standards Committee: "IEEE P802.22™/DRAFTv1.1 Draft Standard for Wireless Regional Area Networks Part 22: Cognitive Wireless RAN Medium Access Control (MAC) and Physical Layer (PHY) specifications: Policies and procedures for operation in the TV Bands—Excerpt", vol. IEEE P802.22, No. DRAFTV1.1, XP-55022478, Jul. 31, 2008, pp. 1-374.

Office Action (with English translation) mailed on Aug. 21, 2012, in counterpart Japanese Patent Appln No. 2009-080178 (4 pages).

* cited by examiner

FIG.5

| RADIO COMMUNICATIONS CONDITION INFORMATION A | | | |
|---|---|---|---|
| TIME | FREQUENCY BANDWIDTH | FEATURE AMOUNT | STATION USED |
| T1~T2 | f1~f2 | c1 | a |
| T1~T3 | f3~f4 | c2 | b |
| T2~T3 | f1~f3 | c3 | c |
| ......... | ......... | ......... | ......... |

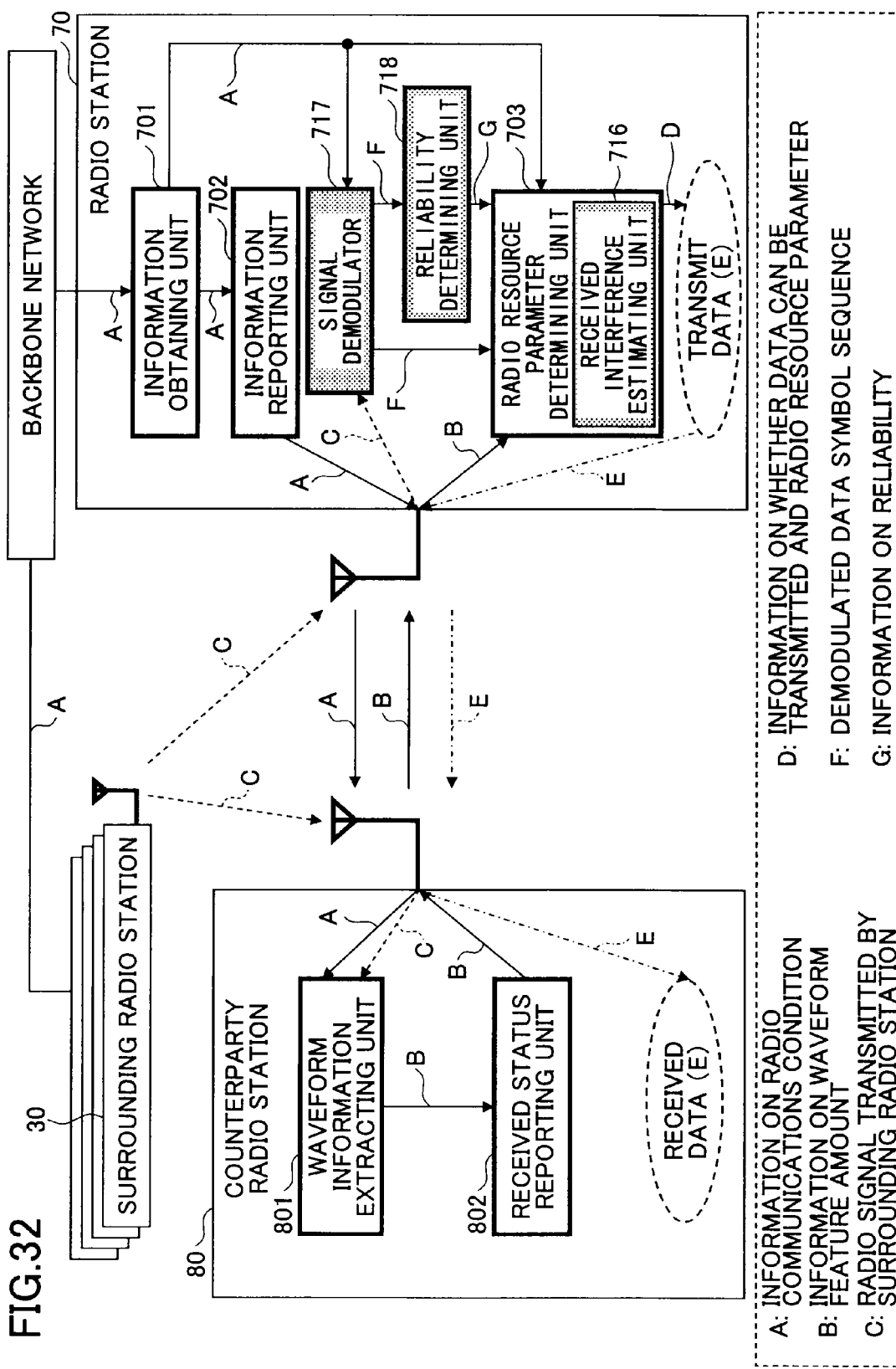

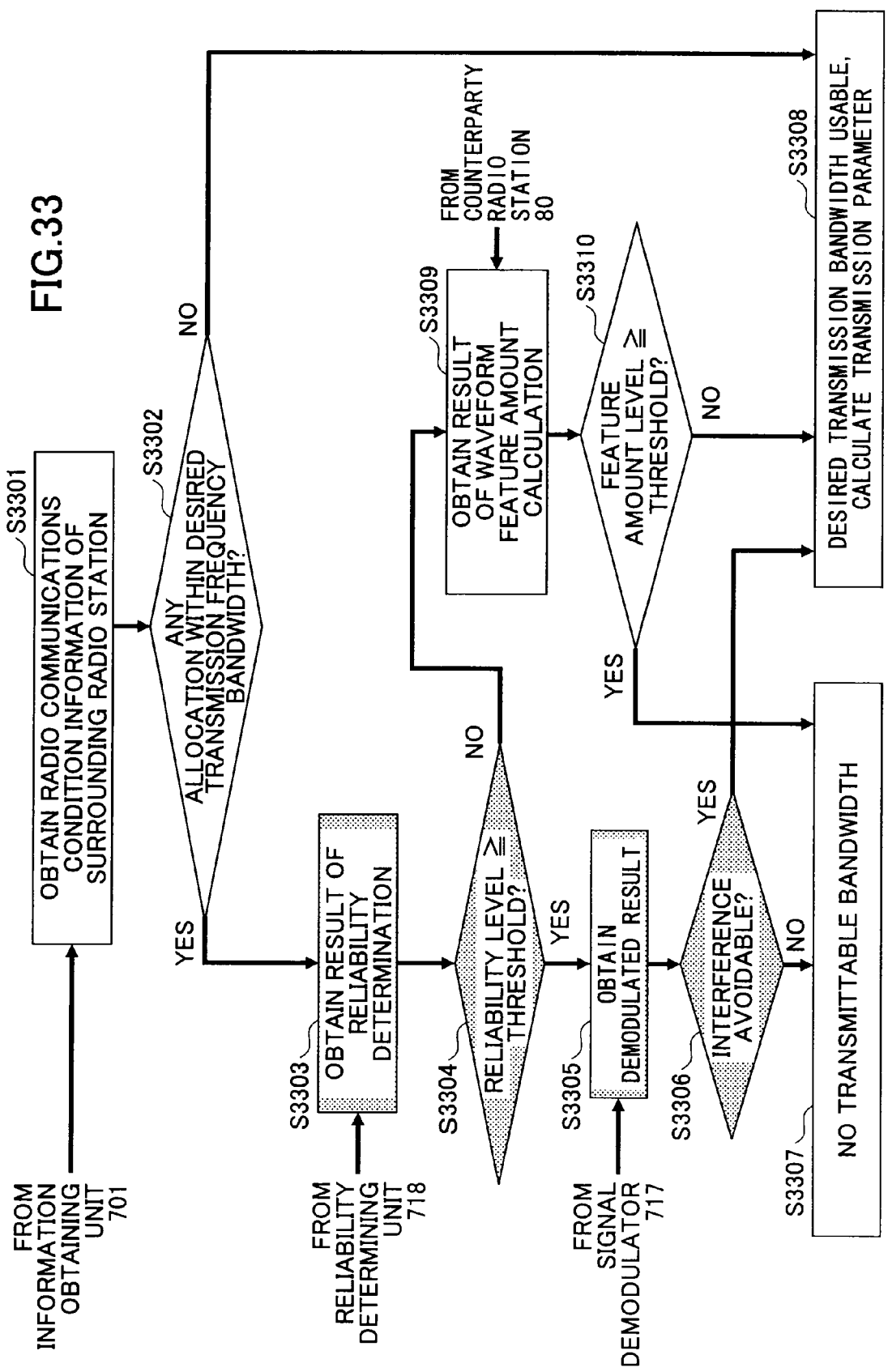

RADIO COMMUNICATIONS SYSTEM AND RADIO COMMUNICATIONS METHOD

BACKGROUND OF THE INVENTION

1. Field of the Invention

The present invention relates to radio communications systems and radio communications methods in an environment in which multiple radio stations share the same frequency.

2. Description of the Related Art

In current radio communications, a dedicated frequency band is often allocated for each of radio communications systems in order to avoid mutual interference. However, in recent years, methods of utilizing the same frequency band in multiple communications systems are being considered in order to effectively utilize limited frequencies in radio communications. In order to share the same frequency band among multiple radio stations or multiple radio communications systems, it is necessary to mutually recognize a frequency usage condition and to perform transmission control so as not to cause interference. Transmission control schemes are being considered which may roughly be categorized into two types: distributed control, in which individual radio stations observe the frequency usage condition in the surroundings and in which the individual radio stations determine whether a transmission can be conducted; and centralized control, in which a control station which centrally manages the frequency usage condition of multiple radio stations determines, for each of the radio stations, whether the transmission can be conducted.

Conventionally, there has been a technique which efficiently reuses the same frequency among different cells. In a normal cellular system, a technique called an inter-cell frequency reuse is being used. The inter-cell frequency reuse utilizes a different frequency between neighboring cells to avoid inter-cell interference. A technique called interference coordination, which is being proposed in "3GPP.R1-060670" (Non-patent document 1) provides a frequency to be allocated to a radio station located at a cell edge and sets the cell-edge frequency to differ between neighboring cells to avoid inter-cell interference. Moreover, JP2007-258844A (Non-patent document 1) proposes a technique in which radio stations are grouped based on a report of CQI (channel quality indicator) information from terminals and a resource block of different transmission power is allocated to each of the respective groups to reduce effect of interference received by the cell-edge base station. Patent document 1 also proposes a technique in which a base station measures an interference power level with a neighboring cell and varies, between cells with large interference, power levels allocated to the same resource block to prevent an occurrence of interference caused by using the same resource block near a cell border.

JP2008-278273A (Patent document 2) discloses a technique in which resource allocation information is shared among radio stations within the same system, and an interference region resource in which interference may occur is not allocated. These techniques are centralized control-type radio communications system techniques in which information on frequency utilization conditions is shared among surrounding radio stations in advance and a resource to be used by each of the radio stations is determined such that a control station which collected the information does not cause interference.

As a technique of sharing the same frequency in a distributed control-type radio communications system, a carrier sense multiple access scheme with a collision avoidance function, called a CSMA/CA (carrier sense multiple access with collision avoidance) scheme is known. This is described in Non-patent document 2, for example. The CSMA/CA scheme, which is used in this type of wireless LAN system, measure a received level, before transmitting data, to determine whether the data can be transmitted. Using the CSMA/CA scheme as an access scheme in the same frequency bandwidth sharing environment by multiple different radio communications systems makes it possible for each of the radio stations to conduct transmission only when a signal is not detected to avoid interference, since each of the radio stations determines whether the transmission is possible based on information on a radio communications environment that is collected by the corresponding radio station on its own.

JA2006-222665A (Patent document 3) discloses a technique in which a feature amount of a periodic steadiness of a signal is calculated to detect the presence of the signal and each radio station conducts transmission only when the signal is not detected by the own station to avoid interference. Using this technique makes it possible to detect the presence of a signal used in the surroundings even when the same frequency band is shared among different radio communications systems and makes it possible for the radio station to conduct transmission when it is determined that interference would not occur.

Patent document 1: JP2007-258844A
Patent document 2: JP2008-278273A
Patent document 3: JP2006-222665A
Patent document 4: JP2008-061214A
Non-patent document 1: 3GPP.R1-060670
Non-patent document 2: IEEE802.11 Part 11 Wireless LAN Medium Access Control (MAC) and Physical Layer (PHY) specifications, ANSI/IEEE Std 802.11, 1999 Edition
Non-patent document 3: Matsuda, Takiguchi, Ariki, "Voice activity detection with 3rd order cumulant voice feature", IEICE (Japan), technical report of IEICE, vol. 106, No. 263 (20060919), vol. 37-42
Non-patent document 4: IEEE 802.22 Working Group of the LAN MAN Standards Committee, "IEEE P802.22/D0.1 Draft Standard for Wireless Regional Area Networks Part 22: Cognitive Wireless RAN Medium Access Control (MAC) and Physical Layer (PHY) specifications: Policies and procedures for operation in the TV bands", The Institute of Electrical and Electronics Engineers, May 2006.

When the same frequency band is shared among multiple different radio communications systems, it is not necessarily the case that information may be exchanged among the radio stations. Therefore, controlling a radio resource based on centralized control leads to a concern for a possible significant degradation in characteristics. More specifically, the related-art technique in Non-patent document 1 discloses distinguishing a user using a spread code and sharing the same frequency. However, it is not necessarily the case that information such as the spread code, etc., may be utilized among the radio stations utilizing the different radio communications systems. Moreover, the technique to suppress interference through interference coordination on cell-edge radio stations fails to make it possible to perform a fine cell design in an anticipated frequency shared environment, possibly leading to an occurrence of a significant degradation in characteristics in a geographical region due to the interference. Moreover, the related-art technique in Non-patent document 1 discloses a base station grouping mobile stations based on a report of CQI information from the mobile stations, and allocating a resource for each of the groups. However, sharing of the CQI information using a radio signal is not possible among radio stations utilizing different radio communications systems, leading to a possibility that such grouping and a proper resource allocation cannot be performed. Similarly, also the technique in Patent document 2 does not provide for sharing resource allocation information in an anticipated environment, leading to a possibility that a resource which makes it possible for the interference to be avoided cannot be specified and the characteristic may be significantly degraded. In this way, with a centralized control-type radio communications system, there is a problem that complexity is high in the sense that many sets of information are required in a condition such that information sharing among systems is difficult (e.g., the same frequency band sharing environment among the different radio communications systems).

On the other hand, a distributed control-type radio communications system which uses the related-art CSMA/CA scheme and the technique in Patent document 3 requires, in a situation in which information is not shared sufficiently, that whether transmission by an own station can be conducted be autonomously determined so as not to cause interference with other stations. Consequently, there is a problem that, even when there is a communication being actually conducted in the surroundings, it may be determined by a radio station on its own, as a result of monitoring the radio communications environment of the other radio stations, that a radio resource actually being used in the above-mentioned communication is available, and the radio resource is used by the own radio station, frequently causing interference. Conversely, a problem may arise such that, even when a radio resource is not being used, it is erroneously determined that the radio resource is being used and the radio station refrains from conducting transmission, causing a decrease in frequency utilization efficiency. In this way, it is considered that, compared with the centralized control-type radio communications system, the distributed control-type radio communications system makes it possible to avoid interference even in a situation in which information sharing is less sufficient, has less complex processing, but has inferior interference avoidance effect and frequency utilization efficiency.

SUMMARY OF THE INVENTION

The present invention is aimed at compensating for the disadvantages of the centralized control-type and distributed-control type radio communications systems. The object of the present invention is to provide a radio communications system and a radio communications method that suppress interference with not only radio stations which utilize the same radio communications system, but also surrounding radio stations, and effectively utilize frequency resources.

(1) In one embodiment of the present invention, a radio communications system including a network connecting radio station and a counterparty radio station is used, the network connecting radio station being a radio station connected to a network, the counterparty radio station being in radio communications with the network connecting radio station. The network connecting radio station includes an information obtaining unit which obtains information indicating a radio communications condition of one or more radio stations surrounding the network connecting radio station from the one or more surrounding radio stations via the network, the information indicating the radio communications condition of the radio station including information on a frequency used by the radio station and information on a waveform feature amount which exhibits a statistical characteristic of a signal waveform transmitted by the radio station;

an information reporting unit which reports, to the counterparty radio station, all or some of information indicating a radio communications condition obtained from a surrounding radio station; and a radio resource parameter determining unit which determines, based on the information indicating the radio communications condition of the surrounding radio station and information on a measured value of the waveform feature amount that is reported from the counterparty radio station, whether communications can be conducted between the network connecting radio station and the counterparty radio station, and a radio resource parameter to be used when the communications are permitted.

The counterparty radio station includes
a waveform information extracting unit which calculates, for each of one or more waveform feature amounts reported from the network connecting radio station, the measured value of the waveform feature amount of a signal received from another radio station; and a received status reporting unit which reports, to the network connecting radio station, a measured value of the waveform feature amount calculated at the waveform information extracting unit.

(2) In one embodiment of the present invention, a radio communications system including a network connecting radio station and a counterparty radio station is used, the network connecting radio station being a radio station connected to a network and the counterparty radio station being in radio communications with the network connecting radio station. The network connecting radio station includes an information obtaining unit which obtains information indicating a radio communications condition of one or more radio stations surrounding the network connecting radio station from the one or more surrounding radio stations via the network, the information indicating the radio communications condition of the radio station including information on a frequency used by the radio station and information on a waveform feature amount which exhibits a statistical characteristic of a signal waveform transmitted by the radio station;

an information reporting unit which reports, to the counterparty radio station, all or some of information indicating a radio communications condition obtained from a surrounding radio station; and a radio resource parameter determining unit which determines, based on the information indicating the radio communications condition of the surrounding radio station, information on a measured value of the waveform feature amount that is reported from the counterparty radio station, and information on reliability, whether communications can be conducted between the network connecting radio station and the counterparty radio station, and a radio resource parameter to be used when the communications are permitted.

The counterparty radio station includes
a waveform information extracting unit which calculates, for each of one or more waveform feature amounts reported from the network connecting radio station, the measured value of the waveform feature amount of a signal received from another radio station;

a reliability determining unit which demodulates a signal received from the surrounding radio station and determine the reliability of the demodulating; and a received status reporting unit which reports, to the network connecting radio station, information on the measured value of the waveform feature amount calculated at the waveform information extracting unit and information indicating the reliability determined at the reliability determining unit.

(3) In one embodiment of the present invention, a radio communications system including a network connecting radio station and a counterparty radio station is used, the network connecting radio station being a radio station connected to a network and the counterparty radio station being in radio communications with the network connecting radio station.

The network connecting radio station includes an information obtaining unit which obtains, from one or more surrounding radio stations via the network, information indicating a radio communications condition of a radio station surrounding the network connecting radio station, the information indicating a radio communications condition of the radio station including information on a frequency used by the radio station and information on a waveform feature amount which exhibits a statistical characteristic of a signal waveform transmitted by the radio station;

an information reporting unit which reports, to the counterparty radio station, all or some of information indicating the radio communications condition obtained from a surrounding radio station, and a reliability determining unit which demodulates the signal received from the surrounding radio station and determines the reliability of the demodulated result;

a radio resource parameter determining unit which determines, based on the information indicating the radio communications condition of the surrounding radio station, information on a measured value of the waveform feature amount that is reported from the counterparty radio station, and information on reliability, a radio resource parameter to be used when communications are permitted, and whether the communication can be conducted between the network connecting radio station and the counterparty radio station.

The counterparty radio station includes a waveform information extracting unit which calculates, for each of one or more waveform feature amounts reported from the network connecting radio station, the measured value of the waveform feature amount of a signal received from another radio station; and a received status reporting unit which reports, to the network connecting radio station, information indicating a measured value of a waveform feature amount that is calculated at the waveform information extracting unit, and information on a reliability determined at the reliability determining unit.

The present invention makes it possible for a radio station and a counterparty radio station that are connected to a network to effectively utilize a radio resource and improve frequency utilization efficiency while suppressing interference with other surrounding radio stations regardless of a radio communications scheme used by the other surrounding radio stations.

Other objects and further features of the present invention will be apparent from the following detailed description when read in conjunction with the accompanying drawings.

BRIEF DESCRIPTION OF THE DRAWINGS

FIG. 5 is a diagram illustrating an example of radio communications condition information A according to the first embodiment of the present invention;

FIG. 32 is a conceptual diagram illustrating the operating principles of the radio communications system according to the third embodiment of the present invention; and FIG. 33 is a flowchart illustrating the control procedure at the radio resource parameter determining unit according to the third embodiment of the present invention.

DETAILED DESCRIPTION OF PREFERRED EMBODIMENTS

Figure 1:
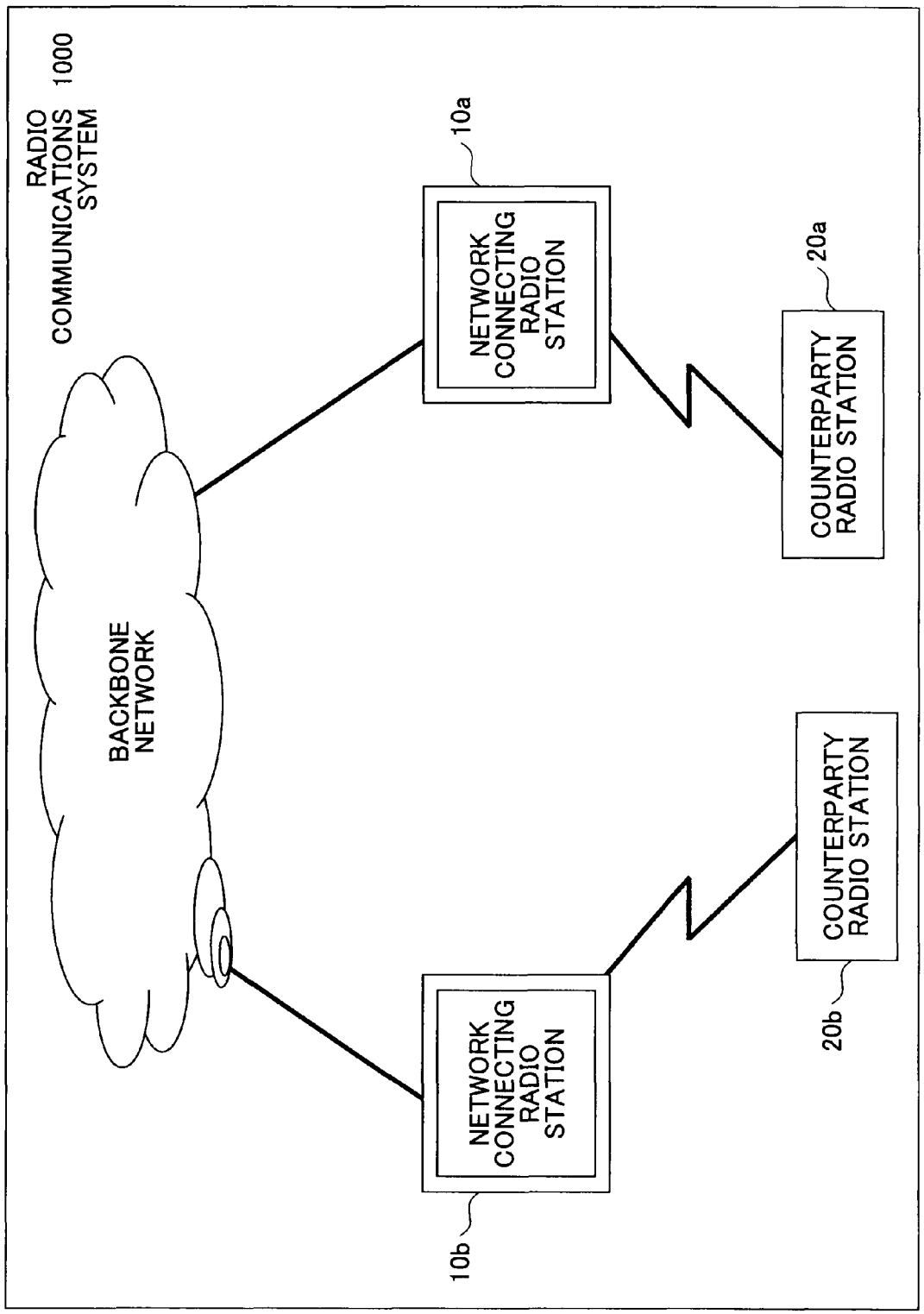
FIG. 1 is a conceptual diagram illustrating a radio communications system according to a first embodiment of the present invention.

In the following, best modes for carrying out the invention are described based on the following embodiments with reference to the drawings.

Throughout the drawings for explaining the embodiments, same letters are used for those elements having the same functions, so that repetitive explanations are omitted.

(1) In a radio communications system according to one embodiment of the present invention, a radio station connecting to a backbone network (below called "a network connecting radio station") includes an information obtaining unit which obtains information on a radio communications condition used by surrounding radio stations via the backbone network, the information including at least frequency bandwidth usage condition information and waveform feature amount information of signals allocated to each frequency bandwidth; and an information reporting unit which reports, to a counterparty radio station which is a communications counterparty of the network connecting radio station, some or all of information obtained at the information obtaining unit, wherein the counterparty radio station includes a waveform information extracting unit which receives a radio signal transmitted by the surrounding radio station and calculates a waveform feature amount of the received signal based on the feature amount information obtained at the information obtaining unit; and a received status reporting unit which reports, to the network connecting radio station, a waveform feature amount obtained at the waveform information extracting unit, wherein the network connecting radio station includes a radio resource parameter determining unit which determines a radio resource parameter used in communicating between the network connecting radio station and the counterparty radio station and whether data transmission can be conducted, based on the frequency bandwidth usage condition information, the feature amount information, and the waveform feature amount reported via the feature amount reporting unit.

(2) In a radio communications system according to one embodiment of the present invention, a network connecting radio station includes an information obtaining unit which obtains information on a radio communications condition used by surrounding radio stations via a backbone network, the information including at least frequency bandwidth usage condition information and waveform feature amount information of a signal allocated to each frequency bandwidth; and an information reporting unit which reports, to a counterparty radio station which is a communications counterparty of the network connecting radio station, some or all of information obtained at the information obtaining unit, wherein the counterparty radio station includes a waveform information extracting unit which receives a radio signal transmitted by the surrounding radio station and calculates a waveform feature amount of the received signal based on the feature amount information obtained at the information obtaining unit;

a signal demodulator which receives a radio signal transmitted by the surrounding radio station, demodulates the received signal, and outputs a demodulated data symbol sequence;

a reliability determining unit which determines reliability of the demodulated data symbol sequence; and a received status reporting unit which reports, to the network connecting radio station, some or all of information obtained from the demodulated data symbol sequence, the information on the reliability and the waveform feature amount, wherein the network connecting radio station includes a radio resource parameter determining unit which determines a radio resource parameter used in communicating between the network connecting radio station and the counterparty radio station and whether data transmission can be conducted, based on the frequency bandwidth usage condition information, the feature amount information, the waveform feature amount reported via the feature amount reporting unit, the information on the reliability, and the demodulated data symbol sequence.

(3) The network connecting radio station may further include a second signal demodulator which receives a radio signal transmitted by the surrounding radio station, demodulates the received signal, and outputs a demodulated data symbol sequence; and a second reliability determining unit which determines a reliability of the demodulated data symbol sequence, and, in the radio resource parameter determining unit, the information obtained from the demodulated data symbol sequence and information on the reliability used in determining whether data transmission can be conducted, and the radio resource parameter may be arranged to be information on both information obtained from the demodulated data symbol sequence and information on reliability that are calculated in the reliability determining unit, and the signal demodulator of the counterparty radio station of the network connecting radio station and information obtained from the demodulated data symbol sequence and information on reliability that are calculated in the second reliability determining unit and the second signal demodulator.

This makes it possible to effectively suppress interference with the surrounding radio station.

(4) In a radio communications system according to one embodiment of the present invention, a network connecting radio station includes an information obtaining unit which obtains information on a radio communications condition used by surrounding radio stations via a backbone network, the information including at least frequency bandwidth usage condition information and waveform feature amount information of signals allocated to each of the frequency bandwidths; and an information reporting unit which reports, to a counterparty radio station which is a communications counterparty of the network connecting radio station, some or all of information obtained at the information obtaining unit, wherein the counterparty radio station includes a waveform information extracting unit which receives a radio signal transmitted by the surrounding radio station and calculates a waveform feature amount of the received signal based on the feature amount information obtained at the information obtaining unit; and a received status reporting unit which reports, to the network connecting radio station, a waveform feature amount obtained at the waveform information extracting unit, wherein the network connecting radio station includes a signal demodulator which receives a radio signal transmitted by the surrounding radio station, demodulates the received signal, and outputs a demodulated data symbol sequence;

a reliability determining unit which determines reliability of the demodulated data symbol sequence; and a radio resource parameter determining unit which determines a radio resource parameter used in communicating between the network connecting radio station and the counterparty radio station and whether data transmission can be conducted, based on the frequency bandwidth usage condition information, the feature amount information, information on the waveform feature amount reported via the feature amount reporting unit, the information on the reliability, and the demodulated data symbol sequence.

(5) The network connecting radio station may further include a second waveform information extracting unit which receives a radio signal transmitted by the surrounding radio station and calculates a waveform feature amount of the received signal based on the feature amount information obtained at the information obtaining unit; and, in the radio resource parameter determining unit, information on the waveform feature amount used in determining a radio resource parameter and whether data transmission can be conducted may be arranged to be information on both waveform feature calculated in the waveform information extracting unit of the counterparty radio station of the network connecting radio station and the waveform feature amount calculated at the second waveform information extracting unit.

This makes it possible to further effectively suppress interference caused on the surrounding radio station.

This radio communications system, which has a network connecting radio station connected to a backbone network can obtain information on a radio communications condition used by the surrounding radio station to make it possible to detect the presence and a magnitude of a signal of a radio station using a different radio communication system by calculating a waveform feature amount using obtained information.

(6) In the radio resource parameter determining unit, transmission is not permitted when a waveform feature amount obtained from the waveform information extracting unit exceeds a predetermined threshold to make it possible to suppress interference with the other surrounding radio stations.

(7) The radio resource parameter determining unit, which includes a table for quality estimating that collates a size of a peak of a waveform feature amount and a communications path quality, may estimate the communications path quality with the other surrounding radio station based on a size of a peak of a waveform feature amount obtained at the waveform information extracting unit, and determine, from the estimating, a radio resource parameter used in communications between the network connecting radio station and the counterparty radio station and whether data transmission can be conducted.

A radio resource can be effectively utilized while suppressing interference with the surrounding radio station.

(8) When the reliability of the demodulated data symbol sequence is not more than a threshold, the radio resource parameter determining unit may discard a demodulated data symbol sequence and determine a radio resource parameter used in communications between the network connecting radio station and the counterparty radio station and whether data transmission can be conducted, based on only the frequency band usage condition information, the feature amount information and the waveform feature amount calculated at the waveform information extracting unit.

Even in a poor communications environment in which demodulating is not possible, a signal of a surrounding station can be detected and a radio resource can be effectively utilized while suppressing received interference.

(9) The radio resource parameter determining unit, which has a received interference estimating unit which estimates an interference amount caused with the surrounding radio station based on information obtained from the demodulated data symbol sequence, determines a radio resource parameter used in communications between the network connecting radio station and the counterparty radio station and whether data transmission can be conducted, based on an estimation of interference amount caused with the surrounding radio station.

When the surrounding radio station signal may be demodulated, this makes it possible to preferentially utilize information obtained from such data and effectively utilize a radio resource while suppressing interference caused with the surrounding radio station.

(10) The network connecting radio station and the counterparty radio station may further include a band-pass filter which passes only a specific bandwidth component of an input signal and may block the other components, receives a signal transmitted by the surrounding radio station, and may arrange to pass, as a received signal, a signal which is band-limited based on the usage frequency bandwidth information obtained at the information obtaining unit for the received signal.

This is preferable from a viewpoint of performing a more accurate signal detection.

(11) Setting, as a pass band, a frequency band allocated to a signal determined to be using some or all of desired transmission bandwidths in communications between the network connecting radio station and the counterparty radio station from the frequency bandwidth usage condition information obtained at the information obtaining unit, the band-pass filter may receive a signal transmitted by the surrounding radio station and bandwidth-limit the received signal.

(12) The band-pass filter may receive a signal transmitted by the surrounding radio station and band-limit the received signal based on a desired transmission bandwidth in communications between the network connecting radio station and the counterparty radio station.

(13) The backbone network may include an information management server which manages information on a radio communications condition in a radio station and a counterparty radio station thereof that are connected to the backbone network, and the network connecting radio station may include an information uploading unit which saves, at the information management server, information on a radio communications condition between the network connecting radio station and the counterparty radio station.

This makes it possible to centrally manage, with the information management server, information on a radio communications condition.

(14) The information obtaining unit may obtain, from the information management server, information on a radio communications condition at the surrounding radio station.

This makes it possible to know whether a desired transmission bandwidth is utilized in communications between the network connecting radio station and the counterparty radio station, and what signal is being used, if utilized.

(15) The network connecting radio station may include a signal transmitter/receiver which transmits and receives a signal for information exchange, using a predetermined frequency bandwidth and the information reporting unit reports information via the signal transmitter/receiver.

(16) The counterparty radio station may include a signal transmitter/receiver which transmits and receives a signal for information exchange, using a predetermined frequency bandwidth, and the received status reporting unit may report information via the signal transmitter/receiver.

(17) The network connecting radio station may include a periodic steadiness feature amount adding unit which adds an arbitrary periodic steadiness feature to a transmit signal.

(18) The information reporting unit may report information using the periodic steadiness feature added to the transmit signal at the periodic steadiness feature amount adding unit.

(19) The network connecting radio station may include a broadcast signal transmitter which transmits, at a predetermined timing to the surrounding radio station, a broadcast signal for information on the network connecting radio station.

Information on the network connecting radio station and a periodic steadiness feature added to the transmit signal may be associated prior to communicating and the signal to which is added the periodic steadiness feature using the periodic steadiness feature amount adding unit may be arranged to be the broadcast signal to make it possible to report, to the counterparty radio station and the surrounding radio station, information on a radio resource used by the network radio station and information on received status information, making it easier to avoid interference.

(20) The counterparty radio station may include a periodic steadiness feature amount adding unit which adds, to a transmit signal, an arbitrary periodic steadiness feature.

(21) The received status reporting unit may report information using a periodic steadiness feature added to a transmit signal at the periodic steadiness feature amount adding unit.

(22) The counterparty radio station may include a broadcast signal transmitter which transmits, at a predetermined timing to the surrounding radio station, a broadcast signal for information on the counterparty radio station.

Information on the counterparty radio station and a periodic steadiness feature added to the transmit signal may be associated prior to communicating and the signal to which is added the periodic steadiness feature using the periodic steadiness feature amount adding unit may be arranged to be the broadcast signal to make it possible to report, to the network connecting radio station and the surrounding radio station, information on a radio resource used by the counterparty radio station and information on received status information, making it easier to mutually avoid interference.

Embodiments of the present invention are described from the following points of view:

1. First embodiment
1.1 System
1.2 Radio station and counterparty radio station
1.3 Waveform feature amount
1.4 Operational flow
1.5 Variations
1.5.1 First variation
1.5.2 Second variation
1.5.3 Third variation
1.5.4 Fourth variation
1.5.5 Fifth variation
1.5.6 Sixth variation
2. Second embodiment
2.1 Radio station and counterparty radio station
2.2 Operational principle
2.3 Operational flow
2.4 Variations
2.4.1 First variation
2.4.2 Second variation
3. Third embodiment
3.1 Radio station and counterparty radio station
3.2 Operational principle
3.3 Operational flow Embodiment 1

1.1 System

FIG. 1 illustrates a conceptual diagram representing a configuration of a radio communications system according to the present invention. The radio communications system 1000 includes a backbone network; a network connecting radio station 10 (herein shown as 10a and 10b), which is a radio station connected to the backbone network; and a counterparty radio station 20 (herein shown as 20a and 20b), which is a communications counterparty thereto. The network connecting radio station 10 may be connected, at all times, to the backbone network such as a base station in a cellular network, or may be connected as needed. In the case of being connected as needed, a radio station having a function of the above-described network connecting radio station, of radio stations located within the radio communications system, which is temporarily connected to the backbone network, functions as the above-described network connecting radio station. In the example illustrated, the radio station appears to correspond to a base station and the counterparty radio station appears to correspond to a user apparatus. However, this is not mandatory, so that the base station may be called the counterparty radio station and the user apparatus may be called the radio station. This is because whether the radio station is "a counterparty" is a relative concept.

The backbone network is a network which makes it possible for a radio station connecting thereto to exchange information which the radio station has on its own. Moreover, if the communications counterparty of the radio station is connected to the backbone network, even information A which the radio station not directly connected to the backbone network has may be exchanged via the communications counterparty radio station. Information to be exchanged is to be described below.

1.2 Radio Station and Counterparty Radio Station

Figure 2:
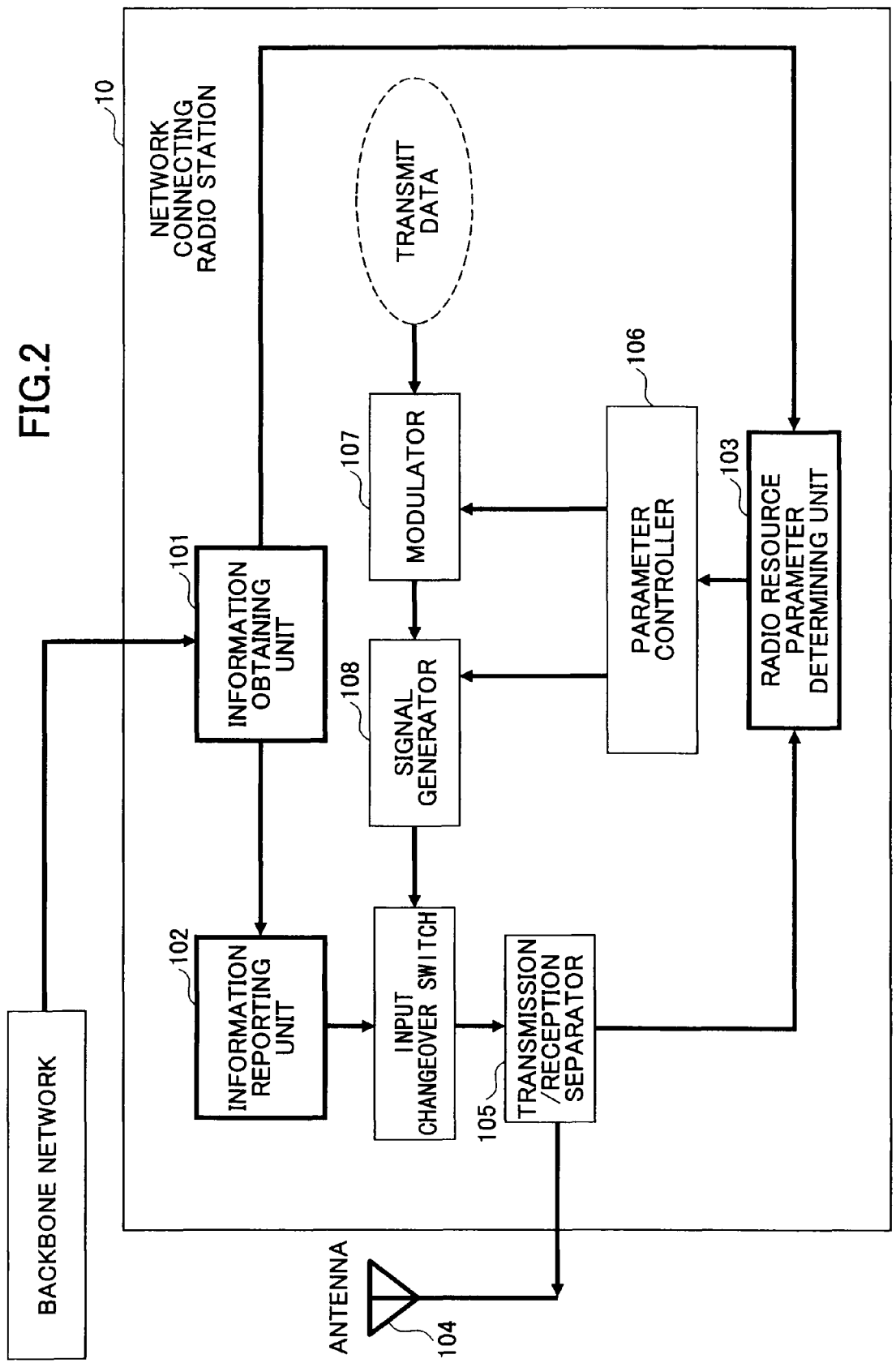
FIG. 2 is a block diagram illustrating a network connecting radio station according to the first embodiment of the present invention.

FIG. 2 is a block diagram of a network connecting radio station 10 in a radio communications system 1000 according to the present invention. The network connecting radio station 10 includes an information obtaining unit 101; an information reporting unit 102; a radio resource parameter determining unit 103; an antenna 104; a transmission and reception separator 105; a parameter controller 106; a modulator 107; and a signal generator 108.

Figure 3:
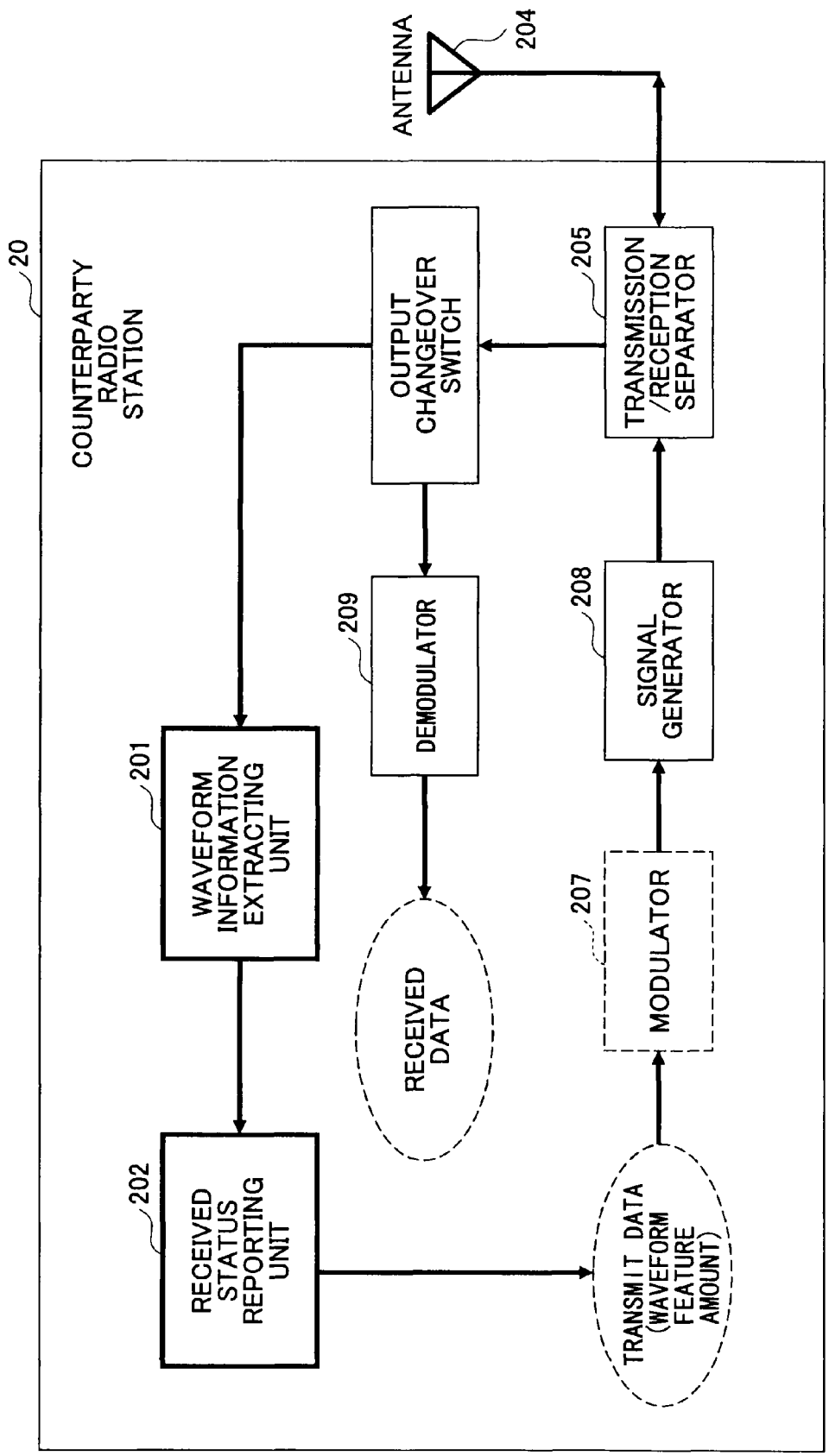
FIG. 3 is a block diagram illustrating a counterparty radio station according to the first embodiment of the present invention.

FIG. 3 is a block diagram of a counterparty radio station 20, which is a communications counterparty of the network connecting radio station 10 in the radio communications system 1000 according to the present invention. The counterparty radio station 20 includes a waveform information extracting unit 201; a received status reporting unit 202; an antenna 204; a transmission and reception separator 205; a modulator 207; a signal generator 208; and a demodulator 209.

Figure 4:
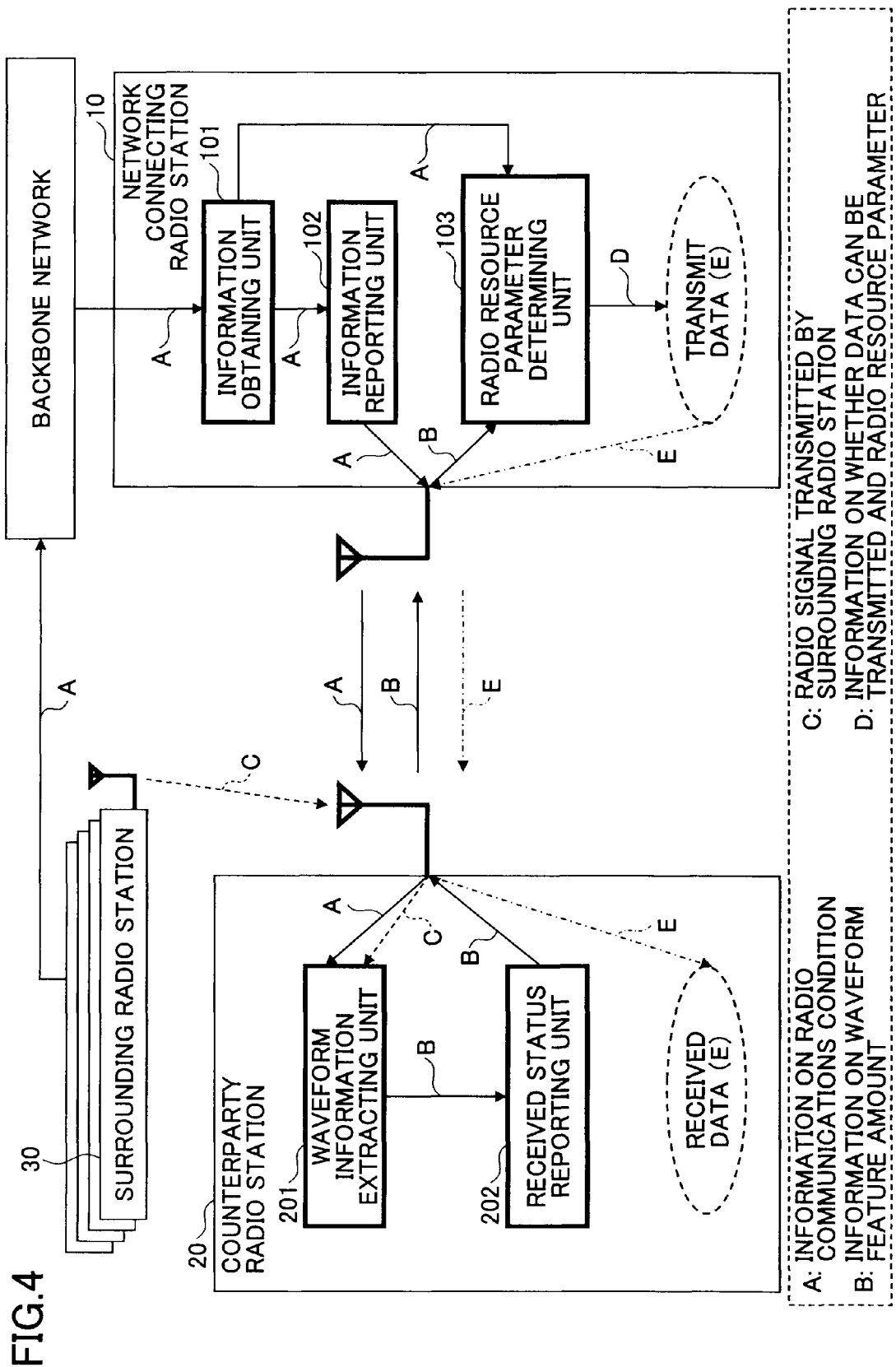
FIG. 4 is a conceptual diagram illustrating operating principles of the radio communication system of the present invention.

FIG. 4 illustrates operating principles of the radio communications system according to a first embodiment of the present invention.

The information obtaining unit 101 in FIG. 4 (and FIG. 2) is connected to the backbone network, which connection may be made using a wired transmission line or may be made using radio transmission. The information obtaining unit 101 obtains radio communications status information on other surrounding radio stations through the backbone network. More specifically, as shown in FIG. 4, the information obtaining unit 101 obtains radio communications condition information A via the backbone network from one or more surrounding radio stations 30. The radio communications condition information A represents at least information including information on a feature amount of a signal used by the radio station and information on a frequency usage condition of the radio station, and may also include, in addition, communications traffic information and received quality information at the other surrounding radio stations, and information on a feature amount of the signal used and information on a frequency usage condition of a radio station not connected to the backbone network in communication with the other surrounding radio stations.

FIG. 5 shows an example of radio communications condition information A. The frequency usage condition information, which is information on frequency bands at certain times, indicates a usage condition of the frequency bands in surrounding radio stations. The certain times include a time at which is performed a control process in the radio resource parameter determining unit 103 of the network connecting radio station 10 or a process of extracting a waveform feature amount in the waveform information extracting unit 201 of the counterparty radio station 20, and certain periods thereafter. The information on the feature amount of the signal indicates the waveform feature amount of a signal actually transmitted at a frequency being used that is indicated in the information on the frequency usage condition. The waveform feature amount, which is information indicating statistical characteristics of the signal waveform, may be expressed using the frequency correlation value, a variance value of the signal amplitude, and periodic steadiness obtained with a second-order periodic autocorrelation value. The waveform characteristic amount is described below. The frequency usage condition information and the signal feature amount information may be saved in a storage apparatus separately provided within the network connecting radio station 10 or the counterparty radio station 20 and previous information may be used.

The information reporting unit 102 in FIG. 4 (FIG. 2) reports a part or all of radio communications condition information obtained in the information obtaining unit 101, to the counterparty radio station 20, which is a communications counterparty of the network connecting radio station 10. The reporting may be carried out using a frequency band for communicating by the network connecting radio station 10 via wireless, may be carried out using a predetermined dedicated frequency band, or may be carried out by any other suitable method of transmitting/receiving a signal for exchanging information.

Based on the radio communications condition information, which is obtained from the information obtaining unit 101 and the waveform feature amount information B, which is reported from the counterparty radio station 20, the radio resource parameter determining unit 103 determines whether data can be transmitted as well as a radio resource parameter for use in communicating with the counterparty radio station 20. The determined result D is reported to the parameter controller 106. The radio resource parameters that are determined by the radio resource parameter determining unit 103 include a center frequency, a bandwidth, a transmission power level, a modulation scheme, an encoding scheme, etc. Specific methods of determining the parameters will be explained below.

The transmission/reception separator 105 switches between transmitting a transmit signal and receiving a receive signal through the antenna 104.

The parameter controller 106 in FIG. 2 controls modulation and other signal transformation of transmission data, so that a transmit signal E is transmitted using a radio parameter determined at the radio resource parameter determining unit 103.

Under control of the parameter controller 106, a process of modulation, etc., is performed for the transmit data E by the modulator 107 and the signal generator 108. Then, a transmit signal which has parameters (data modulation scheme, channel encoding scheme, transmission power, code, frequency bandwidth, etc.) determined by the radio resource parameter determining unit 103 is generated.

The generated transmit signal is transmitted from the antenna 104 via the transmission and reception separator 105 and delivered to the counterparty radio station 20, which is to be a communications counterparty of the network connecting radio station 10.

As illustrated in FIG. 4, a signal C transmitted by the other surrounding radio station is received at the counterparty radio station 20 and input to the waveform information extracting unit 201 via the transmission and reception separator 205 (FIG. 3). The waveform information extracting unit 201 extracts radio communications condition information A, which is reported from the network connecting radio station 10, takes out, from the radio communications condition information A, feature amount information of a signal used by the other surrounding radio stations 30, and calculates, based on the feature amount information, a waveform feature amount of the signal C. The calculated result, which is the waveform feature amount information B, is input into the received status reporting unit 202.

The received status reporting unit 202 reports, to the network connecting radio station 10, information B indicating a value of a waveform feature amount calculated. In a manner similar to the information reporting method in the information reporting unit 102 of the network connecting radio station 10, the reporting may be carried out wirelessly using a frequency bandwidth for communications by the counterparty radio station 20 or any other appropriate method for transmitting and/or receiving a signal for exchanging information.

The transmission/reception separator 205 in FIG. 3 switches between transmitting a transmit signal and receiving a receive signal through the antenna 204.

Transmit data (particularly, transmit data including information of a waveform feature amount) undergoes a process such as a modulation, etc., in the modulator 207 and the signal generator 208, generating a transmit signal having predetermined parameters (radio parameters such as data modulation scheme, channel encoding method, transmit power, code, frequency bandwidth).

The demodulator 209 demodulates a received signal. The demodulation and other received signal processes are performed depending on what modulation, etc., were performed on the transmit data E.

1.3 Waveform Feature Amount

Below the waveform feature amount is described in detail. The signal parameter is determined according to various parameters such as a central frequency, a frequency bandwidth, a transmission power level, a modulation scheme, a transmit information symbol, etc. Putting it the other way around, the signal waveform exhibits the parameter features as described above. For example, the above-mentioned Patent Document 3 discloses a technique for calculating a periodic autocorrelation value of a signal and detecting the presence of the signal from a feature amount of periodic steadiness the signal has. In this case, for a characteristic, depending on a modulation scheme, etc., used in the signal, a value pf a periodic autocorrelation value of a signal becomes large only when a parameter inherent to the calculation of the periodic autocorrelation value is used. Moreover, according to Patent document 4, different periodic steadiness feature amounts may be provided to signals using the same modulation scheme.

The control apparatus according to an embodiment of the present invention may utilize the techniques disclosed in Patent documents 3 and 4 to calculate a waveform feature amount included in the received signal. In other words, when a surrounding station is transmitting a signal having a certain periodic steadiness feature amount, the radio station or the counterparty station equipped with the control apparatus of the present invention obtains information on an inherent parameter used in calculating the periodic autocorrelation value, and uses the obtained inherent parameter to calculate the periodic autocorrelation value of the received signal. When the signal is included, the value of the periodic autocorrelation becomes a large value exceeding a threshold, while, when the signal is not included or when the signal is included at a negligibly small level, the value of the periodic autocorrelation does not exceed the threshold, at which the signal can be detected. Generally, a feature detection using signal waveform information such as a periodic steadiness feature amount is more accurately performed relative to a signal detection using received power used in the conventional CSMA/CA even when signal power is lower than noise power within a received signal. Moreover, it is considered that, when the surrounding radio station transmits a signal, a specific periodic steadiness feature amount can be emphasized to add the emphasized feature amount to determine, as information, the feature amount itself as well as an improvement in detection accuracy to conduct direct communications among radio stations of different radio communications systems.

A variance value of a signal amplitude, or, in other words, a second order cumulant may also be used as a statistical amount usable as a waveform feature amount other than the periodic steadiness. For example, Non-patent document 3 proposes a technique of calculating a higher order cumulant to detect a signal buried in noise. For the second order cumulant in particular, the fact that a signal with a very high peak power to average power ratio (PAPR), such as an OFDM signal, greatly differs in the second order cumulant value from a constant envelope signal such as a single carrier signal, noise, etc., can be used to calculate the secondary cumulant of a received signal to detect whether the OFDM signal is included in the received signal. In other words, a time-varying characteristic of the secondary cumulant value in a transmitted signal of a surrounding radio station is obtained at an information obtaining unit of a controller of the present invention as feature amount information of the secondary cumulant value of the signal and compared with a time-varying characteristic of the secondary cumulant value calculated at the waveform feature amount extracting unit to determine that a signal is present when a correlation between a calculated result and a time-varying characteristic of the value obtained at the information obtaining unit is higher than a threshold value, and that the signal is not present when it is lower than the threshold value, thereby making it possible to detect the signal. Moreover, it is considered that, when a surrounding radio station transmits a signal, a specific periodic steadiness feature amount can be emphasized to add the emphasized feature amount to determine, as information, the feature amount itself as well as an improvement in detection accuracy to conduct direct communications among radio stations of different radio communications systems.

As a statistical amount usable as the waveform feature amount other than the periodic steadiness and the secondary cumulant, a frequency correlation characteristic of a signal, etc., is also usable (Non-patent document 4). For the frequency correlation characteristic, a variation of a signal power is added to a sub-carrier frequency component which a multi-carrier signal such as the OFDM signal has and a frequency correlation value of a received signal can be calculated at a radio station provided with the controller of the present invention to detect, as the waveform feature amount, the peak value, the number of peaks, and a frequency interval between multiple peaks.

Below, a more specific example is shown.

A statistical amount of the periodic steadiness, the entropy of a signal, or a power variance value can be used to express the waveform feature amount. These are common in that they exhibit the statistical characteristics of the signal waveform. Therefore, the feature amount or the waveform feature amount may be calculated by observing a certain time signal and performing a certain mathematical operation thereon.

First, secondary periodic steadiness statistical amounts are explained. The secondary periodic steadiness statistical amounts are primarily expressed as statistical amounts called a secondary cyclic autocorrelation function (CAF) and spectral correlation density (SCD). Here, the cyclic autocorrelation function CAF for a signal x (t) is expressed as:

Equation 1

-continued $$R_x^\alpha(\tau) = \lim_{T \to \infty} \frac{1}{T} \int_{-T/2}^{T/2} x\left(t + \frac{\tau}{2}\right) x^*\left(t + \frac{\tau}{2}\right) e^{-j2\pi\alpha t} dt \quad (1)$$

Here, the spectral correlation density SCD becomes as follows:

Equation 2

$$S_x^\alpha(f) = \int_{-\infty}^{\infty} R_x^\alpha(\tau) e^{-j2\pi f \tau} d\tau \quad (2)$$
$$= \lim_{T \to \infty} \frac{1}{T} X_T\left(f + \frac{\alpha}{2}\right) X_T^*\left(f - \frac{\alpha}{2}\right)$$

Here, $\alpha$ is a cycle frequency, while $\tau$ is a lag parameter. Moreover, $X_T(f)$ is a Fourier transform of a time signal x (t).

A waveform information extracting unit 201 in FIG. 3 (the below-mentioned 110 in FIG. 9, 201 in FIG. 11, etc.) performs calculation of the above-described (1) or (2) on a received signal x(t). More specifically, the CAF and SCD are calculated for predetermined $\alpha$ and $\tau$, which are provided in advance, and the values of the CAF and SCD that are obtained for each of $\alpha$ and $\tau$ pairs are set as the above-described $C_i$. Here, the CAF and SCD exhibit a statistical value peak for a specific $\alpha$ and $\tau$ depending on modulation scheme and signal parameters, and exhibit zero or an extremely small value relative to the peak for other $\alpha$ and $\tau$.

Next, signal entropy is described. For example, suppose a signal x (t) is sampled and respective signal samples are quantized, the quantized samples possibly taking values of $a_1$, $a_2$, ..., or $a_M$. For a probability of each value occurring as p $(a_i)$ (i=1, 2, ..., M), the signal entropy H is given as Equation 3

$$H = E[-\log_2 p(a_i)] \quad (3)$$
$$= -\sum_{i=1}^{M} p(a_i) \log_2 p(a_i)$$

The signal entropy H approaches a maximum value "1" when the probabilities that the respective values $(a_i)$ occur are similar, and becomes "1" when all are identical. Moreover, when the probabilities that the respective values $(a_i)$ occur concentrate on a certain value, the signal entropy H approaches a minimum value "0" and becomes "0" when they concentrate on one specific value.

The waveform information extracting unit 101, 201, etc., counts, for all values which may be taken, the number of occurrences of each of the values of quantized samples of sampled signals, and derives the probability of the occurrences and performs the calculation of (3) above. In lieu of the probability of the occurrences of each of the values which may be taken by the samples, the probability of the occurrences of power values of the samples may be used to calculate the entropy H. For example, if a transmit signal is an OFDMA signal, when the entropy H is calculated using the power values, the amplitude may take a very wide range of numerical values, so that the entropy H becomes large. On the other hand, if the transmit signal is a CDMA signal, the amplitude value is relatively constant, so that the entropy H becomes small. In this way, a signal waveform feature may be expressed based on the entropy. A signal may also be sampled and quantized to generate a signal for which sample values may concentrate or vary to generate a signal having predetermined entropy.

Moreover, for a signal x (t), a power variance value is given using the following equation.

Equation 4

$$V = E[(|x(t)|^2 - E[|x(t)|^2])^2] \quad (4)$$

The power variance value is a variance value of a power, which value represents, to what degree, observed instantaneous power varies from average power. As described above, for the OFDMA signal, the amplitude variance value is large, so that the power variance value is large. On the other hand, the amplitude variance value for the CDMA signal is small, so that the power variance value is small.

As the signal waveform feature may be detected, the above-described cyclical autocorrelation function (CAF) and the spectral correlation density (SCD) are preferable even when the received signal is at such a low level that it is buried in noise. The above-described feature amount may be derived without demodulating the received signal. Moreover, the above described feature amount is preferable in that it makes it possible to exchange information between systems without undergoing demodulation even when sharing the same frequency bandwidth with another system having a different data modulation scheme. The periodic steadiness statistical amount, entropy, and power variance value as mentioned herein are merely exemplary, so that other statistical amounts may be used.

1.4 Operational Flow

Figure 6:
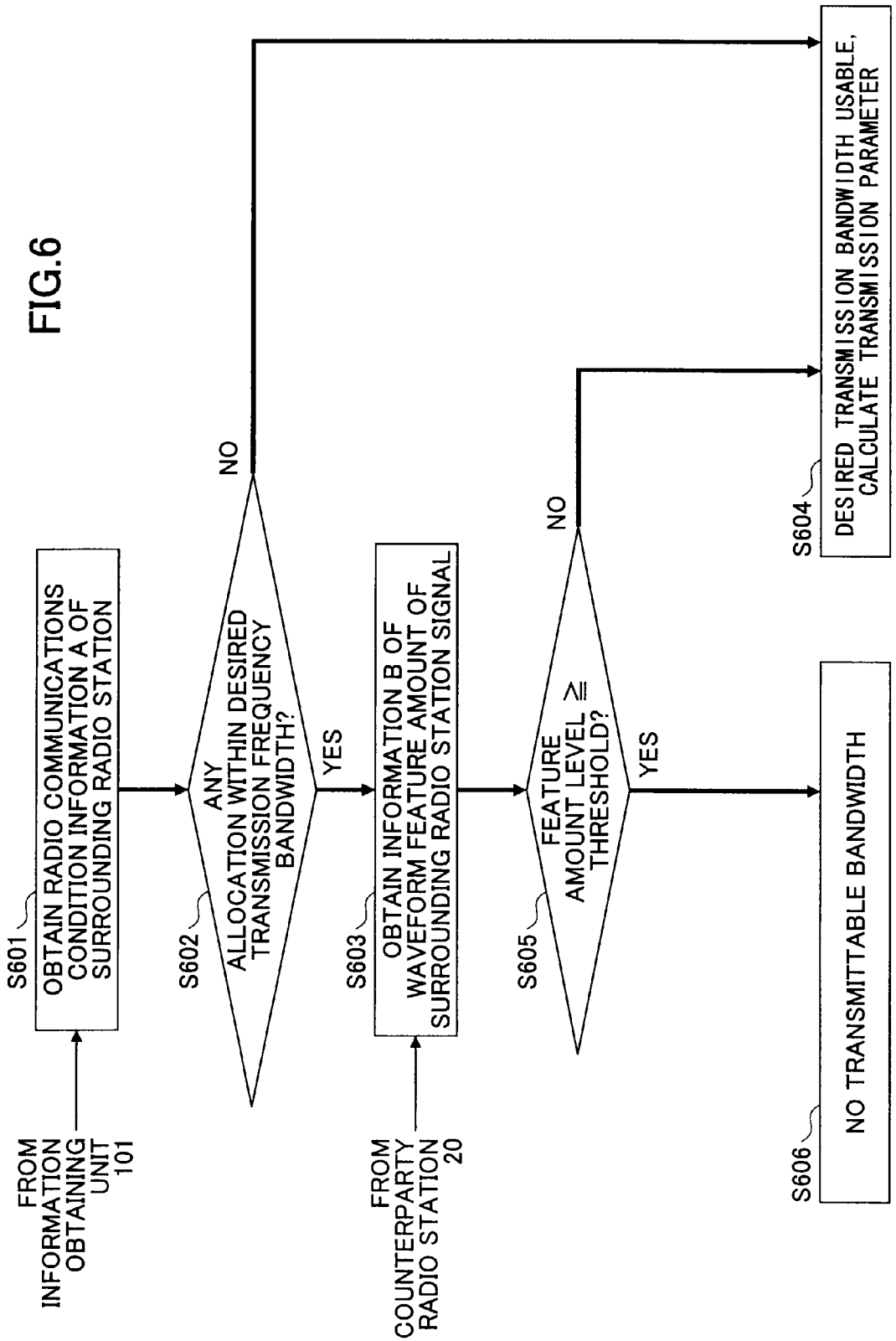
FIG. 6 is a flowchart illustrating a control procedure at a radio resource parameter determining unit in the first embodiment of the present invention.

FIG. 6 illustrates a flowchart of a control procedure in a radio resource parameter determining unit 103 of a network connecting radio station 10 according to the first embodiment.

First, information including radio communications condition information A from a surrounding radio station is obtained at the network connecting radio station 10, and the radio communications condition information A is obtained from the information obtaining unit 101 (S601).

From the frequency bandwidth usage condition information included in the radio communications condition information A, it is determined whether any bandwidth of surrounding radio stations 30 is allocated within a desired transmission bandwidth of the network connecting radio station 10 itself (S602).

When no bandwidth of the surrounding radio stations 30 is allocated within the desired transmission bandwidth of the network connecting radio station 10 itself, it is determined to transmit data in the bandwidth (S604).

Here, the desired transmission bandwidth is a frequency bandwidth for which usage is desired in the network connecting radio station 10 to communicate with the counterparty radio station 20 to be a communications counterparty. For example, it includes, in a transmission path from the network connecting radio station 10 to the counterparty radio station 20, or a frequency bandwidth in which a signal transmitted by itself is received at power no less than a predetermined level or in which usable frequency bandwidth is limited due to rule or hardware of the network connecting radio station 10. Moreover, the desired transmission bandwidth may be set as a frequency bandwidth in which a desired communications capacity can be achieved, out of a frequency bandwidth in which the network connecting radio station 10 can use hardware-wise. In this case, the frequency bandwidth to be requested may be one contiguous frequency bandwidth, or a collection of multiple frequency bandwidths which can be used simultaneously to achieve a desired communications capacity.

When any radio station is already allocated a band within a desired transmission bandwidth in step S602, the information B of the waveform feature amount of the received signal that is calculated at the waveform information extracting unit 201 of the counterparty radio station 20 is obtained from the received status reporting unit 202 (S603).

The calculated feature amount level on the waveform feature amount information B is compared with a certain threshold value (S605).

If the feature amount level exceeds the threshold value, data transmission is not permitted (S606). The fact that a certain feature amount level is strongly received at a certain radio station 20 indicates that the radio station 20 strongly receives a signal from a radio station 30 using the feature amount out of other surrounding radio stations. Thus, the radio station 20 could transmit a certain signal to cause strong interference on the surrounding radio stations 30. Therefore, if the feature amount level exceeds the threshold value, the transmission of the radio station is prohibited. If the feature amount level does not exceed the threshold, the data transmission is permitted and the transmission parameter used for the data transmission is determined (S604).

The waveform feature amount information B is information in which results of calculation of the feature amount which is periodically obtained and a certain time before the present control in the waveform information extracting unit 201 of the counterparty radio station 20 are aggregated. When determining the transmission parameter used, an amount of transmission data transmitted by the network connecting radio station 10 to the counterparty radio station 20 and a communications path characteristic between the network connecting radio station 10 and the counterparty radio station 20 are also taken into account. More specifically, usable frequency bandwidth and time are determined according to the above-described control procedure and transmission power, modulation scheme, encoding scheme, etc., are determined such that a desired transmission data rate is obtained. Moreover, when communications traffic information, received quality information, etc., in other surrounding radio stations are included in the radio communications condition information as described above, transmission power, modulation scheme, encoding scheme, etc., are determined, also taking into account the above-mentioned information sets.

In this way, in the radio communications system according to the first embodiment, waveform feature amounts of respective multiple radio station signals are calculated (extracted) and whether there is a radio station surrounding the own apparatus is recognized based on the waveform feature amount. Based on the recognized information, a radio resource is determined such that the respective radio stations do not interfere with each other. In this way, a radio resource may be allocated while suppressing interference without a control method as complex as the conventional centralized control. The present method makes it possible to increase usable radio resources and frequency utilization efficiency, compared to a distributed control method (e.g., conventional CSMA, etc.) in which information on a signal is not obtained sufficiently. Moreover, a radio resource parameter determined at the radio resource parameter determining unit 103 is used not only in a signal transmitted from the network connecting radio station to the counterparty radio station 20, but also in a signal transmitted from the counterparty radio station 20 to the network connecting radio station 10.

1.5 Variation

Below, a variation on the first embodiment of the present invention is described.

1.5.1 First Variation

Figure 7:
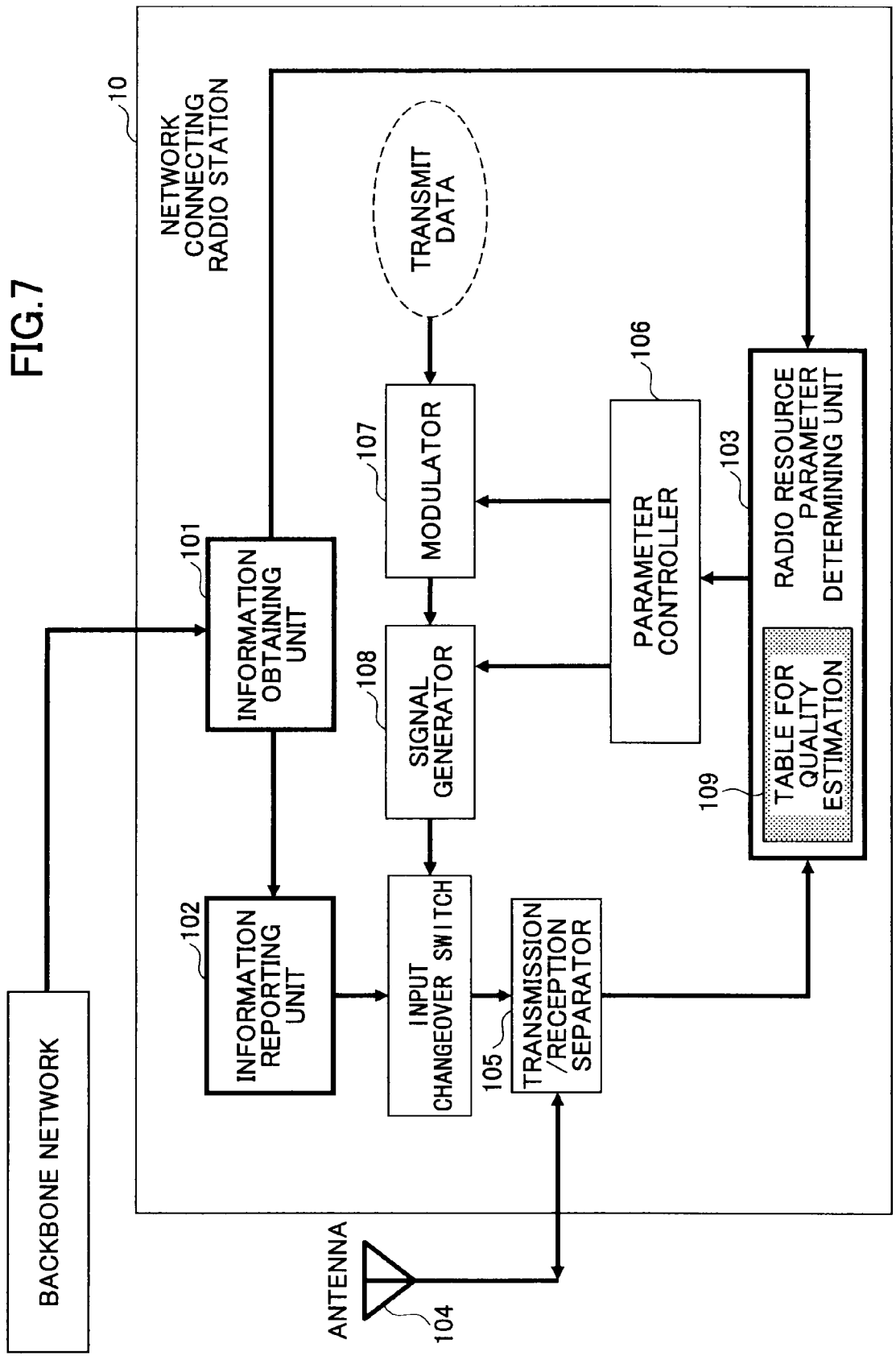
FIG. 7 is a block diagram illustrating the network connecting radio station according to a first variation of the first embodiment of the present invention.

FIG. 7 illustrates a network connecting radio station 10 according to a first variation. In the present variation, the radio resource parameter determining unit 103 of the network connecting radio unit 10 further has a table for quality estimation.

The table for quality estimation 109 collates the value of the waveform feature amount that is calculated by the waveform information extracting unit 201 (FIG. 4) and communications path quality between the counterparty radio station 20 and communications path quality 30. The radio resource parameter determining unit 103 in FIG. 7, when a report of calculated results of the waveform feature amount is received from a received status reporting unit 202 of the counterparty radio station 20, refers to the quality estimating table 109, held in advance, and estimates a communications path quality between the counterparty radio station 20 and other surrounding radio stations 30, which are transmission sources of a signal having a waveform characteristic amount reported.

Figure 8:
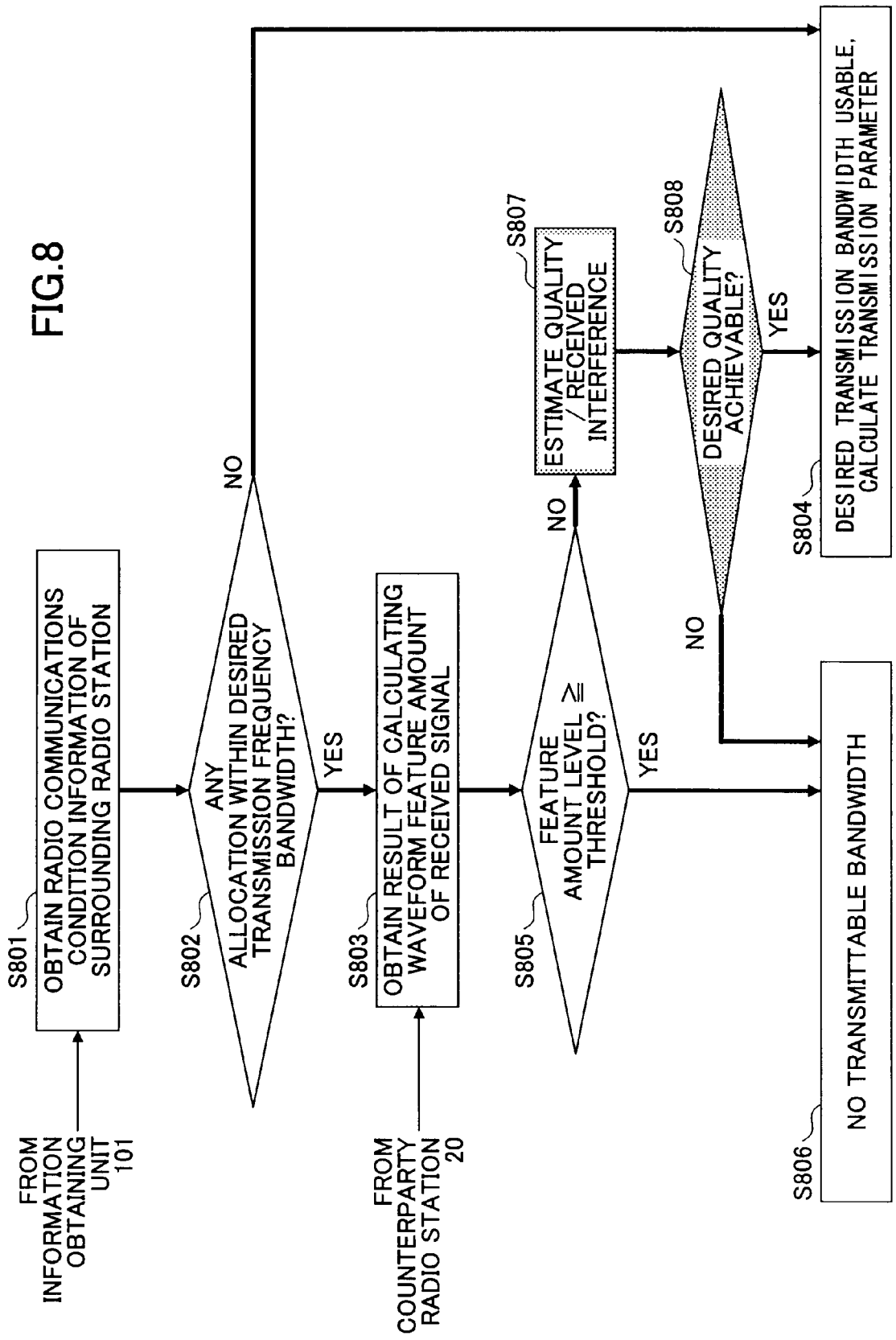
FIG. 8 is a flowchart illustrating the control procedure at the radio resource parameter determining unit according to the first embodiment of the present invention.

FIG. 8 illustrates a flowchart of a control procedure in a radio resource parameter determining unit 103 of a network connecting radio station 10 according to the first variation.

First, information including radio communications condition information A from the surrounding radio stations is obtained at the network connecting radio station 10, and the radio communications condition information A is obtained from the information obtaining unit 101 (S801).

From the frequency bandwidth usage condition information included in the radio communications condition information A, it is determined whether bandwidths of the other surrounding radio stations 30 are allocated within a desired transmission bandwidth of the network connecting radio station 10 itself (S802).

When none of the bandwidths of the surrounding radio stations 30 are allocated within a desired transmission bandwidth of the network connecting radio station 10 itself, it is determined to transmit data in the bandwidth (S804).

When any radio station is already allocated within a desired transmission bandwidth in step S802, the information B of the waveform feature amount of the received signal that is calculated at the waveform information extracting unit 201 of the counterparty radio station 20 is obtained from the received status reporting unit 202 (S803).

The calculated feature amount level is compared with the threshold value (S805).

If the feature amount level does not exceed the threshold value (NO in S805), a communications path quality between other surrounding radio stations 30 and the counterparty radio station 20 is estimated from the feature amount level based on the table for quality estimation. Moreover, an amount of interference caused by the counterparty radio station 20 with the other surrounding radio stations 30 is also estimated (S807).

As a result of the estimation, even when the counterparty radio station 20 has conducted transmission, it is determined whether the interference caused with the other surrounding radio stations is no more than a predetermined level (S808). More specifically, it is determined whether it is possible to set the interference to be at a level allowable for the other surrounding radio stations while achieving desired communications qualities (e.g., a desired data rate, a desired QoS, an allowable delay, etc.)

If it is determined that the desired communications quality cannot be achieved, the data transmission is not permitted (S806).

When it is determined that the desired communications quality is achievable, the data transmission is permitted, and an allowable radio parameter is determined (S804).

The threshold in step S805 in the first variation may be set to be a value which is larger than the threshold in step S605 in FIG. 6. As is evident in FIGS. 6 and 8, the threshold being small makes it easier for the process flow to proceed to steps S606 and S806, and makes it more difficult for the corresponding radio station 20 to transmit a signal. Conversely, the threshold being large makes it easier for the process flow to proceed to steps S804 and S807 and for the counterparty radio station 20 to be provided an opportunity to transmit a signal. In the present variation, whether transmission can be conducted is determined from a point of view of received quality after determining whether a signal of other stations is present (S805). Therefore, the process flow in FIG. 8 is more preferable than that in FIG. 6 from a point of view of increasing opportunities in which the transmissions can be conducted. Even if the signal of the other stations is present to some extent, a parameter such as transmission power, etc., may be flexibly controlled according to a communications path characteristic between radio stations 20 and 30 to decrease interference with the other radio stations 30. In this way, communications opportunities may be increased, thereby increasing frequency utilization efficiency.

1.5.2 Second Variation

Figure 9:
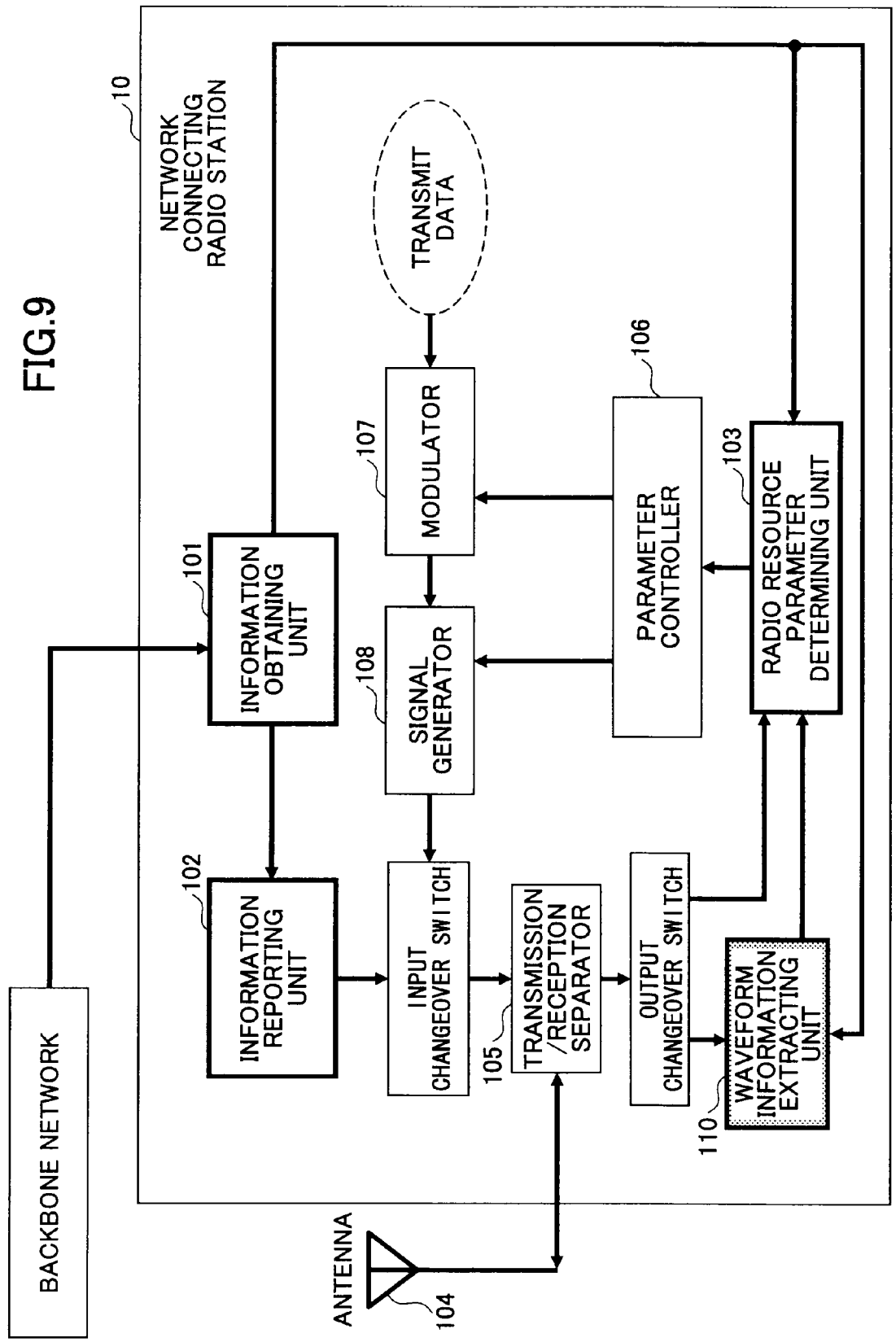
FIG. 9 is a block diagram illustrating the network connecting radio station according to a second variation of the first embodiment of the present invention.

FIG. 9 illustrates a network connecting radio station 10 according to a second variation. As illustrated in FIGS. 3 and 4, the counterparty radio station 20 is provided with (a first) waveform information extracting unit 201. In the present variation, as illustrated in FIG. 9, the network connecting radio station 10 is provided with a second waveform information extracting unit 110. The network connecting radio station 10 receives a signal via an output changeover switch. Waveform feature amount information reported from the counterparty radio station 20 is input to a radio resource parameter determining unit 103, while other signals (e.g., a signal from a radio station 30) are input to the second waveform information extracting unit 110. The second waveform information extracting unit 110 calculates a waveform feature amount of a signal input thereto, and inputs information on the waveform feature amount, which is a calculated result, into the radio resource parameter determining unit 103. As shown, an output changeover switch is used. However, a signal may be input into the second waveform information extracting unit 110 and the radio resource parameter determining unit 103 without using the switch. In this case, it may be arranged for the second waveform information extracting unit 110 and the radio resource parameter determining unit 103 to determine what is in the signal.

Figure 10:
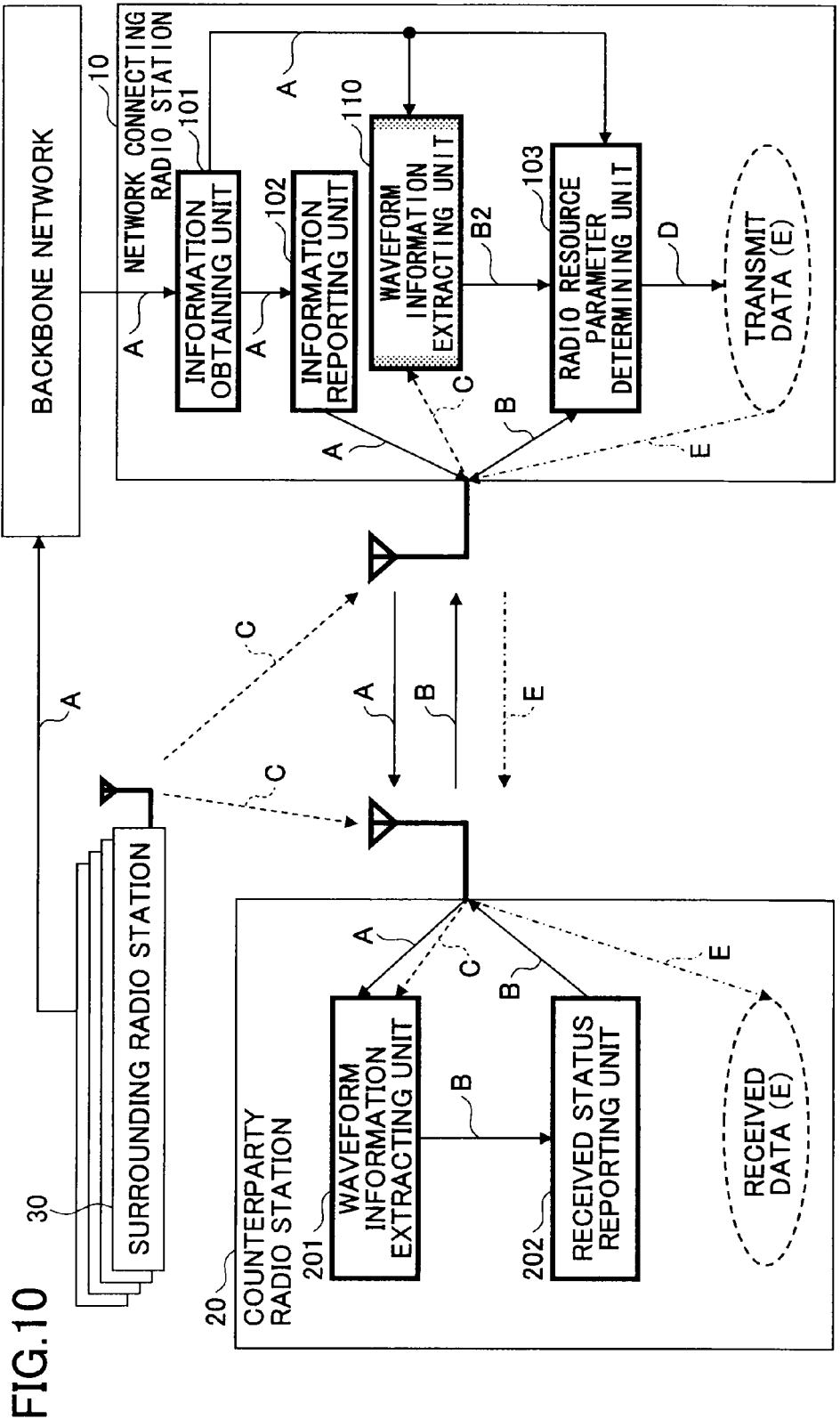
FIG. 10 is a conceptual diagram illustrating the operating principles of the radio communications system according to the second variation of the first embodiment of the present invention.

FIG. 10 illustrates operating principles of a radio communications system of the second variation. In general, between the counterparty radio station 20 and the network connecting radio station 10, an operation described with reference to FIG. 4 is performed.

In the present variation, not only the counterparty radio station 20, but also the network connecting radio station 10 performs an operation of extracting the waveform feature amount. More specifically, the network connecting radio station 10 receives a radio signal C from other surrounding radio stations, the radio signal C being input to the second waveform extracting unit 110. The second waveform information extracting unit 110 calculates a waveform feature amount of the radio signal C based on feature amount information A (information, etc., on what waveform feature amount is used by the radio station 30). The calculated waveform feature amount information B2 is input to the radio resource parameter determining unit 103 of the network connecting radio station 10. The radio resource parameter determining unit 103 determines whether signal transmission of a counterparty radio station can be conducted and a radio resource parameter to be used if permitted. In other words, in S603, within a control procedure of the radio resource parameter determining unit 103 in FIG. 6, waveform feature amount information used for determining the radio resource parameter and for determining data transmission can be conducted includes both waveform feature amount information B calculated in the waveform information extracting unit 201 of the counterparty radio station 20 and the waveform feature amount information B2 calculated at the second waveform extracting unit 110 of the network connecting radio station 10.

In S605, the respective waveform feature amounts B and B2 are compared with the threshold value. If neither of the feature amount levels exceeds the threshold value, the data transmission is permitted and the radio resource parameter to be used is determined.

If both feature amount levels exceed the threshold value, the data transmission is prohibited.

If the feature amount level B from the counterparty radio station 20 exceeds the threshold value while the feature amount level B2 from the other radio stations 30 do not, transmission from the counterparty radio station 20 to the network connecting radio station 10 is prohibited. The feature amount level B is a feature amount level of a signal from the surrounding radio stations 30 that is received and measured by the counterparty radio station 20. Therefore, if the feature amount level B exhibits a large value, the counterparty radio station 20 transmitting a signal ends up causing strong interference with the surrounding radio stations 30. Therefore, transmission from the counterparty radio station 20 is prohibited. On the other hand, if the feature level B2 measured at the network connecting radio station 10 exhibits a small value, it is anticipated that the network connecting radio station 10 transmitting a signal does not cause strong interference with the surrounding radio stations 30. Therefore, signal transmission from the network connecting radio station 10 to the counterparty radio station 20 may be permitted. When the signal transmission is permitted, a radio parameter to be used in transmission is determined. Alternatively, instead of permitting unidirectional communications as described above (downlink only), it may also be arranged for the transmission of the network connecting radio station 10 and the transmission of the counterparty radio station 20 to be prohibited.

If the feature amount level B from the counterparty radio station 20 does not exceed the threshold value while the feature amount level B2 from the other radio stations 30 does, transmission from the network connecting radio station 10 to the counterparty radio station 20 is prohibited. The feature amount level B2 is a feature amount level of a signal from the surrounding radio stations 30 that is received and measured by the counterparty radio station 20. Therefore, if the feature amount level B2 exhibits a large value, the network connecting radio station 10 transmitting a signal ends up causing strong interference with the surrounding radio stations 30. Therefore, transmission from the network connecting radio station 10 is prohibited. On the other hand, if the feature level B measured at the counterparty radio station 20 exhibits a small value, it is anticipated that the counterparty radio station 20 transmitting a signal does not cause strong interference with the surrounding radio stations 30. Therefore, signal transmission from the counterparty radio station 20 to the network connecting radio station 10 may be permitted. When the signal transmission is permitted, a radio parameter to be used in transmission is determined. Alternatively, instead of permitting unidirectional communications as described above (uplink only), it may also be arranged for the transmission of the network connecting radio station 10 and the transmission of the counterparty radio station 20 to be prohibited.

In the second variation, at both the network connecting radio station 10 and the counterparty radio station 20, a waveform feature amount of a signal transmitted by other surrounding stations 30 is detected, and a radio resource parameter to be used when permitted and whether data can be transmitted are determined. This makes it possible to accurately avoid interference. Moreover, for data transmission from the network connecting radio station to the counterparty radio station 20 and for data transmission from the counterparty radio station 20 to the network connecting radio station 10, the data transmission can be permitted only when interference is not caused, thereby increasing communications opportunities and frequency utilization efficiency.

1.5.3 Third Variation

Figure 11:
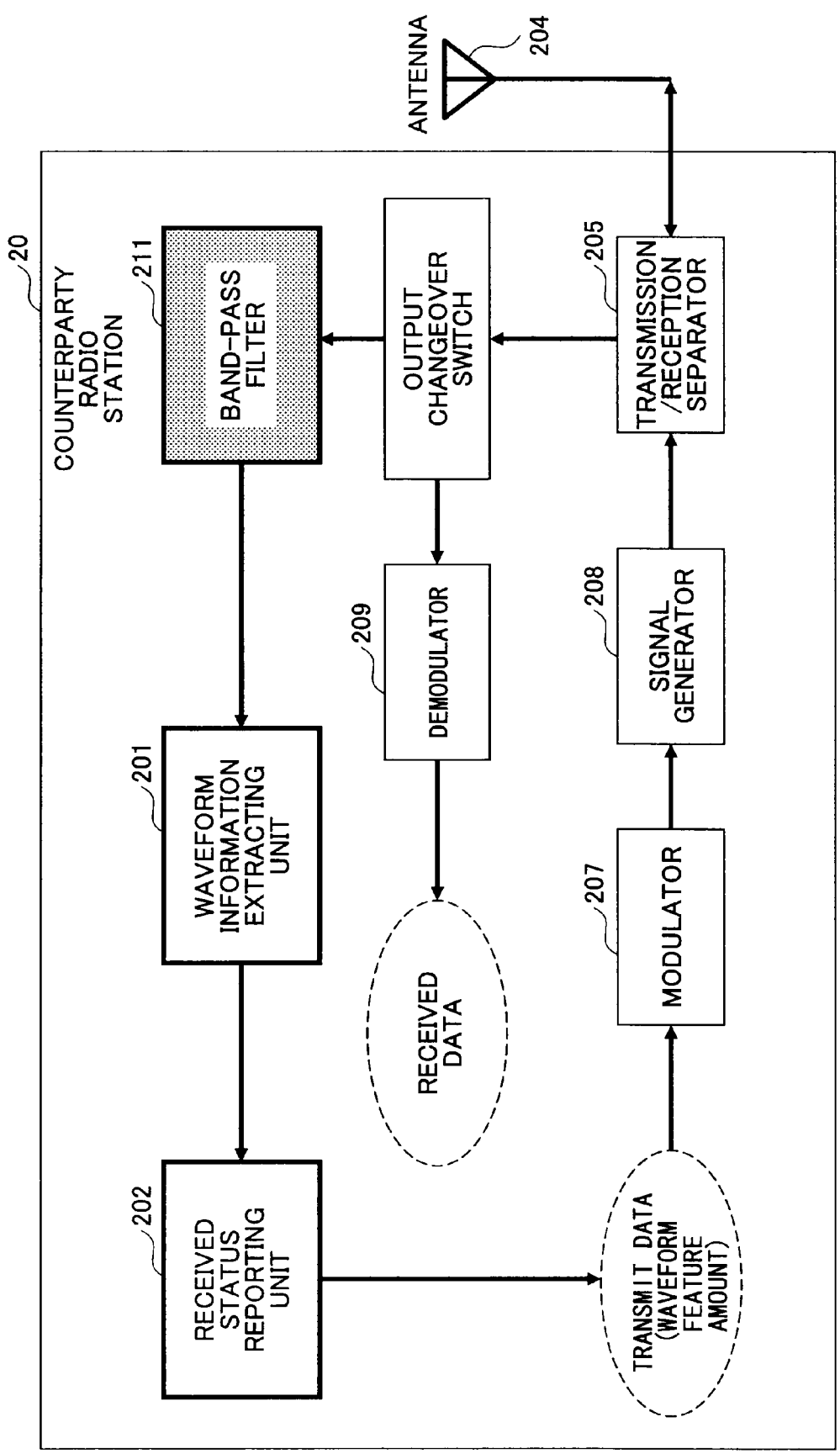
FIG. 11 is a block diagram illustrating the counterparty radio station according to a third variation of the first embodiment of the present invention.

FIG. 11 illustrates a counterparty radio station 20 according to a third variation. The counterparty radio station 20 according to the present variation further has a band-pass filter 211.

A signal received at the counterparty radio station 20 is input into the band-pass filter 211 via a transmission/reception separator 205, and bandwidth limited. The bandwidth limiting is a process in which a frequency component of a pass band of an input signal is passed as it is and the other frequency components are not passed. The band-pass filter 211 may be provided as being dedicated to the present control, or may be shared for use with a noise removal filter used for normal radio communications.

Figure 12:
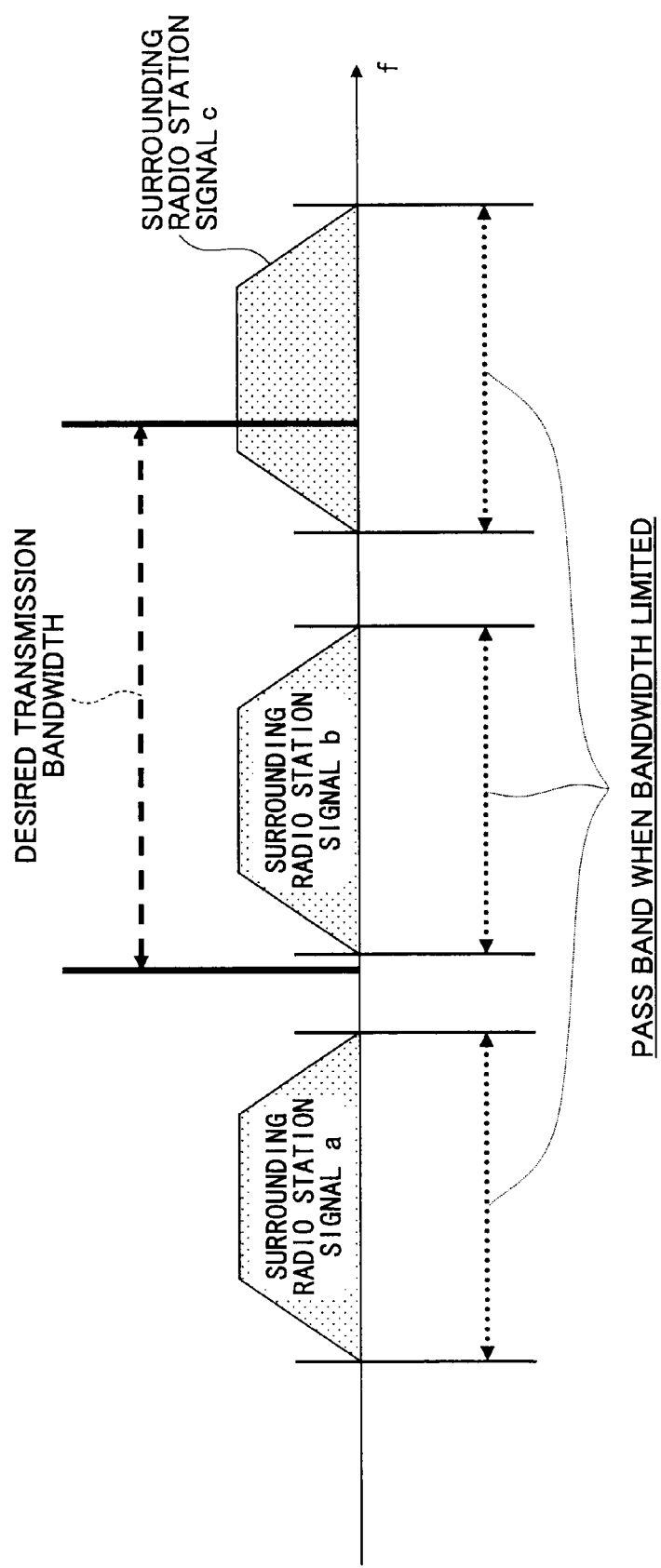
FIG. 12 is a diagram illustrating a pass-band setting example (a) of a band-pass filter according to the third variation of the first embodiment of the present invention.

FIG. 12 illustrates an exemplary setting (a) of a pass band which is usable at the band-pass filter 211. Based on frequency usage condition information obtained in the information obtaining unit 101, it is arranged for the frequency bands used by the other surrounding radio stations to be pass bands. The bandwidth-limited signal can be input into the waveform information extracting unit 201 and the waveform feature amount can be calculated to remove the effect of a noise component and a spurious wave outside the bandwidth of a signal to be calculated, making the calculation of the waveform feature amount more accurate. Moreover, similar calculations can be performed for all signals which may be present in the surroundings to obtain such information and to achieve accurate resource control.

Figure 13:
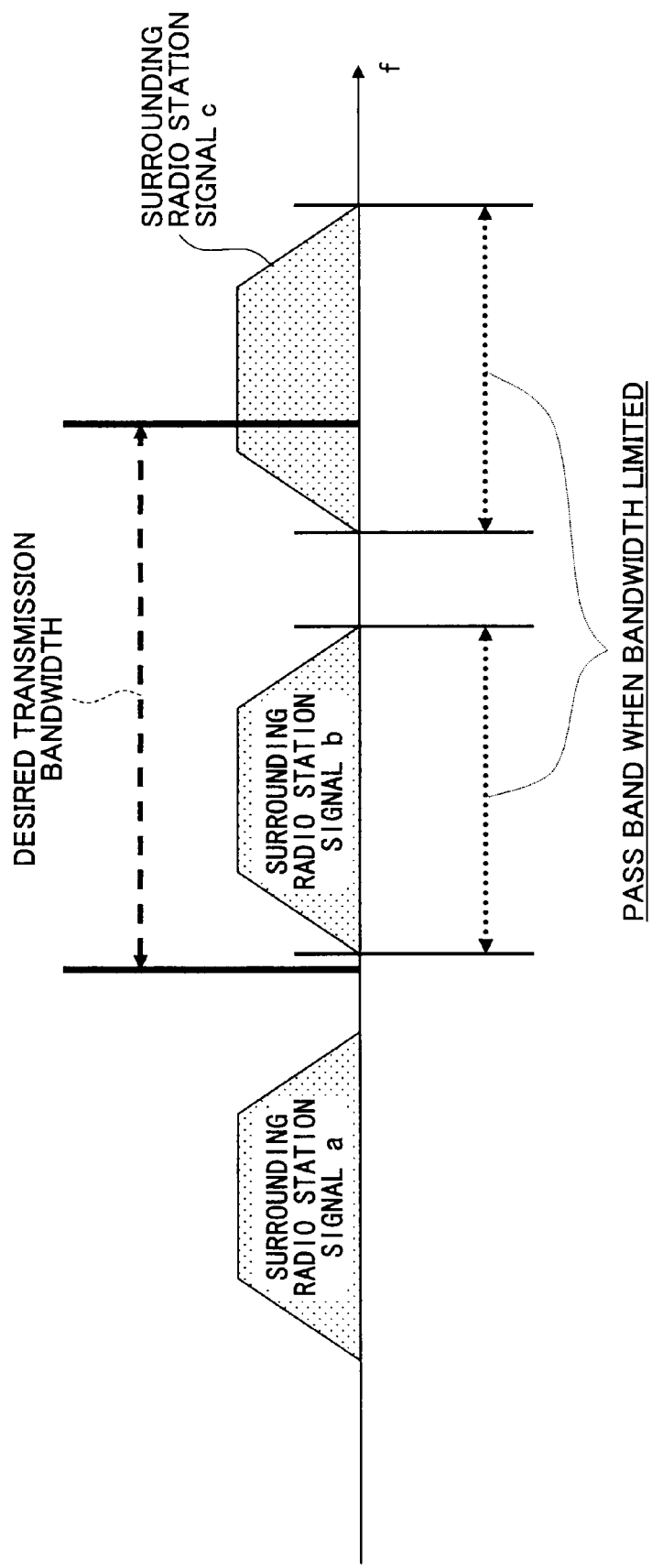
FIG. 13 is a diagram illustrating a pass-band setting example (b) of the band-pass filter according to the third variation of the first embodiment of the present invention.

FIG. 13 illustrates another exemplary setting (b) of a pass band which is usable at the band-pass filter 211. Based on frequency usage condition information obtained in the information obtaining unit 101, it may be arranged for a frequency bandwidth used by a radio station which uses all or part of a desired transmission bandwidth of the network connecting radio station 10 itself to be a pass band. In an example of FIG. 13, the desired transmission bandwidth includes signals b and c of the surrounding radio stations, passing these signals and blocking the other signal (signal a of a surrounding radio station). Such bandwidth limiting process allows calculating a waveform feature amount only for a transmission signal of a surrounding radio station that influences the desired transmission bandwidth, so that it can reduce the calculation amount relative to the bandwidth limiting in FIG. 12. Moreover, a signal outside a desired transmission bandwidth is ignored to not take into account a signal in a bandwidth with a characteristic which is significantly different from the bandwidth, making it possible to achieve resource control and feature amount calculation which is suitable for the frequency bandwidth in which a signal is actually transmitted.

Figure 14:
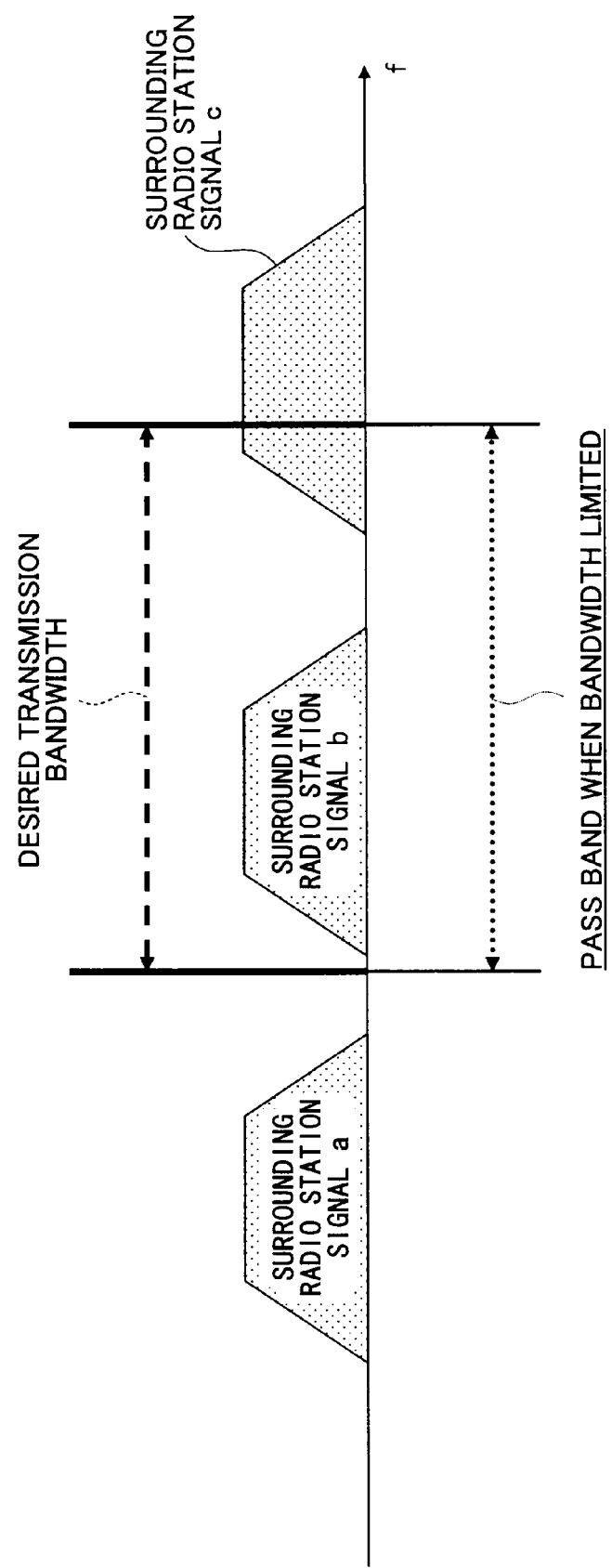
FIG. 14 is a diagram illustrating a pass-band setting example (c) of the band-pass filter according to the third variation of the first embodiment of the present invention.

FIG. 14 illustrates a further exemplary setting (c) of a pass band which is usable at the band-pass filter 211. In this case, the desired transmission bandwidth of the network connecting radio station 10 itself is set as a pass band as it is. For such a bandwidth limiting process as described above, a waveform feature amount can be calculated only for a signal which is present within the desired transmission bandwidth. Thus, even when a signal for which information is not obtained in advance exists within a bandwidth or when a signal is shifted to a bandwidth which is different from that obtained from frequency usage condition information due to a frequency offset, the waveform feature amount can be calculated based on a signal which has passed through the bandwidth. Moreover, when there is a match with a characteristic of a filter used for conducting transmission and/or reception by the counterparty radio station 20, the band-pass filter 211 may be shared for use with normal transmission/reception. Conversely, the filter used for transmission/reception may be used as a band-pass filter according to the third variation.

Figure 15:
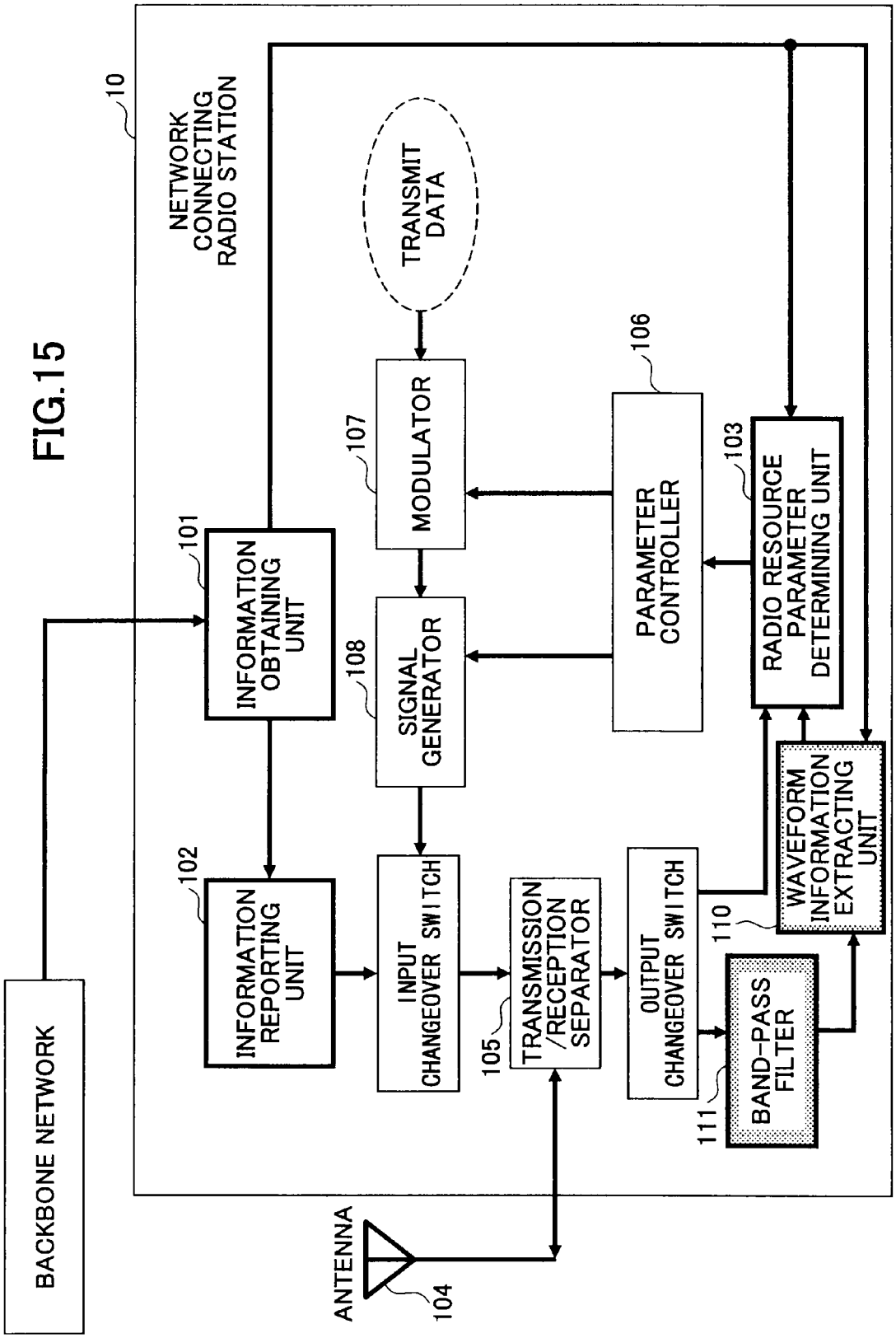
FIG. 15 is a block diagram illustrating the network connecting radio station according to a third variation of the first embodiment of the present invention.

In the second variation, the network connecting radio station 10 may further include a band-pass filter. A block diagram of the network connecting radio station 10 is illustrated in FIG. 15. As illustrated, a signal which is bandwidth-limited by the band-pass filter 111 is input into the second waveform information extracting unit 110. The waveform feature amount may be calculated after the bandwidth limiting to remove an effect of a noise component and a spurious wave outside a bandwidth of a signal to be calculated, making it possible to more accurately calculate the waveform feature amount in the network connecting radio station 10.

1.5.4 Fourth Variation

Figure 16:
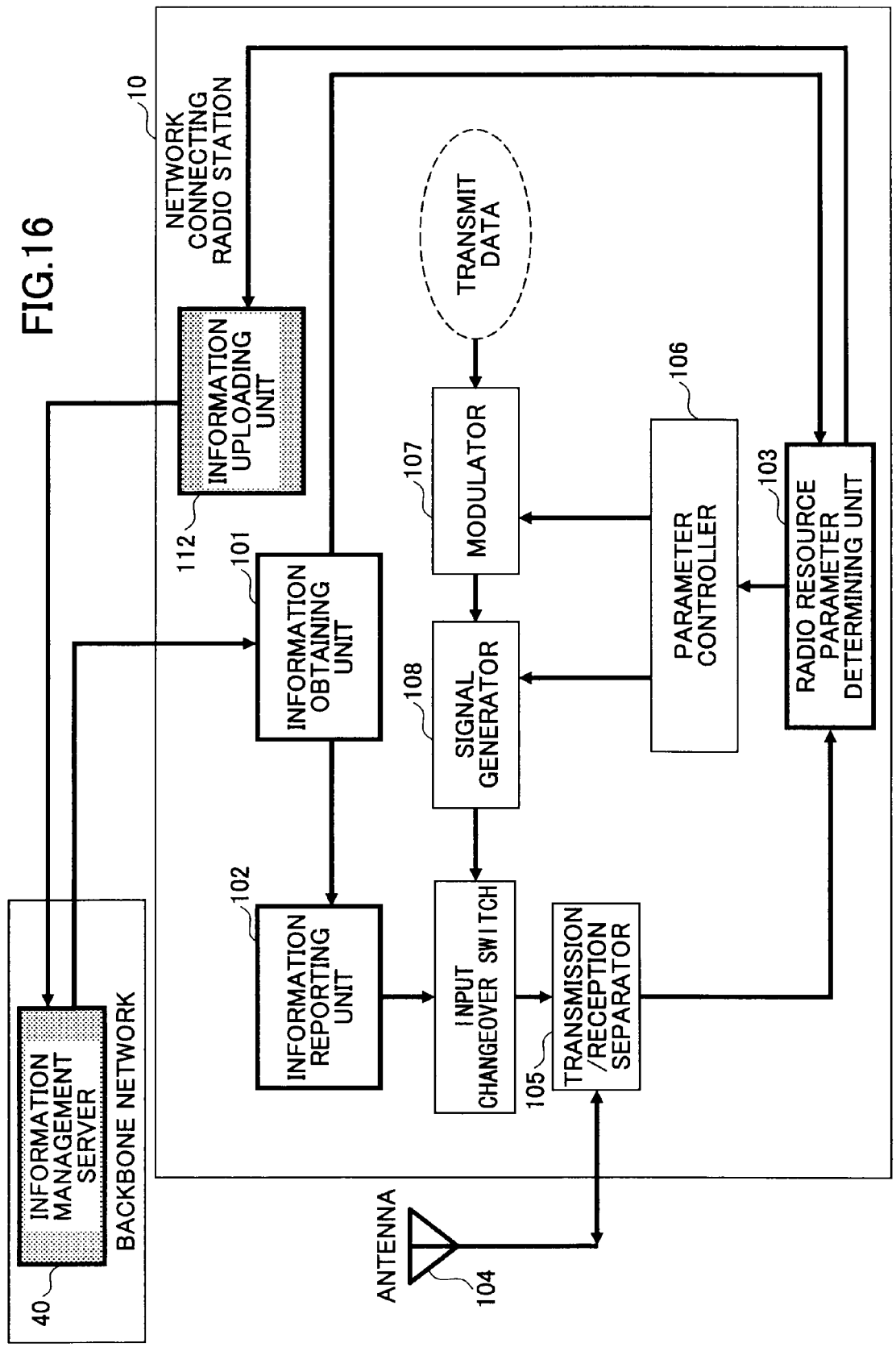
FIG. 16 is a block diagram illustrating the network connecting radio station according to a fourth variation of the first embodiment of the present invention.

FIG. 16 illustrates a network connecting radio station 10 and a backbone network according to a fourth variation. In the present variation, there is present, within the backbone network, an information management server 40 which centrally manages information. Moreover, the network connecting radio station 10 has an information uploading unit 112, which saves, in the information management server 40, information on a radio communications condition between the network connecting radio station 10 and the counterparty radio station 20. The network connecting radio station 10 uses the information obtaining unit 101 to access the information management server 40 and obtain information necessary.

Figure 17:
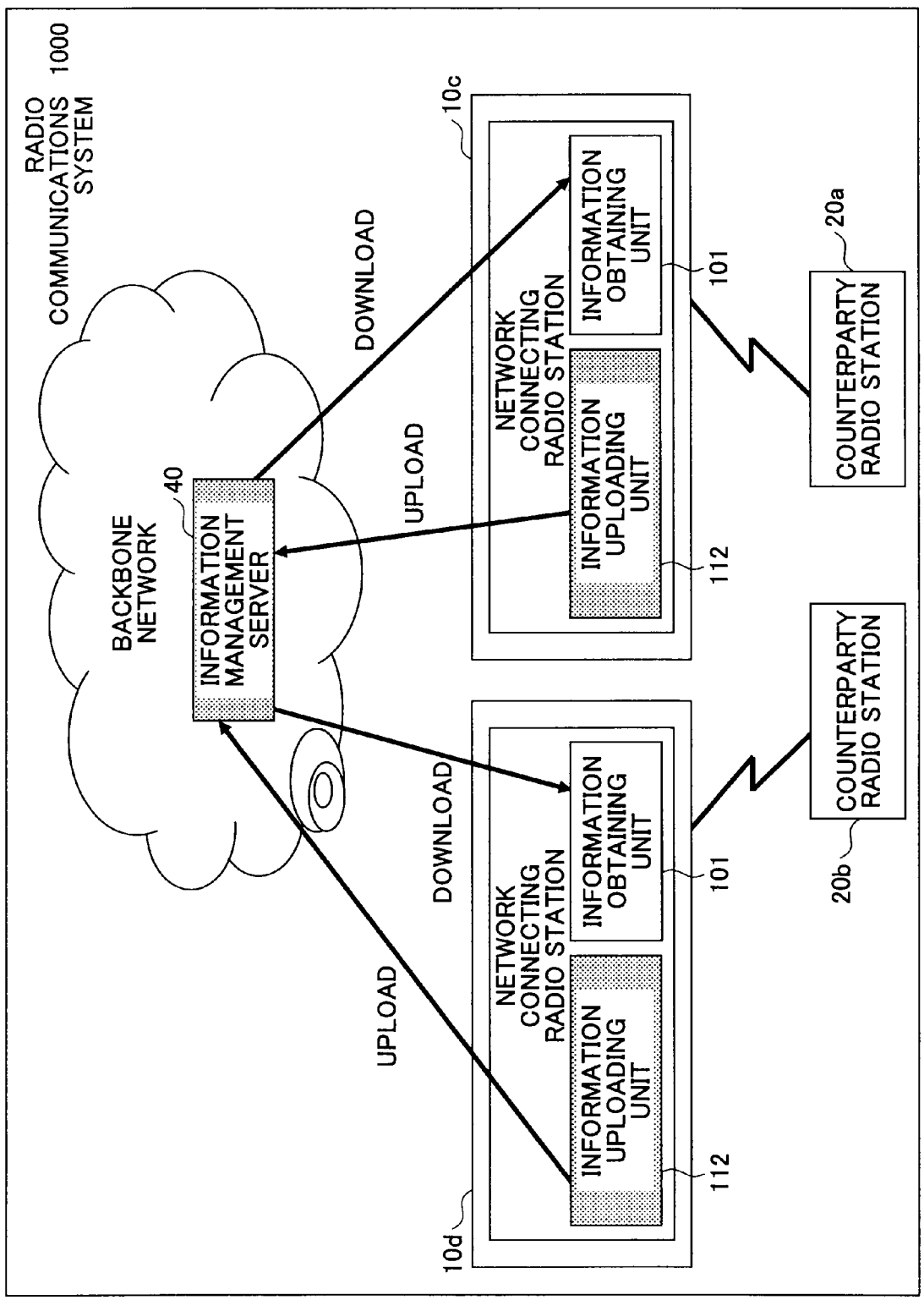
FIG. 17 is a conceptual diagram illustrating a radio communications system according to the fourth variation of the first embodiment of the present invention.

FIG. 17 shows a radio communications system according to a fourth variation. FIG. 17 illustrates a backbone network, an information management server 40, multiple network connecting radio stations 10c, 10d, and counterparty radio stations 20a, 20b. One network connecting radio station wirelessly communicates with at least one counterparty radio station. The network connecting radio stations 10c and 10d, which have the information uploading units 112 and the information obtaining units 101 in FIG. 17, use the respective units to connect to the information management server 40.

The network connecting radio station 10c uploads, via the information uploading unit 112 to the information management server 40, information on the radio communications condition between the network connecting radio station 10c and the counterparty radio station 20a (information on the feature amount, in particular). Before starting communications with the counterparty radio station 20b, the network connecting radio station 10d obtains, from the information management server 40 by the information obtaining unit 101, information on the radio communications condition of the other surrounding radio stations 30. The information includes information on a radio communications condition between the network connecting radio station 10c and the counterparty radio station 20a.

The subsequent process is as described with respect to the first embodiment. The network connecting radio station 10d reports obtained information to the counterparty radio station 20b and calculates a waveform feature amount of a received signal, and reports the same as received status to the network connecting radio station 10d. Based on information on radio communications condition and waveform feature amount reported, the network connecting radio station 10d determines the radio resource parameter to be used in communicating between the network connecting radio station 10d and the counterparty radio station 20b and whether data transmission can be conducted.

For the fourth variation, the respective network connecting radio stations 10 may collectively query the information management server 40 information on the radio communications condition of other surrounding radio stations 30. Therefore, compared to a case in which each radio station individually inquires about information on the radio communications condition, communications traffic for obtaining information on the radio communications condition within the backbone network may be reduced on a large scale.

1.5.5 Fifth Variation

Figure 18:
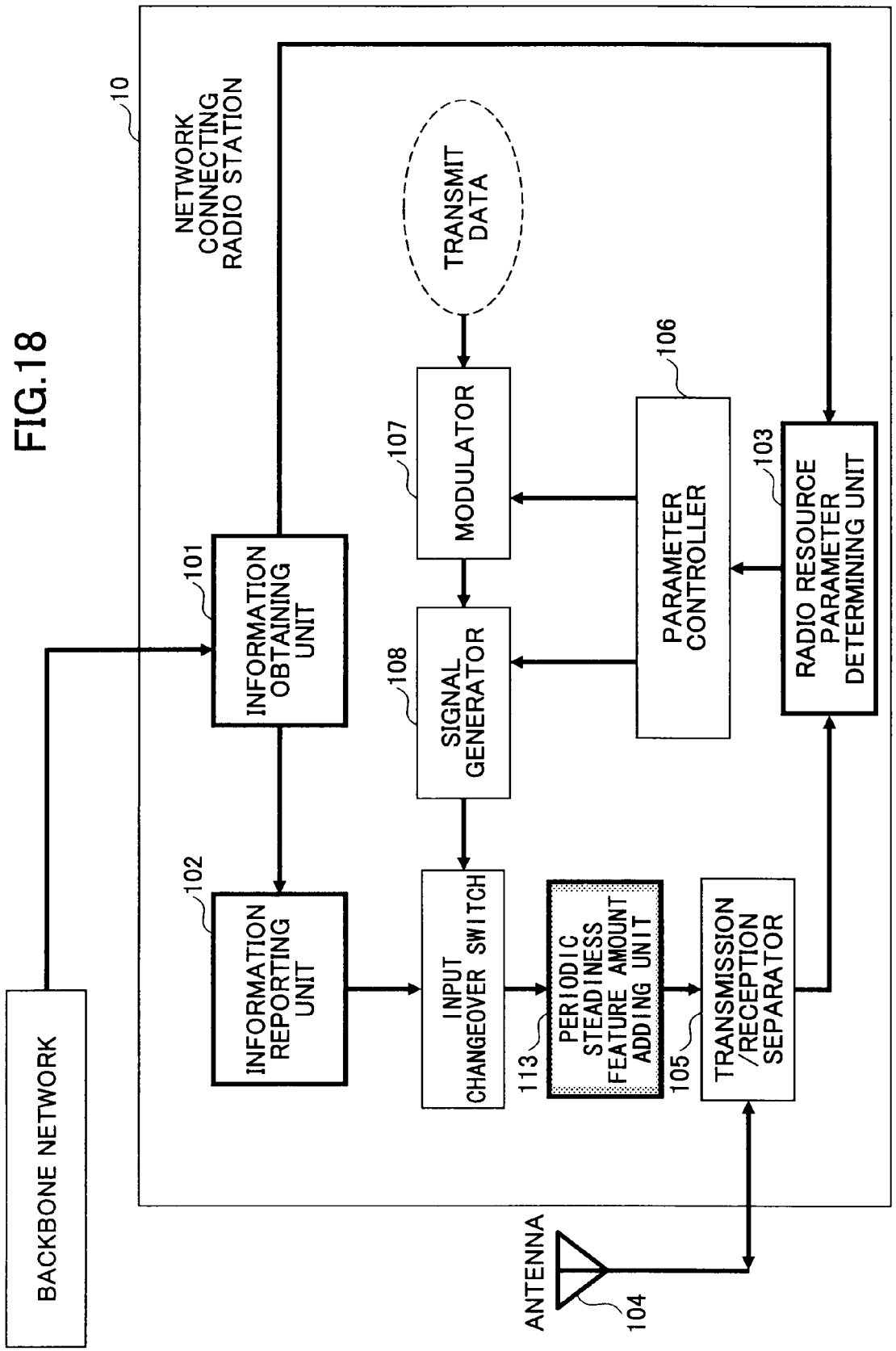
FIG. 18 is a block diagram illustrating the network connecting radio station according to a fifth variation of the first embodiment of the present invention.

FIG. 18 illustrates a network connecting radio station 10 according to a fifth variation. In the present variation, the network connecting radio station 10 further includes a periodic steadiness feature amount adding unit 113 which adds some periodic steadiness features to a transmit signal.

The periodic steadiness feature amount adding unit 113 of the network connecting radio unit 10 processes a transmit signal such that a transmit signal from the network connecting radio station 10 exhibits a certain periodic steadiness feature amount. The transmit signal, which is a signal transmitted to the counterparty radio station 20, which has the network connecting radio station 10 as a communications counterparty, includes a signal reported from the information reporting unit 102 and a signal for normal data transmission that is generated at the signal generator 108. The periodic steadiness feature amount is a predetermined feature amount associated with information on the network connecting radio station 10. As described in Section "1.3 Waveform feature amount", the periodic steadiness feature amount is expressed as a cyclic autocorrelation function (CAF) and/or a spectral correlation density (SCD), which values depend on a combination of a cycle frequency $\alpha$ and a delay parameter $\tau$. Therefore, for example, these parameters $\alpha$ and $\tau$ can be set to desired values to generate a transmit signal having a desired periodic steadiness waveform feature amount. This is merely exemplary, so that a transmit signal may be generated by other techniques.

The periodic steadiness feature amount is drawn, in FIG. 18, to be added to all signals from the information reporting unit 102 and from the signal generator 108. However, the periodic steadiness feature amount may be added to only signals from either one thereof.

Here, as information on the network radio station 10 that is added as the periodic steadiness feature amount, an ID for making it possible to identify the network connecting radio station 10 itself, information D on a radio resource parameter used in communications, radio communications condition information A obtained in the information obtaining unit 101, etc., can be used. Moreover, for a periodic steadiness feature amount adding unit, a technique in Patent document 4, etc., can be used. Transmitting a signal having added such a periodic steadiness feature amount for the other stations 30 surrounding the network connecting radio station 10 to calculate the periodic steadiness feature amount as a waveform feature amount of the received signal makes it possible to obtain information on the network connecting radio station 10 and to recognize the presence of the network connecting radio station 10. Moreover, whether transmission can be conducted as well as the radio resource parameter to be used by other surrounding radio stations 30 for communications is determined based on such information as described above to reduce interference caused with communications between the network connecting radio station 10 and the counterparty radio station 20.

Figure 19:
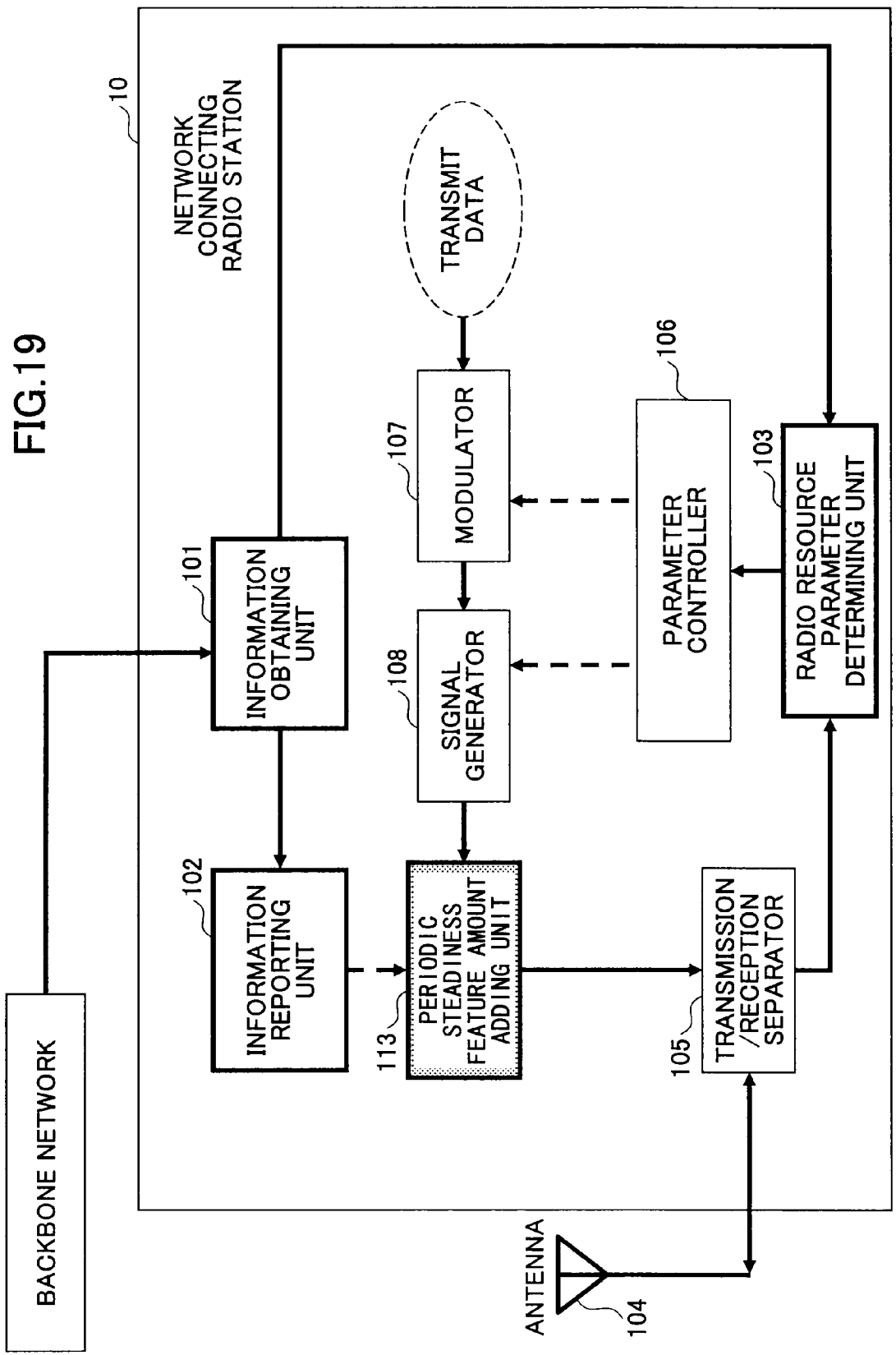
FIG. 19 is a block diagram illustrating the network connecting radio station according to the fifth variation of the first embodiment of the present invention.

FIG. 19 illustrates an example in which the periodic steadiness feature amount is added to a predetermined transmit signal. The information reporting unit 102 of the network connecting radio station 10 controls the periodic steadiness adding unit 113 such that, in association with information reported to the counterparty radio station 20 prior to communications, the periodic steadiness feature amount to be added to a signal is determined and the feature amount is added for the predetermined signal. In this case, the waveform information extracting unit 201 (not shown in FIG. 19) of the counterparty radio station 20 may calculate the periodic steadiness feature amount as the waveform feature amount to obtain some or all of radio communications condition information obtained in the information obtaining unit 101 of the network connecting radio station 10. For such communications, the feature amount may be calculated without a need for a demodulating process at the receiver. The periodic steadiness feature amount is detected more accurately than the normal demodulating process, making it possible to report correct information to the counterparty radio station 20. Even when the received interference is strong and a normal demodulation process is difficult, the exchange of information can be made. Moreover, in comparison to a signal which is at a level for the normal demodulation process to be possible, a reporting signal may be transmitted with a suppressed transmit power, making it possible to detect a periodic steadiness feature amount in the counterparty radio station. Therefore, interference caused with other surrounding radio stations 30 by such a reporting signal is low.

Figure 20:
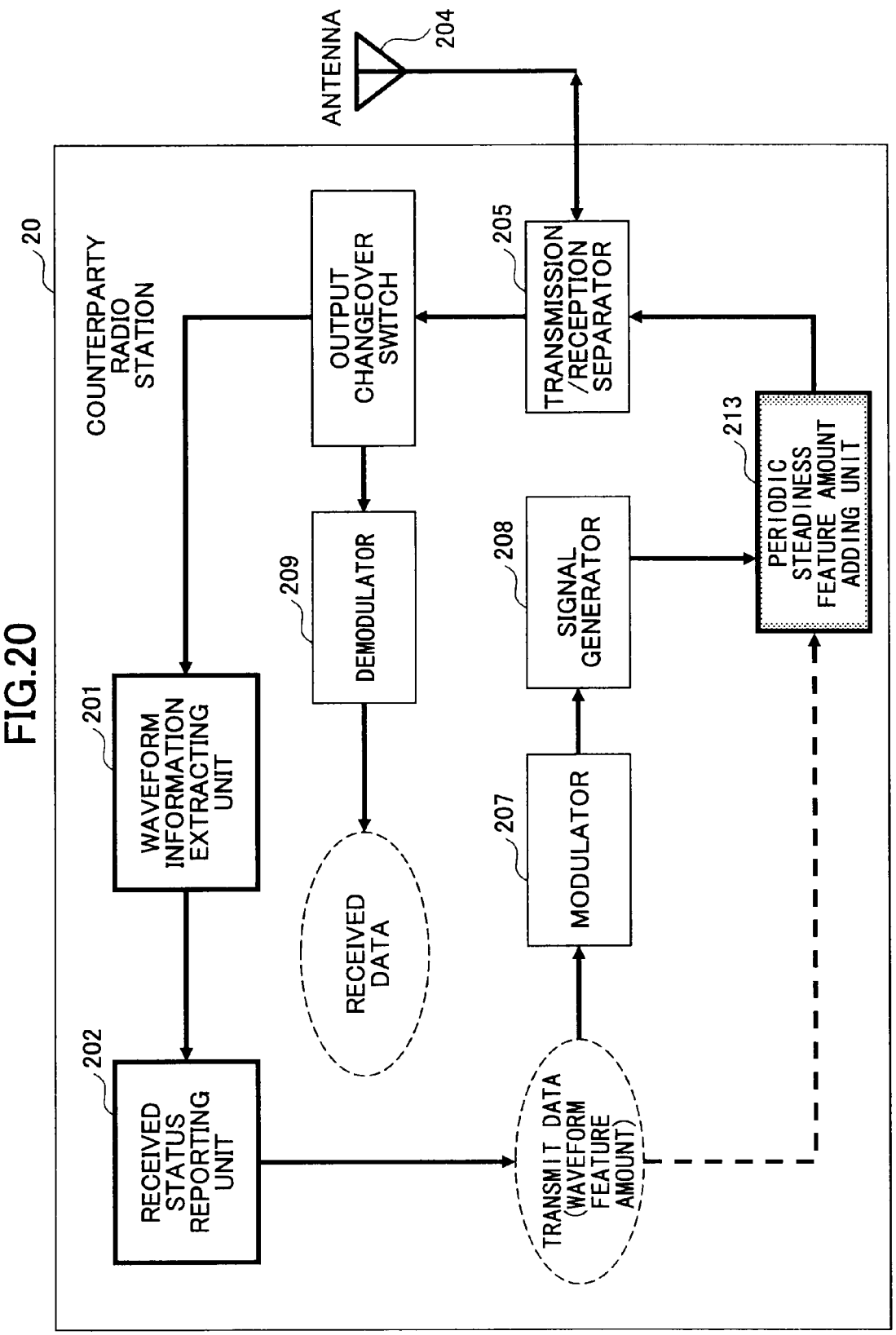
FIG. 20 is a block diagram illustrating the counterparty radio station according to the fifth variation of the first embodiment of the present invention.

As illustrated in FIG. 20, the periodic steadiness feature amount adding unit 213 may be provided at the counterparty radio station 20. The received status reporting unit 202 of the counterparty radio station 20 determines, before communications are started, a periodic steadiness feature amount which is added to a transmit signal including information reported to the network connecting radio station 10. The periodic steadiness feature amount adding unit 213 is controlled such that the periodic steadiness feature amount is added to the transmit signal. When the network connecting radio station 10 has a waveform information extracting unit 110 (second variation), the waveform feature amount information may be obtained, in the network connecting radio station 10 using a calculation of the waveform feature amount even in an environment with a low received SNR. Alternatively, the waveform feature amount information may be obtained, in the other surrounding radio stations 30, from the reporting signal of the counterparty radio station 20 even in an environment with the low received SNR.

1.5.6 Sixth Variation

Figure 21:
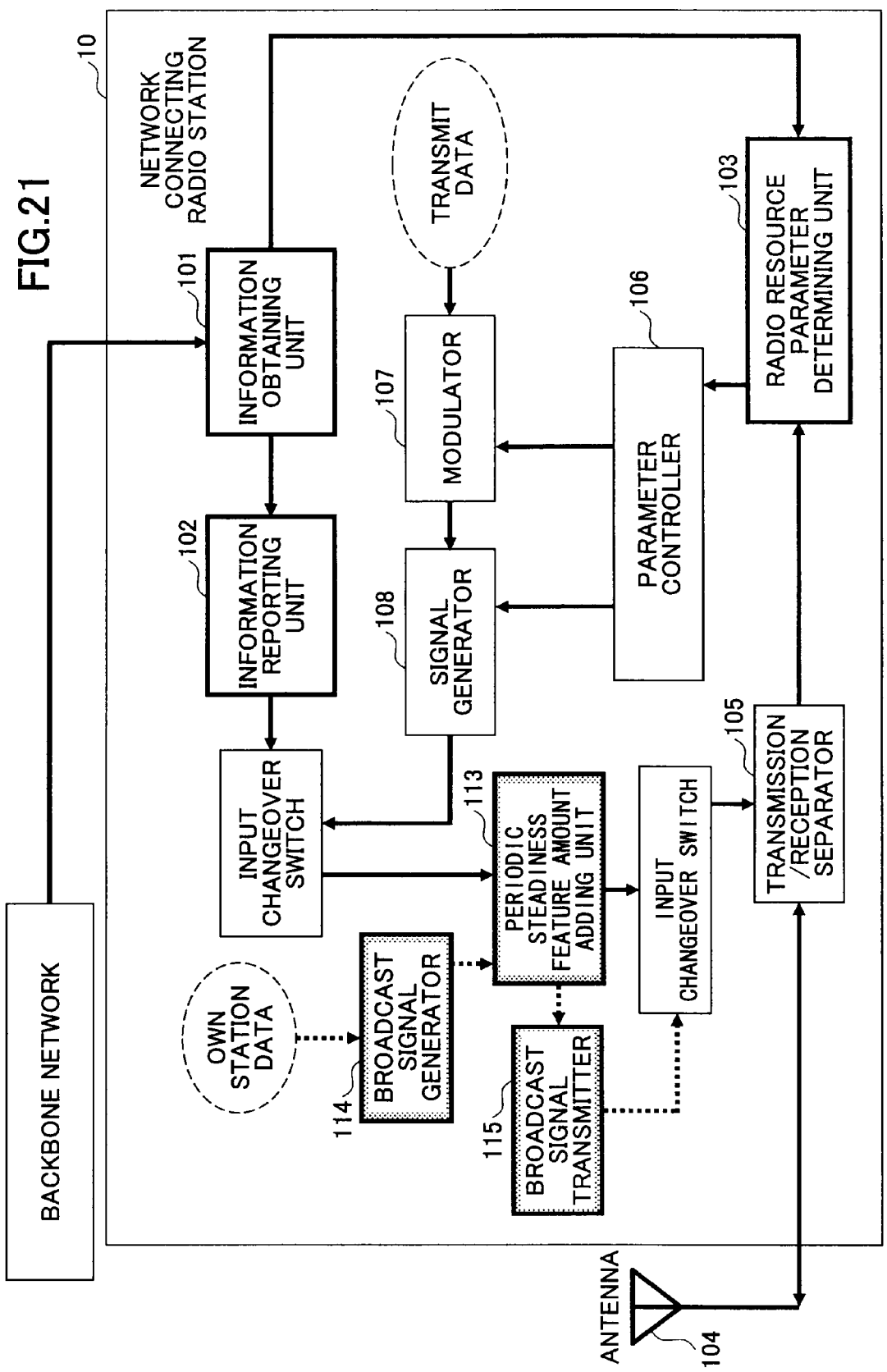
FIG. 21 is a block diagram illustrating the network connecting radio station according to a sixth variation of the first embodiment of the present invention.

FIG. 21 illustrates a network connecting radio station 10 according to a sixth variation. In the sixth variation, the network connecting radio station 10 further includes: a periodic steadiness feature amount adding unit 113 which adds, to a transmit signal, an arbitrary periodic steadiness feature; a broadcast signal generating unit 114 which generates a broadcast signal including periodic steadiness feature information and information on the network connecting radio station 10; and a broadcast signal transmitting unit 115 which transmits the broadcast signal at a predetermined timing.

The broadcast signal generating unit 114 controls a periodic steadiness feature amount adding unit 113 based on own station data and generates a broadcast signal including information on the network connecting radio station 10 and information associating the periodic steadiness feature. Here, as own station data, an ID for recognizing the network connecting radio station 10 itself, information D on a radio resource parameter to be used in communications by the network connecting radio station 10, and radio communications condition information A obtained in the information obtaining unit 101 may be used. The generated broadcast signal is transmitted by a broadcast signal transmitting unit 115 at a predetermined timing. Here, the predetermined timing may be intermittent with a certain time interval, or may be determined using an external factor such as a trigger from outside. Such a broadcast signal is transmitted for the radio stations 30 surrounding the network connecting radio station 10 to calculate the periodic steadiness feature amount as a waveform feature amount of the received signal to make it possible to obtain information on the network connecting radio station 10 and to recognize the presence of the network connecting radio station 10. Moreover, whether transmission can be conducted as well as the radio resource parameter used by other surrounding radio stations 30 for communications is determined based on such information as described above to reduce interference caused with communications between the network connecting radio station 10 and the counterparty radio station 20. Moreover, in the other surrounding radio stations 30, even in an environment such that a received power level of a reporting signal from the network connecting radio station 10 is extremely low and obtaining of information using the reporting signal is insufficient, the waveform feature amount can be calculated for the broadcast signal transmitted by the other surrounding network connecting radio stations to supplement information to be obtained using the reporting signal. Therefore, in a radio communications system with multiple occurrences of a pair of a network connecting radio station 10 and a counterparty radio station 30 that has such a broadcasting signal transmitter 115, in addition to a method of obtaining information using a backbone network, information may be obtained from a broadcast signal having mutually added the feature amount, making it possible to obtain accurate information in a radio station not connected to the backbone network.

Figure 22:
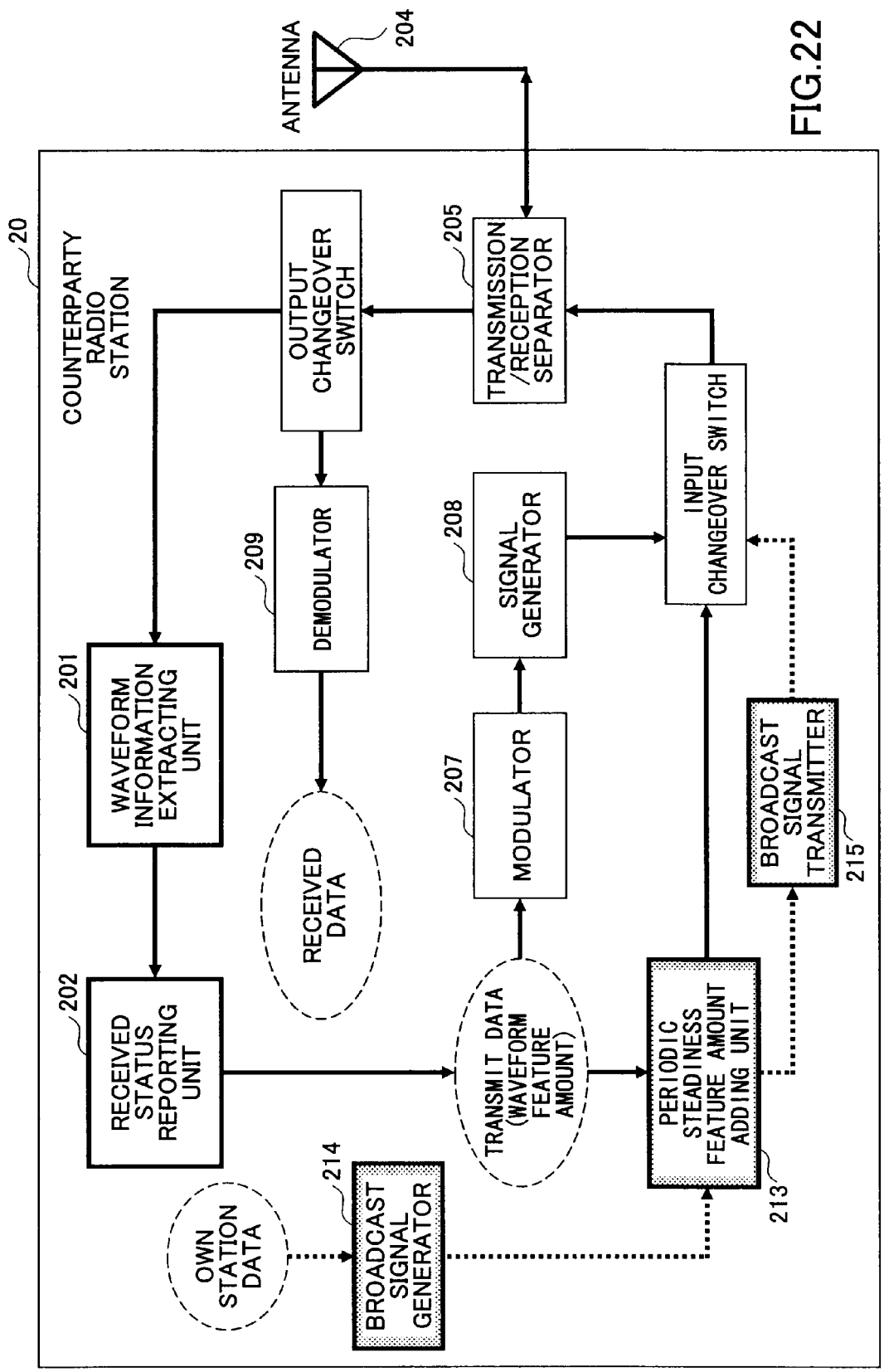
FIG. 22 is a block diagram illustrating the counterparty radio station according to the sixth variation of the first embodiment of the present invention.

As illustrated In FIG. 22, the counterparty radio station 20 may be arranged to include a periodic steadiness feature amount adding unit 213, a broadcast signal generating unit 214, and a broadcast signal transmitting unit 215. Using such an arrangement as described above, the other surrounding radio stations 30 of the counterparty radio station 20 may calculate the waveform feature amount of the received signal to obtain information on the counterparty radio station 20, making it possible to recognize the presence of the counterparty radio station 20. Moreover, in a radio communications system such that a pair of the radio station having a broadcast signal transmitter 115 and the counterparty radio station having a broadcast signal transmitter 215 exist in multiple numbers, even in an environment with a low received SNR between the network connecting radio station 10 and the counterparty radio station 20, communications can be conducted, thereby collating the periodic steadiness feature amount with information, to mutually obtain information accurately.

Embodiment 2

In a radio communications system according to a second embodiment of the present invention, the counterparty radio station to be the communications counterparty of the network connecting radio station, in addition to extracting waveform information on the received signal, demodulates the received signal in order to determine the reliability of the radio communications path.

2.1 Radio Station and Counterparty Radio Station

Figure 23:
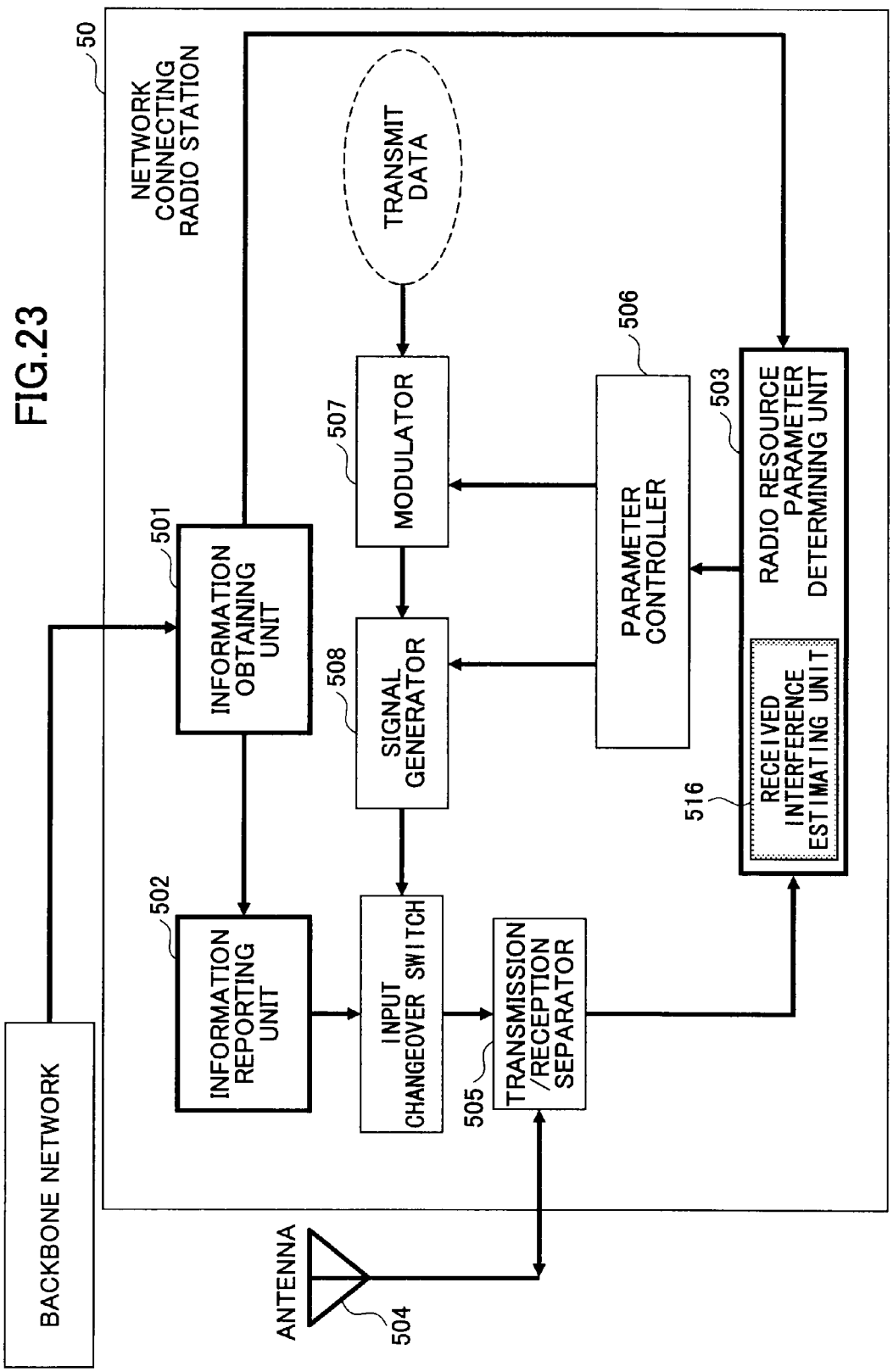
FIG. 23 is a block diagram illustrating the network connecting radio station according to a second embodiment of the present invention.

FIG. 23 illustrates a network connecting radio station 50 in a radio communications system according to the second embodiment. The network connecting radio station 50 includes an information obtaining unit 501; an information reporting unit 502; a radio resource parameter determining unit 503; an antenna 504; a transmission and reception separator 505; a parameter controller 506; a modulator 507; a signal generator 508; and a received interference estimating unit 516. The received interference estimating unit 516 may be provided within a radio resource parameter determining unit 503 as shown, or may be provided at a location different from the radio resource parameter determining unit.

Figure 24:
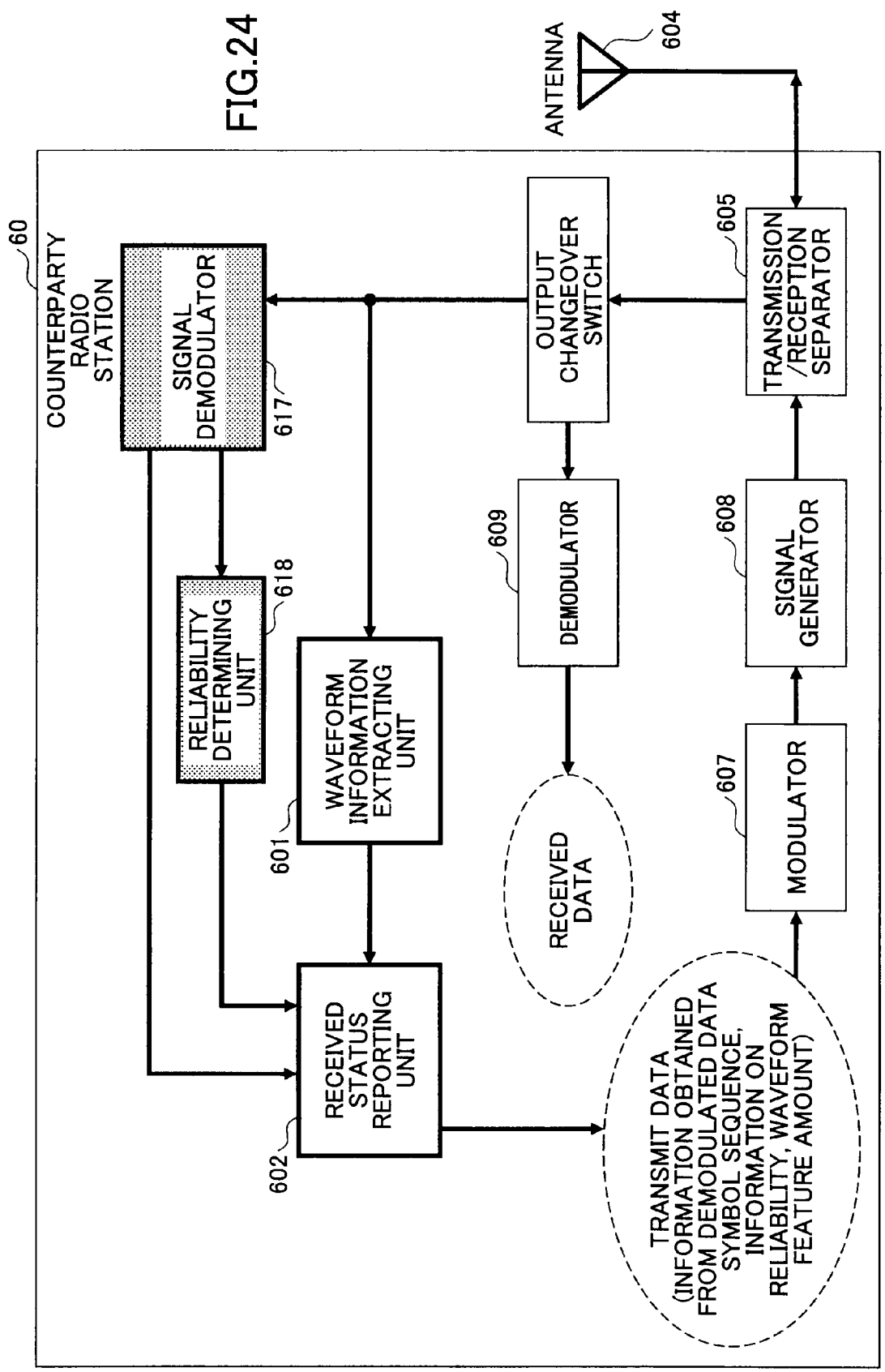
FIG. 24 is a block diagram illustrating the counterparty radio station according to the second embodiment of the present invention.

FIG. 24 illustrates a counterparty radio station 60, which is a communications counterparty of the network connecting radio station 50 shown in FIG. 23. The counterparty radio station 60 includes a waveform information extracting unit 601; a received status reporting unit 602; an antenna 604; a transmission and reception separator 605; a modulator 607; a signal generator 608; a demodulator 609; a signal demodulator 617; and a reliability determining unit 618. Here, the demodulator 609 demodulates a normal data communications signal (e.g., user traffic data, etc.) from the network connecting radio station 50 to be a communications counterparty of the counterparty radio station 60. On the other hand, the signal demodulator 617 demodulates a signal received from the other surrounding radio stations 30 based on information reported from the network connecting radio station 50. As shown, the demodulator 609 and the signal demodulator 617 may be provided separately, or, both of the above-described processes may be performed using a single demodulator when the same hardware can be used.

2.2 Operational Principle

Figure 25:
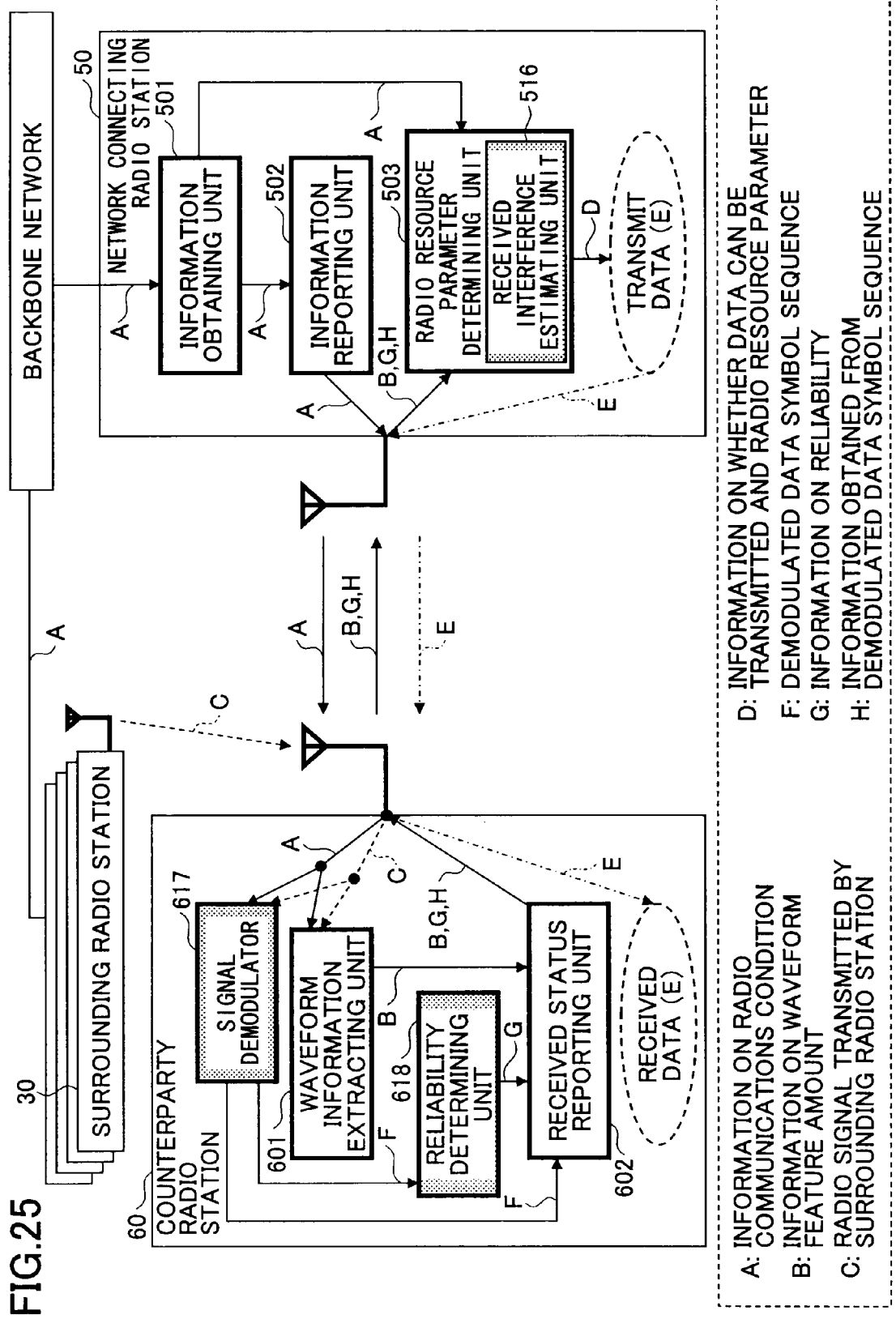
FIG. 25 is a conceptual diagram illustrating the operating principles of the radio communications system according to the second embodiment of the present invention.

FIG. 25 illustrates operating principles of the radio communications system according to the second embodiment of the present invention. Below a function different from the first embodiment that is in the second embodiment is described with reference to FIGS. 23, 24, and 25.

The information obtaining unit 501 of the network connecting radio station 50 shown in FIGS. 23 and 25 obtains radio communications condition information on the other surrounding radio stations 30 via the backbone network. More specifically, as shown in FIG. 25, the network connecting radio station 50 obtains radio communications condition information A from the one or more surrounding radio stations 30 connected to the backbone network. The radio communications condition information A includes at least frequency usage condition information, feature amount information of a signal used by the other surrounding radio stations 30, and information needed to demodulate a signal used by the other surrounding radio stations 30. The radio communications condition information A may also include information on received quality at the other surrounding radio stations 30, information on communications traffic, information on frequency usage condition of a radio station which communicates with other surrounding radio stations 30 but is not connected to the backbone network, and information on the feature amount of the signal used by the radio station. Here, information necessary for demodulating the signal includes an encoding scheme, a frequency bandwidth, a modulation scheme, etc., used in transmission.

The information reporting unit 502 of the network connecting radio station 50 reports a part or all of the radio communications condition information A obtained in the information obtaining unit 501, to the counterparty radio station 60, which is a communications counterparty of the network connecting radio station 50. The reporting may be performed using a frequency bandwidth for radio communications of the network connecting radio station 50 or a predetermined dedicated frequency bandwidth, or may be performed using various methods which are known in the art.

The counterparty radio station 60 obtains information on the feature amount of a signal used by the surrounding radio stations 30 based on the radio communications condition information A reported from the network connecting radio station 50. The counterparty radio station 60 receives a signal C transmitted by the other surrounding radio stations 30, the signal C being input into the waveform information extracting unit 601 via the transmission/reception separator 605. The waveform information extracting unit 601 calculates a waveform feature amount of the signal C based on the feature amount information obtained from the radio communications condition information A. The obtained waveform feature amount information B is input into the received status reporting unit 602 as illustrated in FIG. 25.

On the other hand, the signal demodulator 617 demodulates a signal C received from the other surrounding radio stations 30 and outputs a demodulated data symbol sequence F. Information sets (a modulation scheme, frequency bandwidth, encoding scheme, etc.) which are necessary for demodulating the signal used by the other surrounding radio stations 30 is included in the radio communications condition information A, which is reported from the network connecting radio station 50. The demodulated data symbol sequence F is input into the reliability determining unit 618, where a reliability level of the demodulated result is calculated. For example, the calculated reliability level is determined using the detected result based on an error detection code, such as a decoding error rate of a known symbol included in the received signal. The reliability determining unit 618 outputs, as information G on reliability, information indicating a reliability level of the demodulated result. As shown in FIG. 25, the demodulated data symbol sequence F obtained from the signal demodulator 617 and information G on the reliability obtained from the reliability determining unit 618 are input into the received status reporting unit 602.

The received status reporting unit 602 of the counterparty radio station 60 reports, to the network connecting radio station 50, waveform feature amount information B, information H obtained from the demodulated data symbol sequence, and information G on the reliability. In a manner similar to the information reporting in the information reporting unit 502 of the network connecting radio station 50, the reporting may be performed using a frequency bandwidth for wireless communications by the counterparty radio station 60 or any other method for transmitting and/or receiving a signal for information exchange may be performed.

A further explanation is provided on information F, G and H. Data F obtained as a result of the counterparty radio station 60 receiving a signal from the surrounding radio stations 30, and demodulating the signal at the signal demodulator 617 may include an error. The reliability determining unit 618 determines the reliability G of the information F using the decoded result of a known symbol. For example, if the decoded result of a known symbol is all correct, the reliability G becomes 100%. When the reliability G is larger than the threshold, the counterparty radio station 50, with reference to the information F, retrieves, from the information F, information which is usable for the network connecting radio station 50 to determine the radio resource parameter. The retrieved information may be expressed in various manners, for example, received status of the surrounding radio station 30 (whether it is a good communications condition). Such information as described above is the information H, obtained from the demodulated data symbol sequence. The information H becomes useful information for determining a radio resource parameter that is used when the communications is permitted. The information H may be considered to be not the demodulated result (the information F) itself of the signal demodulator 617, but information obtained as a result of estimating based on various elements such as the received signal strength, the reliability G and the demodulated result (the information F).

The received interference estimating unit 516 in the radio resource parameter determining unit 503 of the network radio station 50 determines, based on the information G on the reliability that is reported from the counterparty radio station 60, whether the determined reliability result is no less than a threshold. When the determined reliability result is no less than the threshold, the radio resource parameter determining unit 503 determines whether communications of the counterparty radio station can be conducted based on radio communications status information A, which is obtained using the information obtaining unit 501 and information H obtained from a demodulated data symbol sequence reported from the counterparty radio station 60. If the counterparty radio station 60 conducts communications, the radio resource parameter determining unit 503 estimates received interference on the other surrounding radio stations 30 and estimates a radio resource parameter (e.g., antenna weight, transmission power, etc.) which may sufficiently reduce the received interference. If a radio resource is not found which is able to satisfy the desired quality of the counterparty radio station 50 while suppressing received interference of the other surrounding radio stations 30, the communications of the counterparty radio station 60 are not permitted.

When it is determined that the reliability level based on the information G on the reliability is higher than the threshold value and the demodulation process was conducted correctly, the radio resource parameter determining unit 503 determines, based on the received interference estimating results, whether data transmission can be conducted and the radio resource parameter. When it is determined that the reliability level is lower than the threshold value and the demodulation process is not carried out correctly, the information H obtained from the demodulated data symbol sequence is discarded, and whether the data transmission can be conducted and the usable radio resource parameter are determined based on the waveform feature amount information B obtained from the waveform feature amount extracting unit 601 of the counterparty radio station 60. The determined result D is reported to the parameter controller 506 and included in the transmit data E. A specific method of determining a radio resource parameter is described below.

The transmit data E of the network connecting radio station 50 is modulated at the modulator 507 and the signal generator 508 that are controlled by the parameter controller 506, and a transmit signal is generated that has a parameter determined by the radio resource parameter determining unit 503. The generated transmit signal is transmitted from the antenna 504 via the transmission and reception separator 505 and delivered to the counterparty radio station 60, which is to be a communications counterparty of the network connecting radio station 50.

2.3 Operational Flow

Figure 26:
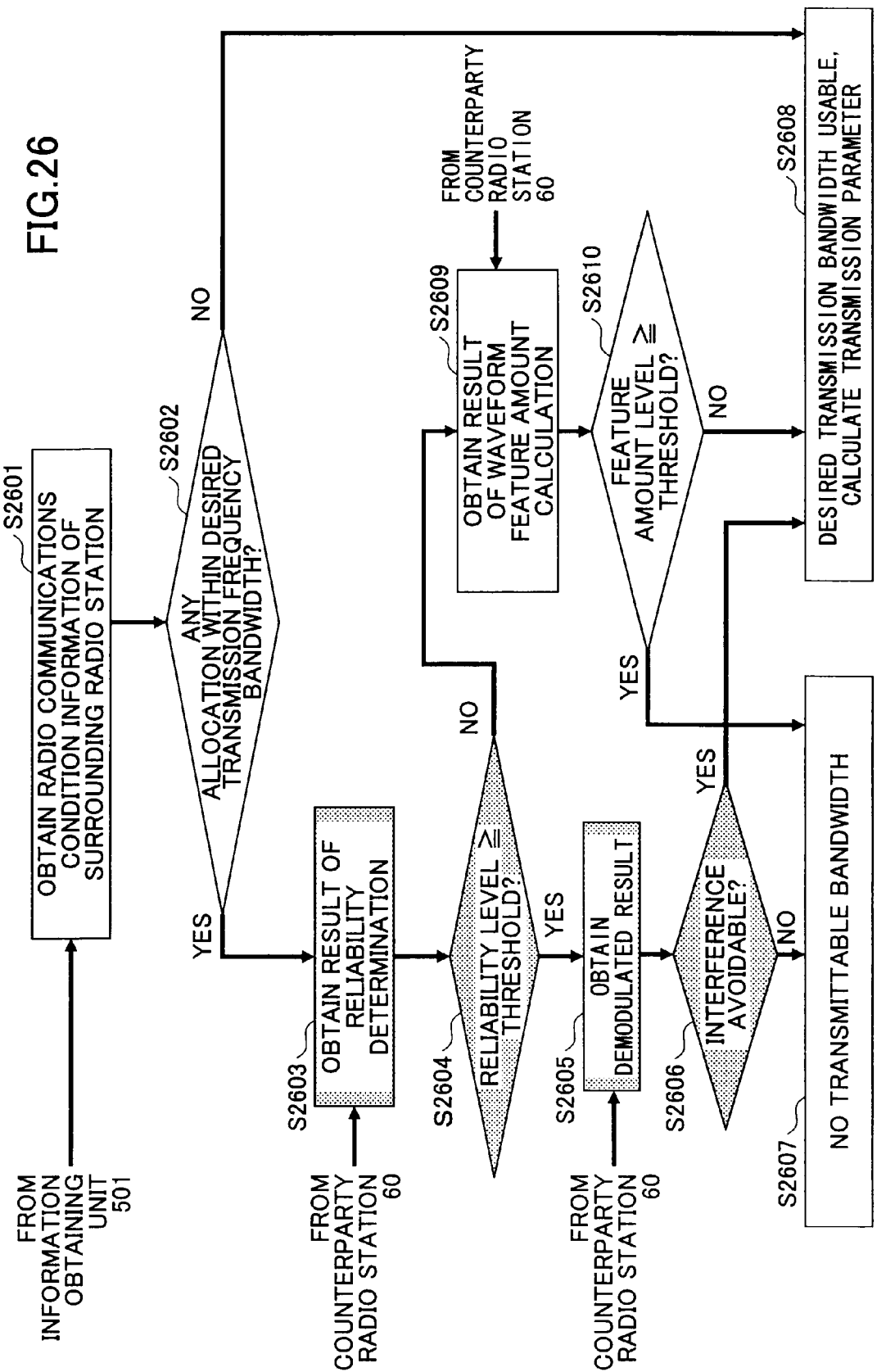
FIG. 26 is a flowchart illustrating the control procedure at the radio resource parameter determining unit in the second embodiment of the present invention.

FIG. 26 illustrates a flowchart of a control procedure in the radio resource parameter determining unit 503 of the network connecting radio station 50 according to the second embodiment.

First, a radio communications condition information A of a surrounding radio station 30 is obtained at the information obtaining unit 501 of the network connecting radio station 50 (S2601).

From the frequency bandwidth usage condition information included in the radio communications condition information A, it is determined whether a bandwidth of the other surrounding radio station 30 is allocated within a desired transmission bandwidth of the network connecting radio station 50 itself (S2602).

If a bandwidth of the other radio station 30 is not allocated within a desired transmission bandwidth, the data transmission is permitted (S2608).

If a bandwidth of the other radio station 30 is allocated within a desired transmission bandwidth, the process flow proceeds to step S2603. In step S2603, the information G on reliability is provided. The signal demodulator 617 of the counterparty radio station 60 in FIG. 24 demodulates the information G, which represents a reliability level determined, using the reliability determining unit 618, on the above-obtained demodulated data symbol sequence F. For convenience of illustration, timing for the information G to be reported from the counterparty radio station 60 to the network connecting radio station 50 is illustrated as if it is a timing of S2603. However, the reporting does not have to be at the timing of S2603. It can be performed previously.

The reliability level is compared with a threshold (S2604).

If the reliability level exceeds the threshold, the information H, obtained from the demodulated data symbol sequence is obtained (S2605). The information H is also reported from the counterparty radio station 60. For convenience of illustration, a timing for the information H to be reported from the counterparty radio station 60 to the network connecting radio station 50 is illustrated as if it is a timing of S2605. However, the reporting does not have to be at the timing of S2605. The reporting may be performed previously.

The received interference estimating unit 516 within the radio resource parameter determining unit 503 determines whether interference caused with other surrounding radio stations 30 is avoided while satisfying a desired quality of the counterparty radio station 60 (S2606).

If the interference is determined to be not avoidable, data transmitting is not permitted (S2607). When the interference is determined to be avoidable, the data transmission is permitted, and a transmission parameter to be used is determined (S2608).

If the reliability level of the demodulated result in S2604 does not exceed the threshold value, the information H obtained from the demodulated data symbol sequence is discarded and waveform feature amount information B which is reported from the counterparty station 60 is obtained in the same manner as the first embodiment (S2609). For convenience of illustration, a timing for the information B to be reported from the counterparty radio station 60 to the network connecting radio station 50 is illustrated as if it is a timing of S2609. However, the reporting does not have to be at the timing of S2609. The reporting may be performed previously.

The obtained feature amount level and the threshold value are compared (S2610).

If the feature amount level exceeds the threshold value, data transmission is not permitted (S2607).

If the feature amount level does not exceed the threshold value, the data transmission is permitted and the transmission parameter to be used is determined (S2608).

The information H is information which is useful, in the network connecting radio station, for determining a radio resource parameter to be used when the communications are permitted. For example, if information that a received status of the surrounding radio stations 30 is good is received as the information H, it can be determined that, even when the network connecting radio station 50 starts communications with the counterparty radio station 60, the surrounding radio stations 30 can continue to communicate. Conversely, if information that the received status of the surrounding radio station 30 is poor is obtained as the information H, it is determined that the network connecting radio station 50 stands by without conducting communications with the counterparty radio station 60. This makes it possible to avoid causing interference with the surrounding radio stations 30.

Moreover, if location information of the surrounding radio station 30 is obtained as the information H, the network connecting radio station 50 can perform transmission beam control. Not directing a beam in a direction of the surrounding radio station 30 while directing a beam in a direction of the counterparty radio station 60, which is a communications counterparty, makes it possible to conduct communications satisfactorily without causing interference with the surrounding radio station 30.

Moreover, what is in the reliability G may be taken into account to perform the above-described control, which uses the information H. For example, such a control as described above, which is in accordance with what the information H indicates, may be performed when the reliability G is high and may also take into account a possibility that an error is included in the information H when the reliability G is low. In the latter, a transmission parameter with a margin may be set such that causing interference with the surrounding radio station 30 is avoided, for example. For example, suppose that the information H indicates that the received status of the surrounding radio station 30 is satisfactory and it has been determined that the network connecting radio station 50 may set a transmission power high in communicating with the counterparty radio station 60, e.g., that it may use a multi-value modulation such as 16QAM, for example. However, a control may be performed such that communications are conducted using a modulation scheme such as QPSK without actually setting the transmission power too high so as to make it possible to avoid interference with a margin, taking into account that the reliability G is low. Such a combination of the information H and the information G makes it possible to properly reduce interference caused with the surrounding radio station 30 even when the information H can contain an error.

In a radio communications system of the second embodiment, information can be obtained based on the waveform feature amount even in a low received SNR environment in a manner similar to the first embodiment, while more information sets may be obtained based on a demodulated result in a high received SNR environment. Here, if the radio station 60 receives a high SNR signal from the surrounding station 30, there is a concern that relatively strong interference is caused with the other surrounding radio stations 30 when the radio station 60 transmits a certain signal. However, using information obtained as a result of the demodulation makes it possible to suppress interference caused with the other surrounding radios 30 sufficiently low by using transmission beam control, accurate transmission power control, etc. Therefore, even when an SNR of a signal received from a surrounding radio station other than a counterparty is high, using information obtained from the demodulated result makes it possible to obtain opportunities for communications, making into possible for the counterparty radio station 60 to achieve higher frequency utilization efficiency.

In the present embodiment, a form without using interference receiving estimation unit 516 may also be adopted. In this case, the information H obtained from the demodulated data symbol sequence is used to obtain detailed information from the waveform feature amount information B, making it possible to accurately aggregate information in information collecting which is done periodically or a certain time period before the present control and to conduct a radio resource control which is more reliable than the first embodiment.

2.4 Variation

In the second embodiment, different variations described in the first, second, third, fourth, fifth, and sixth variations of the first embodiment are possible. The breakdown of the embodiments and the breakdown of the descriptive items are merely provided for convenience of explanation, so that an item for a certain embodiment or breakdown may be applied to a different embodiment or breakdown.

2.4.1 First Variation

For example, in the second embodiment, the radio resource parameter determining unit 503 of the network connecting radio station 50 may further include a table for quality estimation 509.

Figure 27:
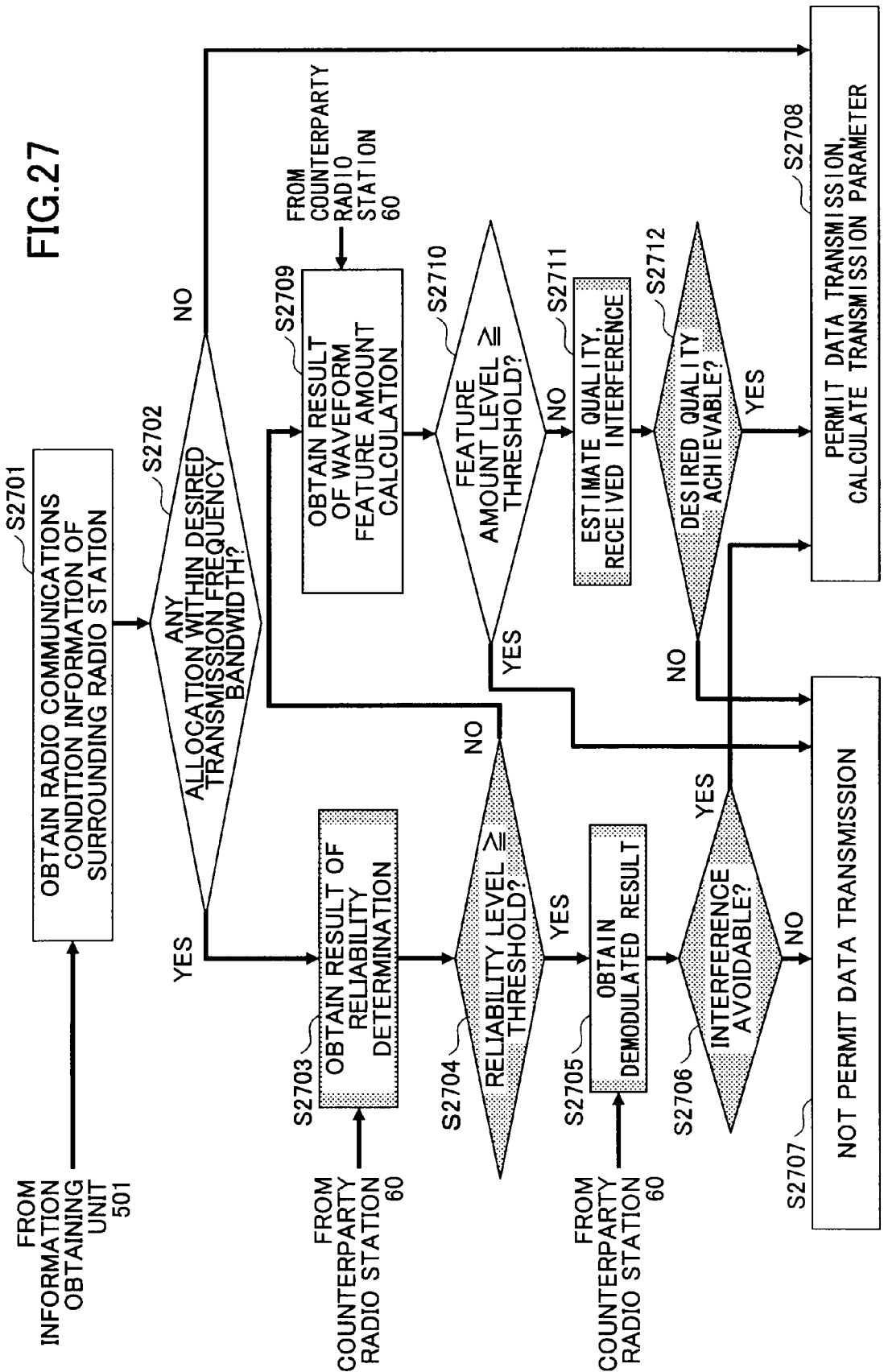
FIG. 27 is a flowchart illustrating the control procedure at the radio resource parameter determining unit according to a first variation of the second embodiment of the present invention.

FIG. 27 illustrates a flowchart of a control procedure performed by the radio resource parameter determining unit 503. In general, it is the same as the flowchart in FIG. 26, but differs in that steps S2711 and S2712 have been added. The operations in steps S2711 and S2712 are the same as what are explained with respect to steps S807 and S808 in FIG. 8. In the present variation, in a manner similar to the first variation of the first embodiment, even when the feature amount level is no less than a certain amount, a parameter such as a transmission power level may be controlled flexibly in accordance with the communications path characteristic between the surrounding radio station 30 and the counterparty radio station 60. This makes it possible for the network connecting radio station 50 and the counterparty radio station 60 to conduct communications within a range of interference power such that it does not impact communications conducted by the surrounding radio station 30. As a result, communications opportunities may be increased, increasing frequency utilization efficiency.

2.4.2 Second Variation

Figure 28:
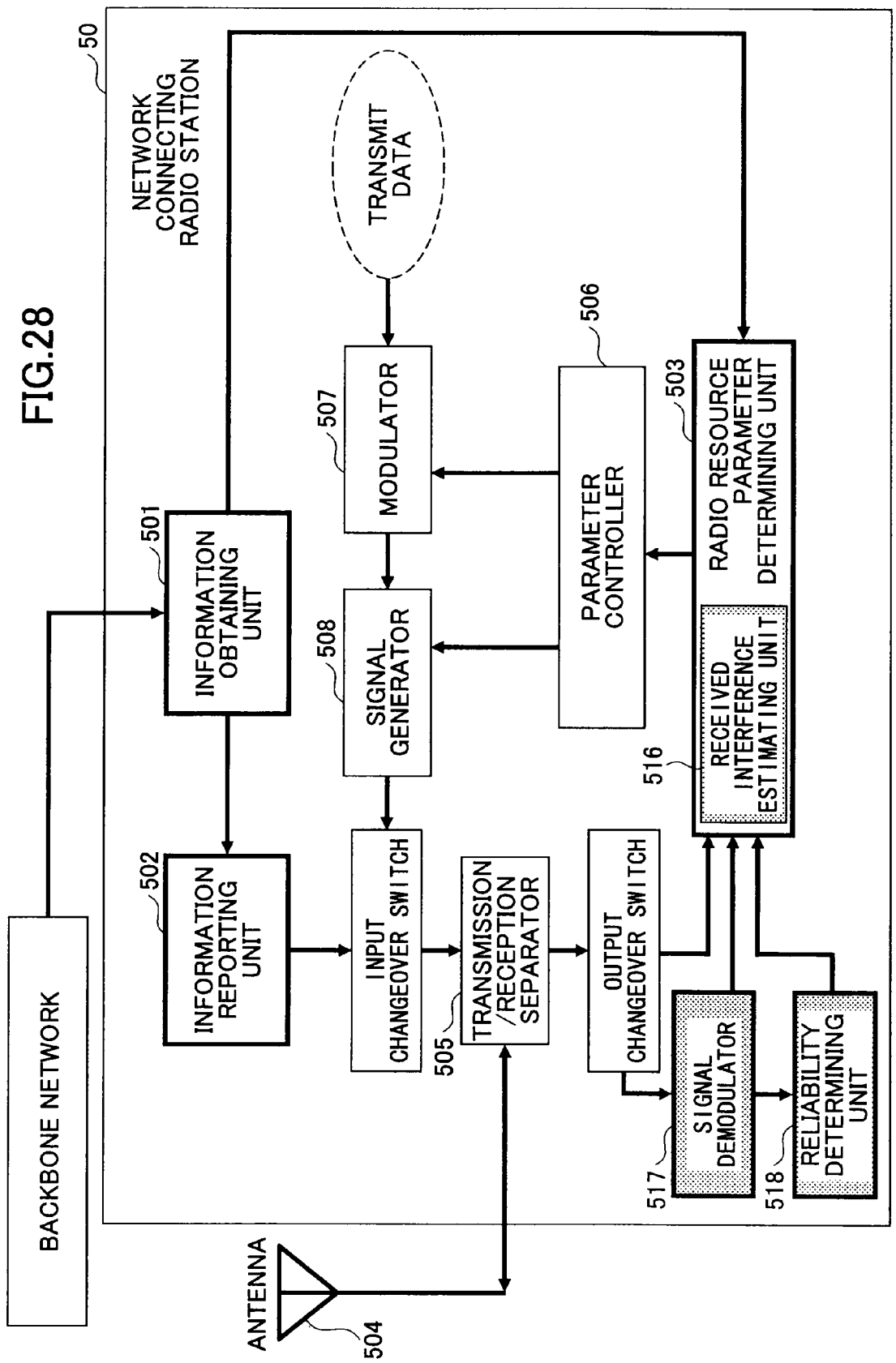
FIG. 28 is a block diagram illustrating the network connecting radio station according to a second variation of the second embodiment of the present invention.

FIG. 28 illustrates a network connecting radio station 50 according to another variation of the second embodiment. The network connecting radio station 50 is the same as the network connecting radio station 50 in FIG. 23, except that it is different in further having a second signal demodulator 517 and a second reliability determining unit 518. The counterparty radio station 60 is provided with the first signal demodulator 517 and the first reliability determining unit 518, as illustrated in FIG. 25. The second signal demodulator 517 in FIG. 28 receives a radio signal transmitted by the surrounding radio station 30, demodulates the received signal, and outputs the demodulated data symbol sequence. The second reliability determining unit 518 determines a reliability level of the demodulated data symbol sequence. In other words, in the present variation, the reliability level is determined at both the counterparty radio station 60 and the network radio station 60.

Figure 29:
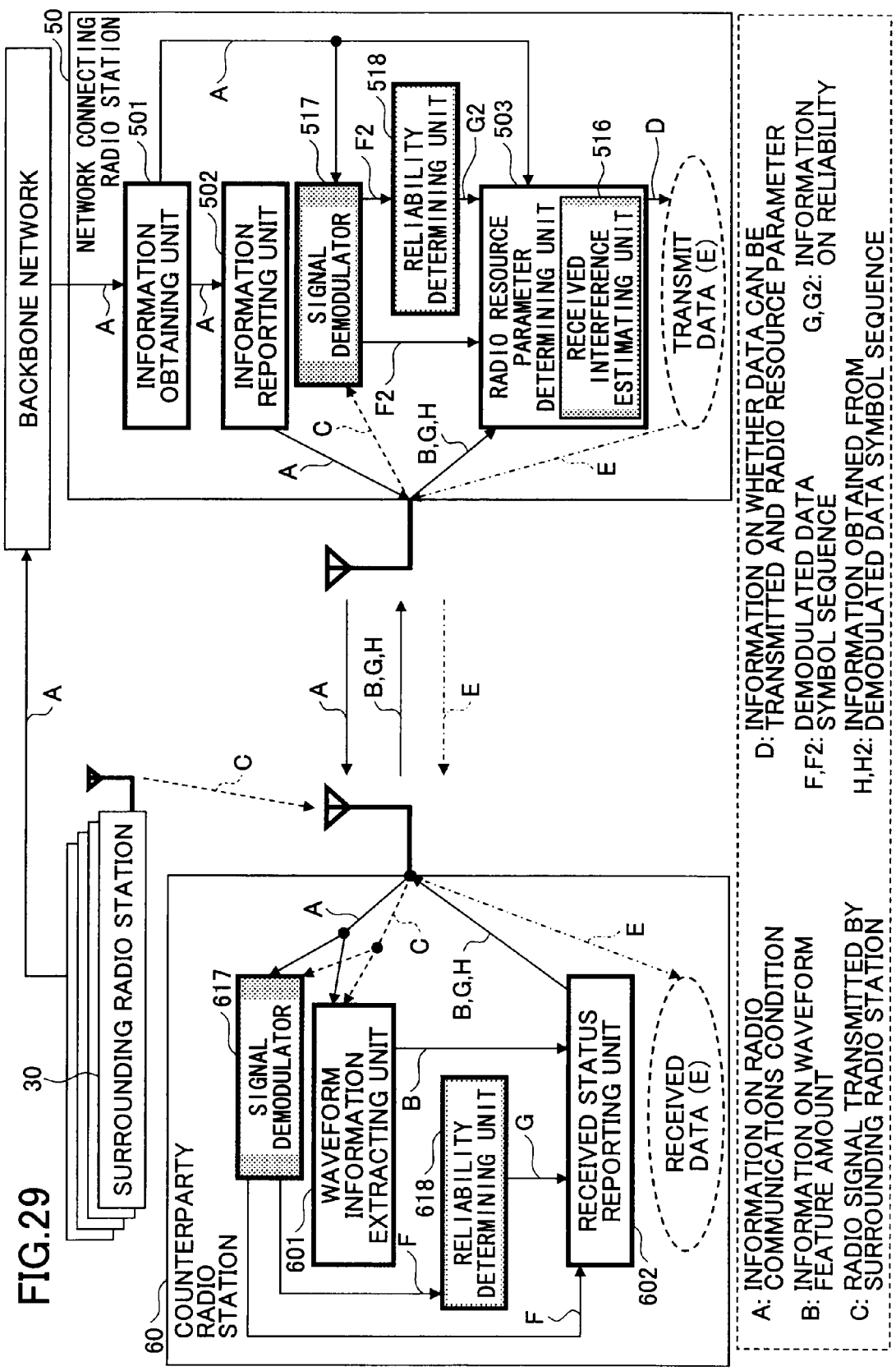
FIG. 29 is a conceptual diagram illustrating the operating principles of the radio communications system according to the second variation of the second embodiment of the present invention.

FIG. 29 illustrates operating principles of the radio communications system according to the present variation.

The control procedure of the radio resource parameter determining unit 503 is generally the same as the control procedure in FIG. 26, but differs at least in the process in S2603. Information obtained as a result of reliability determination in S2603 includes not only information G on the reliability obtained in the (first) reliability determining unit 618 of the counterparty radio station 60, but also information G2 on the reliability obtained in the second reliability determining unit 518 of the network connecting radio station 50. Similarly, in S2605, information obtained as a demodulated result, includes not only information H obtained from the demodulated data symbol sequence F obtained at the (first) signal demodulator 617 of the counterparty radio station 60, but also information H2 obtained from the demodulated data symbol sequence F2 obtained at the second signal demodulator 517 of the network connecting radio station 50. The present variation makes it possible to correctly recognize a radio environment even in an environment such that a signal transmitted from the other surrounding radio station 30 reaches only one of the network connecting radio station 50 and the counterparty radio station 60, making it possible to correctly recognize a wireless environment and more properly avoid interference.

Moreover, the present variation may be combined with the second variation in the first embodiment, so that a signal transmitted by the other surrounding radio station 30 is received and a waveform feature amount is calculated and demodulated for the received signal. The present case makes it possible to correctly recognize a radio environment even in an environment such that a signal transmitted from the other surrounding radio station 30 reaches only one of the network connecting radio station 50 and the counterparty radio station 60, making it possible to more properly avoid interference. Moreover, the present case makes it possible to determine whether to permit data transmission for each communications direction for both data transmission from the network connecting radio station 50 to the counterparty radio station 60 and data transmission from the counterparty radio station 60 to the network connecting radio station 50, thereby increasing communications opportunities and increasing frequency utilization efficiency.

Embodiment 3

3.1 Radio Station and Counterparty Radio Station

In the third embodiment of the present invention, a signal transmitted by the other surrounding station 30 is demodulated and the reliability level is determined. On this point, the determining of the reliability level differs from examples in FIGS. 28 and 29 that are performed in both the counterparty radio station 60 and the network radio station 50.

Figure 30:
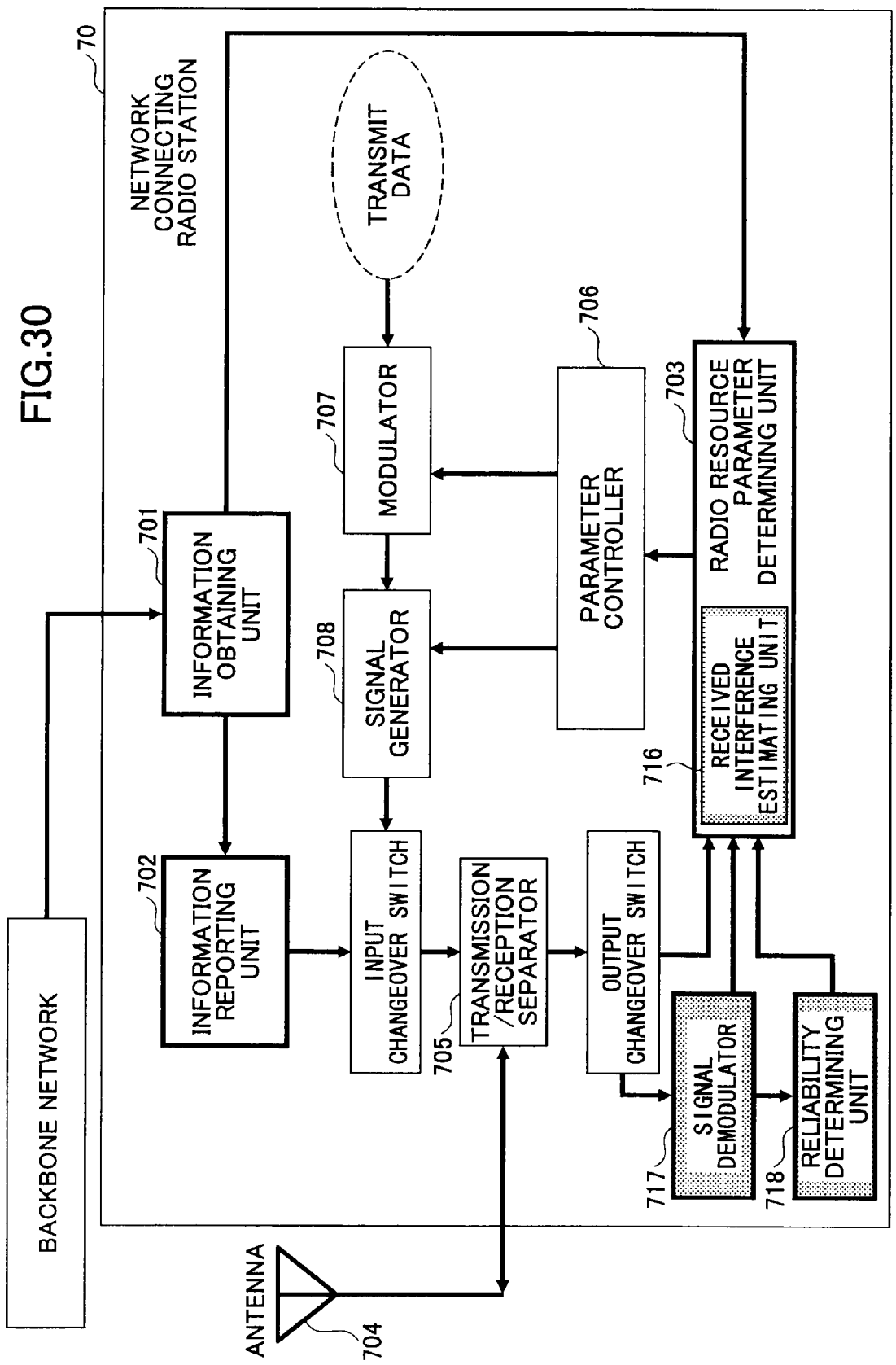
FIG. 30 is a block diagram illustrating the network connecting radio station according to a third embodiment of the present invention.

FIG. 30 illustrates a network connecting radio station 70 in a radio communications system according to the third embodiment. The network connecting radio station 70 includes an information obtaining unit 701; an information reporting unit 702; a radio resource parameter determining unit 703; an antenna 704; a transmission and reception separator 705; a parameter controller 706; a modulator 707; a signal generator 708; a received interference estimating unit 716; a signal demodulator 717; and a reliability determining unit 718. The received interference estimating unit 716 may be provided within the radio resource parameter determining unit 703 as shown, or it may be provided at another location.

Figure 31:
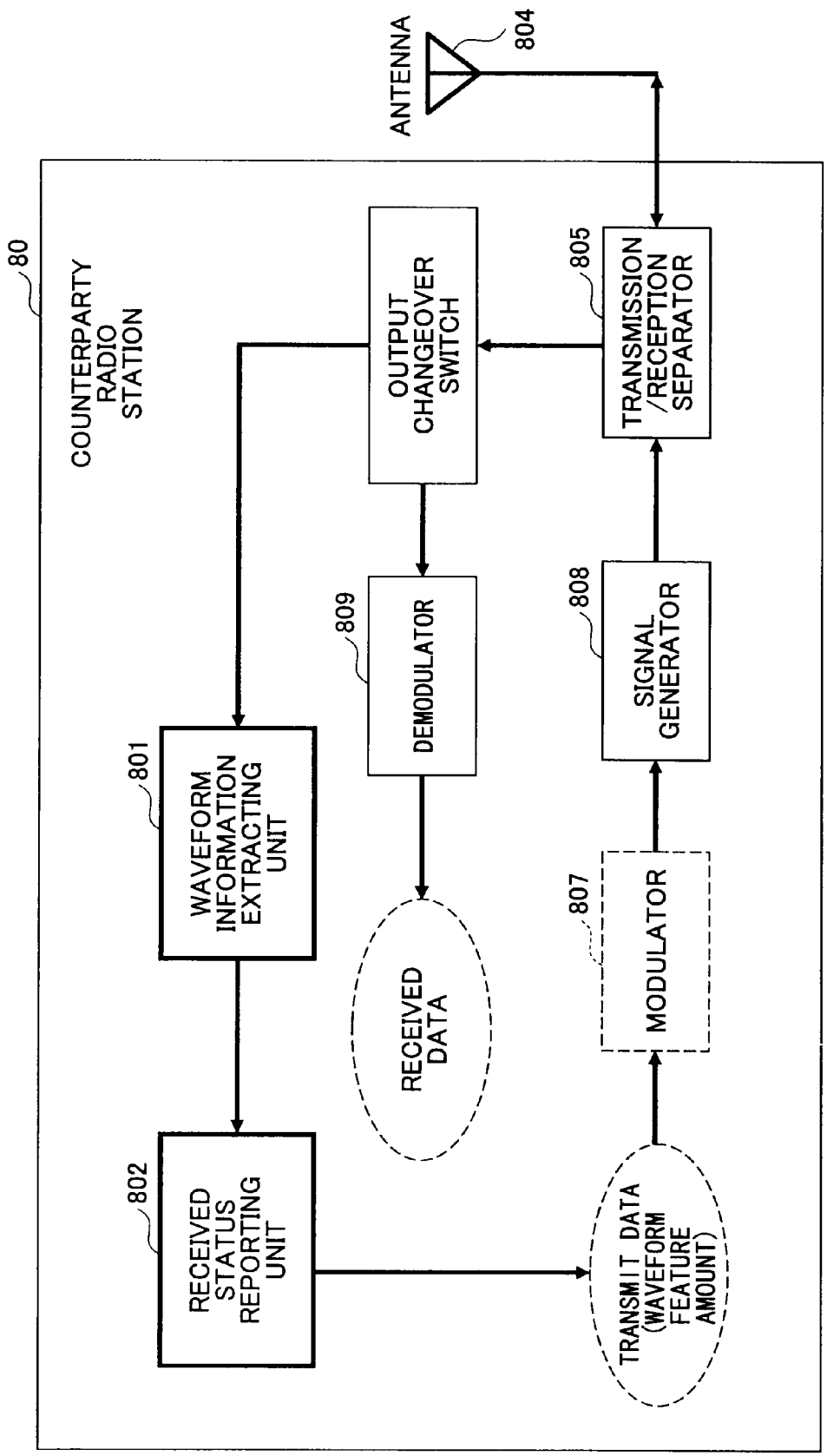
FIG. 31 is a block diagram illustrating the counterparty radio station according to the third embodiment of the present invention.

FIG. 31 illustrates a counterparty radio station 80, which is a communications counterparty of the network connecting radio station 70 shown in FIG. 30. The counterparty radio station 80 includes a wave form information extracting unit 801; a received status reporting unit 802; an antenna 804; a transmission and reception separator 805; a modulator 807; a signal generator 808; and a demodulator 809.

3.2 Operational Principle

FIG. 32 illustrates operating principles of the radio communications system according to the third embodiment Below, functions in the third embodiment that are different from those in the first and second embodiments are mainly described using FIGS. 30, 31, and 32.

The information obtaining unit 701 of the network connecting radio station 70 obtains radio communications condition information on the other surrounding radio stations 30 through the backbone network. More specifically, as shown in FIG. 32, radio communications condition information A is obtained from one or more radio surrounding stations 30 and connected to the backbone network. The radio communications condition information A includes at least frequency usage condition information, feature amount information of a signal used by other surrounding radio stations 30, and information needed to demodulate signals used by the other surrounding radio stations 30. The radio communications condition information A may also include information on received quality at the other surrounding radio stations 30, information on communications traffic, information on frequency usage condition of a radio station which communicates with the other surrounding radio stations 30 but is not connected to the backbone network, information on feature amount of a signal used by the radio station, etc. Information necessary for demodulating the signal includes an encoding scheme, a frequency bandwidth, a modulation scheme, etc., used in transmission.

The information reporting unit 702 of the network connecting radio station 70 reports a part or all of the radio communications condition information A obtained in the information obtaining unit 701, to the counterparty radio station 80, which is a communications counterparty of the network connecting radio station 70. The reporting may be performed using a frequency bandwidth for radio communications by the network connecting radio station 70 or a predetermined dedicated frequency bandwidth, or by any appropriate method for transmitting and receiving a signal for information exchange.

The counterparty radio station 80 obtains information on the feature amount of a signal used by the surrounding radio stations 30 based on the radio communications condition information A reported from the network connecting radio station 70. The counterparty radio station 80 receives a signal C transmitted by the other surrounding radio stations 30, the signal C being input into the waveform information extracting unit 801 via the transmission and reception separator 805. The waveform information extracting unit 801 calculates a waveform feature amount of the signal C based on the feature amount information obtained from the radio communications condition information A. The obtained waveform feature amount information B is input into the received status reporting unit 802 as illustrated in FIG. 32.

The received status reporting unit 802 of the counterparty radio station 80 reports the waveform feature amount information B to the network connecting radio station 70. In a manner similar to the information reporting method in the information reporting unit 702 of the network connecting radio station 70, the reporting may be carried out using a frequency bandwidth for radio communications by the counterparty radio station 80 or a predetermined dedicated frequency bandwidth, or any appropriate method for transmitting and/or receiving a signal for information exchange.

On the other hand, the signal demodulator 717 of the network connecting radio station 70 receives and demodulates signals C transmitted by the other surrounding radio stations 30. Information necessary to demodulate signals used by other surrounding radio stations 30 is included in the radio communications condition information A obtained by the information obtaining unit 701. The demodulated data symbol sequence F, which is obtained as a result of the demodulation process is input into the reliability determining unit 718. The reliability determining unit 718 calculates the reliability level of the demodulated result. For example, the reliability level is determined using the detected result based on an error detection code, such as a decoding error rate of a known symbol included in the received signal. As shown in FIG. 32, the demodulated data symbol sequence F obtained from the signal demodulator 717 and information G on the reliability obtained from the reliability determining unit 718 are input into the radio resource parameter determining unit 703.

A received interference estimating unit 716 in a radio resource parameter determining unit 703 of the network radio station determines whether the determined reliability result is no less than a threshold value based on the information G on the reliability that is obtained from the reliability determining unit 718. The received interference estimating unit 716 estimates interference which may be caused with the other surrounding radio stations 30, based on the radio communications condition information A, which is obtained from the information obtaining unit 701, and information included in the demodulated data symbol sequence F obtained from the signal demodulator 717. Moreover, the radio resource parameter determining unit 703 determines whether it is possible to conduct communications which maintain a required quality of the counterparty radio station while sufficiently reducing interference caused with the other surrounding radio stations 30, and, if possible, determines a radio resource parameter to be used, e.g., an antenna weight, a transmission power, etc.

The radio resource parameter determining unit 703 compares the reliability level and the threshold value based on the information G on the reliability. if it is determined that the reliability level is higher than the threshold value and the demodulation process at the signal demodulator 717 is correctly performed, whether data transmission can be conducted as well as the radio resource parameter are determined based on the received interference estimating result. When it is determined that the reliability level is lower than the threshold value and the demodulation process is not carried out correctly, information obtained from the demodulated data symbol sequence F is discarded, and whether the data transmission can be conducted and the radio resource parameter to be used are determined based on the waveform feature amount information B, which is obtained from the waveform feature amount extracting unit 801 of the counterparty radio station 80. The determined result D is reported to the parameter controller 706. A specific method of determining a radio resource parameter is described below.

The transmit data of the network connecting radio station 70 is modulated at the modulator 707 and the signal generator 708 that are controlled by the parameter controller 706, and a transmit signal is generated that has a parameter determined by the radio resource parameter determining unit 703. The generated transmit signal is transmitted from the antenna 704 via the transmission and reception separator 705 and delivered to a counterparty radio station 80, which is to be a communications counterparty of the network connecting radio station 70.

3.3 Operational Flow

FIG. 33 illustrates a flowchart of a control procedure carried out by the radio resource parameter determining unit 703 of the network connecting radio station 70 according to the third embodiment.

First, a radio communications condition information A of a surrounding radio station is obtained at the information obtaining unit 701 of the network connecting radio station 70 (S3301).

From the frequency bandwidth usage condition information included in the radio communications condition information A, it is determined whether a bandwidth of the other surrounding radio station 30 is allocated within a desired transmission bandwidth of the network connecting radio station 70 itself (S3302).

If a bandwidth of the other radio station 30 is not allocated within a desired transmission bandwidth, the data transmission is permitted (S3308).

If a bandwidth of the other radio station 30 is allocated within a desired transmission bandwidth, the process flow proceeds to step S3303. In step S3303, the information G on reliability is provided. The signal demodulator 717 in FIG. 30 demodulates the information G. which represents a reliability level determined, using the reliability determining unit 718, on the thus-obtained demodulated data symbol sequence F.

The reliability level is compared with a threshold (S3304).

If the reliability level exceeds the threshold, information obtained from the demodulated data symbol sequence F is obtained (S3305).

The received interference estimating unit 716 within the radio resource parameter determining unit 703 determines whether interference caused with other surrounding radio stations is avoided while satisfying a desired quality of the counterparty radio station 80 (S3306).

If the avoidance of the interference is determined to be not possible, data transmission is not permitted (S3307). If it is determined that the interference is avoidable, the data transmission is permitted, and a transmission parameter to be used is determined (S3308).

If the reliability level of the demodulated result in S3304 does not exceed the threshold value, the information obtained from the demodulated data symbol sequence F is discarded and waveform feature amount information B is obtained from the counterparty station 80 in a manner similar to first and second embodiments (S2609). The waveform feature amount information B is what is obtained as a result of calculating the waveform feature amount of the received signal in the waveform information extracting unit 801 of the counterparty radio station 80.

The feature amount level indicated using the obtained waveform feature amount information B is compared with the threshold value (S3310).

If the feature amount level exceeds the threshold value, data transmission is not permitted (S3307).

If the feature amount level does not exceed the threshold value, the data transmission is permitted and the transmission parameter to be used is determined (S3308).

For the reliability determined result, demodulated result, and the waveform feature amount calculated result, a form of successively obtaining from each unit as in the flow of FIG. 33 may be taken, or a form of storing, in a memory separately provided within the present network connecting radio station 70, all information before the process illustrated in FIG. 33, determines the information to be used in accordance with the flow, and retrieves, from memory, such determined information to use the same.

In a radio communications system of the third embodiment, information can be obtained based on the waveform feature amount from the counterparty radio station, even in a low received SNR environment in a manner similar to the first embodiment, while more information sets may be obtained based on a demodulated result in a network connecting radio station in a high received SNR environment. Here, receiving a large SNR signal may cause relatively large interference on a signal-originating radio station. However, using information obtained as a result of the demodulation makes it possible to suppress interference caused with the other surrounding radio stations sufficiently low by using transmission beam control, accurate transmission power control, etc. Therefore, even a high SNR of a signal received from a surrounding radio station other than a counterparty makes it possible to obtain communications opportunities, making it possible to achieve high frequency utilization efficiency. Therefore, compared to the first embodiment, the third embodiment is especially effective in an environment such that a high power signal is received in the network connecting radio station.

Even in the third embodiment, in a manner similar to the first and the second embodiments, different variations described in the first, second, third, fourth, fifth, and sixth variations of the first embodiment are possible.

As described above, while the present invention is described with reference to specific embodiments, the respective embodiments are merely exemplary, so that a skilled person will understand variations, modifications, alternatives, and replacements. While specific numerical value examples are used to facilitate understanding of the present invention, such numerical values are merely examples, so that any appropriate value may be used unless specified otherwise. While specific exemplary mathematical expressions are used to facilitate understanding of the present invention, such mathematical expressions are merely examples, so that any appropriate mathematical expression may be used unless specified otherwise. A breakdown of embodiments or items is not essential to the present invention, so that matters described in two or more embodiments or items may be used in combination as needed, or matters described in an embodiment or item may be applied to matters described in a different embodiment or item as long as they are not contradictory. For convenience of explanation, while the apparatuses according to the embodiments of the present invention are explained using functional block diagrams, such apparatuses as described above may be implemented in hardware, software, or a combination thereof. Software may be provided in a random access memory (RAM), a flash memory, a read-only memory (ROM), an EPROM, an EEPROM, a register, a hard disk (HDD), a removable disk, a CD-ROM, and any other appropriate storage medium. The present invention is not limited to the above embodiments, so that variations, modifications, alternatives, and replacements are included in the present invention without departing from the spirit of the present invention.

The present application is based on Japanese Priority Patent Application No. 2009-080178 filed Mar. 27, 2009, with the Japanese Patent Office, the entire contents of which are hereby incorporated herein by reference.

What is claimed is:

1. A radio communications system including a network connecting radio station and a counterparty radio station, the network connecting radio station being a radio station connected to a network and the counterparty radio station being in radio communications with the network connecting radio station, wherein
the network connecting radio station includes
an information obtaining unit which obtains information indicating a radio communications condition of one or more radio stations surrounding the network connecting radio station from the one or more surrounding radio stations via the network, the information indicating the radio communications condition of the radio station including information on a frequency used by the radio station and information on a waveform feature amount which exhibits a statistical characteristic of a signal waveform transmitted by the radio station;
an information reporting unit which reports, to the counterparty radio station, all or some of information indicating a radio communications condition obtained from the surrounding radio station; and
a radio resource parameter determining unit which determines, based on the information indicating the radio communications condition of the surrounding radio station and information on a measured value of the waveform feature amount that is reported from the counterparty radio station, whether communications can be conducted between the network connecting radio station and the counterparty radio station, and a radio resource parameter to be used when the communications are permitted, wherein the counterparty radio station includes
a waveform information extracting unit which calculates, for each of one or more waveform feature amounts reported from the network connecting radio station, the measured value of the waveform feature amount of a signal received from another of the radio stations; and
a received status reporting unit which reports, to the network connecting radio station, a measured value of the waveform feature amount calculated at the waveform information extracting unit.

2. The radio communications system as claimed in claim 1, wherein
the communications of the counterparty radio station are not permitted when the radio resource parameter determining unit determines that a frequency bandwidth desired for communicating with the counterparty radio stations is being used by the other surrounding radio station and the measured value of the waveform feature amount exceeds a threshold.

3. The radio communications system as claimed in claim 1, wherein the radio resource parameter determining unit includes
a table for quality estimation that has collated a size of a peak of a waveform feature amount and a signal quality of a communications path between the radio station and the network connecting radio station,
estimates a signal quality of a communications path between the other surrounding radio station and the network connecting radio station based on the size of the peak of the waveform information amount obtained in the waveform information extracting unit, and, based on the estimating, determines whether the communications can be conducted between the network connecting radio station and the counterparty radio station and the radio resource parameter to be used when the communications are permitted.

4. The radio communications system as claimed in claim 1, wherein the network connecting radio station and the counterparty radio station further include
a band pass filter which passes a certain bandwidth component and blocks the other bandwidth components, and wherein
a signal received from the other surrounding radio station is input to the band-pass filter, and the bandwidth-limited signal is input into the waveform information extracting unit.

5. The radio communications system as claimed in claim 4, wherein a pass bandwidth of the band-pass filter includes all or some of a frequency bandwidth desired for communicating with the counterparty radio station.

6. The radio communications system as claimed in claim 4, wherein a pass bandwidth of the band-pass filter matches a frequency bandwidth desired for communicating with the counterparty radio station.

7. The radio communications system as claimed in claim 1, wherein
the network includes an information management server which manages information indicating a radio communications condition of a radio station connected to the network and a counterparty radio station of the radio station; and wherein
the network connecting radio station further includes an information uploading unit which sends, to the information management server, information indicating a radio communications condition between the network connecting radio station and the counterparty radio station.

8. The radio communications system as claimed in claim 7, wherein the information obtaining unit obtains, from the information management server, information on the radio communications condition in the other surrounding radio station.

9. The radio communications system as claimed in claim 1, wherein the network connecting radio station has a signal transmitting and receiving unit which transmits and receives a signal for information exchange using a predetermined frequency bandwidth, and
wherein the information reporting unit reports information through the signal transmitter and receiver.

10. The radio communications system as claimed in claim 1, wherein the counterparty radio station has a signal transmitting and receiving unit which transmits and receives a signal for information exchange using a predetermined frequency bandwidth, and wherein
the received status reporting unit reports information through the signal transmitter and receiver.

11. The radio communications system as claimed in claim 1, wherein the network connecting radio station further includes a periodic steadiness feature amount adding unit which adjusts a transmit signal such that the transmit signal exhibits a waveform feature amount of a predetermined periodic steadiness.

12. The radio communications system as claimed in claim 11, wherein a signal including information reported by the information reporting unit is adjusted using the periodic steadiness feature amount adding unit such that a signal which includes information reported by the information reporting unit exhibits a waveform feature amount of a predetermined periodic steadiness.

13. The radio communications system as claimed in claim 11, wherein the network connecting radio station generates a broadcast signal including a waveform feature amount of a periodic steadiness when a broadcast signal to be broadcast to one or more counterparty radio stations is generated.

14. The radio communications system as claimed in claim 1, wherein the counterparty radio station further includes a periodic steadiness feature amount adding unit which adjusts a transmit signal such that the transmit signal exhibits a waveform feature amount of a predetermined periodic steadiness.

15. The radio communications system as claimed in claim 14, wherein a signal including information reported by the received status reporting unit is adjusted using the periodic steadiness feature amount adding unit such that it exhibits a waveform feature amount of a predetermined periodic steadiness.

16. The radio communications system as claimed in claim 14, wherein the counterparty radio station generates a broadcast signal including information on a waveform feature amount of a predetermined periodic steadiness when a broadcast signal to be broadcast to one or more radio stations is generated.

17. A radio communications system including a network connecting radio station and a counterparty radio station, the network connecting radio station being a radio station connected to a network and the counterparty radio station being in radio communications with the network connecting radio station, wherein
  the network connecting radio station includes
    an information obtaining unit which obtains information indicating a radio communications condition of one or more radio stations surrounding the network connecting radio station from the one or more surrounding radio stations via the network, the information indicating the radio communications condition of the radio station including information on a frequency used by the radio station and information on a waveform feature amount which exhibits a statistical characteristic of a signal waveform transmitted by the radio station;
    an information reporting unit which reports, to the counterparty radio station, all or some of information indicating a radio communications condition obtained from the surrounding radio station; and
    a radio resource parameter determining unit which determines, based on the information indicating the radio communications condition of the surrounding radio station, information on a measured value of the waveform feature amount that is reported from the counterparty radio station, and information on reliability, whether communications can be conducted between the network connecting radio station and the counterparty radio station, and a radio resource parameter to be used when the communications are permitted, wherein the counterparty radio station includes
    a waveform information extracting unit which calculates, for each of one or more waveform feature amounts reported from the network connecting radio station, the measured value of the waveform feature amount of a signal received from another of the radio stations;
    a reliability determining unit which demodulates a signal received from the surrounding radio station and determines the reliability of the demodulating; and
    a received status reporting unit which reports, to the network connecting radio station, information on the measured value of the waveform feature amount calculated at the waveform information extracting unit and information indicating the reliability determined at the reliability determining unit.

18. The radio communications system as claimed in claim 17, the system further comprising
  a second reliability determining unit which demodulates a signal received from the surrounding radio station and determines the reliability of the demodulating, wherein
  the radio resource parameter determining unit determines, based on the information indicating a radio communications condition of the surrounding radio station, information on a measured value of a waveform feature amount that is reported from the counterparty radio station, information on a reliability that is reported from the counterparty radio station and information on a reliability that is determined at the network connecting radio station, whether communications can be conducted between the network connecting radio station and the counterparty radio station and a radio resource parameter to be used when the communications are permitted.

19. The radio communications system as claimed in claim 17, wherein the radio resource parameter determining unit
  determines whether communications can be conducted between the network connecting radio station and the counterparty radio station and a radio resource parameter to be used when the communications are permitted, based on a measured value of the waveform feature amount that is calculated at the waveform information extracting unit and the information indicating the radio communications condition, regardless of the demodulating, when the reliability of the demodulating is no less than the threshold value.

20. The radio communications system as claimed in claim 17, wherein the radio resource parameter determining unit further includes
  a received interference estimating unit which estimates an amount of interference caused with the surrounding other radio station based on the information on the reliability of the demodulating, and wherein the radio resource parameter determining unit determines, based on the estimating of an amount of interference caused with the surrounding other radio station,
  when the reliability of the demodulating is no less than a threshold value, whether the communications between the network connecting radio station and the counterparty radio station can be conducted and a radio resource parameter to be used when the communications are permitted.

21. A radio communications system including a network connecting radio station and a counterparty radio station, the network connecting radio station being a radio station connected to a network and the counterparty radio station being in radio communications with the network connecting radio station, wherein
  the network connecting radio station includes
    an information obtaining unit which obtains, from one or more surrounding radio stations via the network, information indicating a radio communications condition of one of the radio stations surrounding the network connecting radio station, the information indicating a radio communications condition of the radio station including information on a frequency used by the radio station and information on a waveform feature amount which exhibits a statistical characteristic of a signal waveform transmitted by the radio station;
    an information reporting unit which reports, to the counterparty radio station, all or some of information indicating the radio communications condition obtained from the surrounding radio station, and a reliability determining unit which demodulates the signal received from the surrounding radio station and determines the reliability of the demodulated result;

a radio resource parameter determining unit which determines, based on the information indicating the radio communications condition of the surrounding radio station, information on a measured value of the waveform feature amount that is reported from the counterparty radio station, and information on reliability, a radio resource parameter to be used when communications are permitted, and whether the communications can be conducted between the network connecting radio station and the counterparty radio station, wherein the counterparty radio station includes a waveform information extracting unit which calculates, for each of one or more waveform feature amounts reported from the network connecting radio station, the measured value of the waveform feature amount of a signal received from another of the radio stations; and a received status reporting unit which reports, to the network connecting radio station, information indicating a measured value of a waveform feature amount that is calculated at the waveform information extracting unit, and information on a reliability determined at the reliability determining unit.

22. The radio communications system as claimed in any one of claims 1, 17, 18, or 21, the network connecting radio station further including a second waveform extracting unit which receives a radio signal from the surrounding radio station and calculates a measured value of a waveform feature amount of a signal received from the other radio station for each of one or more waveform feature amounts indicated in feature value information obtained at the information obtaining unit, wherein the radio resource parameter determining unit determines, based on the information indicating a radio communications condition of the surrounding radio station, information on a measured value of a waveform feature amount that is reported from the counterparty radio station, information on a reliability that is reported from the counterparty radio station and information on a reliability that is determined at the network connecting radio station, whether communications can be conducted between the network connecting radio station and the counterparty radio station and a radio resource parameter to be used when the communications are permitted.

23. A method of radio communications in a network connecting radio station and a counterparty radio station, the network connecting radio station being a radio station connected to a network and the counterparty radio station being in radio communications with the network connecting radio station, wherein a procedure to be performed at the network connecting radio station includes an information obtaining step of obtaining, from one or more surrounding radio stations via the network, information indicating a radio communications condition of the radio station surrounding the network connecting radio station, the information indicating the radio communications condition of the radio station including information on a frequency used by the radio station and information on a waveform feature amount which exhibits a statistical characteristic of a signal waveform transmitted by the radio station;

an information reporting step of reporting, to the counterparty radio station, all or some of information indicating the radio communications condition obtained from the surrounding radio station, and a radio resource parameter determining step of determining whether communications can be conducted between the network connecting radio station and the counterparty radio station and a radio resource parameter to be used when the communications are permitted, based on the information indicating the radio communications condition of the surrounding radio station and information on a measured value of the waveform feature amount that is reported from the counterparty radio station, wherein the procedure performed at the counterparty radio station includes a waveform information extracting step of calculating, for each of one or more of the waveform feature amounts reported from the network connecting radio station, the measured value of the waveform feature amount of a signal received from another of the radio stations; and a received status reporting step of reporting, to the network connecting radio station, a measured value of the waveform feature amount calculated in the waveform information extracting step.

24. The radio communications method as claimed in claim 23, wherein in the radio resource parameter determining step, the communications of the counterparty radio station are not permitted when it is determined that a frequency bandwidth desired for communicating with the counterparty radio station is used by the other surrounding radio station and the measured value of the waveform feature amount exceeds a threshold.

25. The radio communications method as claimed in claim 23, wherein the radio resource parameter determining step uses a table for quality estimation that has collated a size of a peak of a waveform feature amount and a signal quality of a communications path between the radio station and the network connecting radio station, estimates a signal quality of a communications path between the other surrounding radio station and the network connecting radio station based on the size of the peak of the waveform feature amount obtained in the waveform information extracting step, and based on the estimation, determines whether the communications can be conducted between the network connecting radio station and the counterparty radio station and a radio resource parameter to be used when the communications are permitted.

26. The radio communications method as claimed in claim 23, wherein a procedure to be performed at the network connecting radio station and the counterparty radio station further includes a step of passing a certain bandwidth portion of an input signal, and inputting, into a band-pass filter which blocks the other bandwidth components, a signal received from the other surrounding radio station, wherein the bandwidth-limited signal is used in the waveform information extracting step.

27. The radio communications method as claimed in claim 26, wherein a pass bandwidth of the band-pass filter includes all or some of a frequency bandwidth desired for communicating with the counterparty radio station.

28. The radio communications method as claimed in claim 26, wherein a pass bandwidth of the band-pass filter matches a frequency bandwidth desired for communicating with the counterparty radio station.

29. The radio communications method as claimed in claim 23, further comprising:
an information management server which manages information indicating a radio communications condition of the radio station connected to the network and the counterparty radio station of the radio station; and
wherein a procedure to be performed at the network connecting radio station further includes an information uploading step of sending, to the information management server, information indicating a radio communications condition between the network connecting radio station and the counterparty radio station.

30. The radio communications method as claimed in claim 29, wherein the information obtaining step obtains, from the information management server, information on the radio communications condition in the other surrounding radio station.

31. The radio communications method as claimed in claim 23, wherein the procedure to be performed at the network connecting radio station transmits and receives a signal for information exchange using a predetermined frequency bandwidth, wherein
the information reporting step reports information through the signal transmitting and receiving step.

32. The radio communications method as claimed in claim 23, wherein the procedure to be performed at the counterparty radio station includes a signal transmitting and receiving step of transmitting and receiving a signal for information exchange using a predetermined frequency bandwidth, wherein
the received status reporting step reports information through the signal transmitting and receiving step.

33. The radio communications method as claimed in claim 23, wherein the procedure to be performed at the network connecting radio station further includes a periodic steadiness feature amount adding step of adjusting a transmit signal such that the transmit signal exhibits a waveform feature amount of a predetermined periodic steadiness.

34. The radio communications method as claimed in claim 33, wherein a signal including information reported by the information reporting step is adjusted using the periodic steadiness feature amount adding step such that it exhibits a predetermined periodic steadiness waveform feature amount.

35. The radio communications method as claimed in claim 33, wherein
a procedure to be performed at the network connecting radio station includes
a step of generating a broadcast signal including information on a waveform feature amount of a periodic steadiness when generating the broadcast signal which is broadcast to one or more of the counterparty radio stations.

36. The radio communications method as claimed in claim 23, wherein the procedure performed at the counterparty radio station further includes
a periodic steadiness feature amount adding step of adjusting a transmit signal such that it exhibits a waveform feature amount of a predetermined periodic steadiness.

37. The radio communications method as claimed in claim 36, wherein a signal including information reported by the received status reporting step is adjusted using the periodic steadiness feature amount adding step such that it exhibits a waveform feature amount of a predetermined periodic steadiness.

38. The radio communications method as claimed in claim 36, wherein the procedure performed at the counterparty radio station further includes a step of generating a broadcast signal including information on a waveform feature amount of a periodic steadiness when generating the broadcast signal which is broadcast to the one or more radio stations.

39. A method of radio communications in a network connecting radio station and a counterparty radio station, the network connecting radio station being a radio station connected to a network and the counterparty radio station being in radio communications with the network connecting radio station, wherein
a procedure to be performed at the network connecting radio station includes
an information obtaining step of obtaining, from one or more surrounding radio stations via the network, information indicating a radio communications condition of the radio station surrounding the network connecting radio station, the information indicating the radio communications condition of the radio station including information on a frequency used by the radio station and information on a waveform feature amount which exhibits a statistical characteristic of a signal waveform transmitted by the radio station;
an information reporting step of reporting, to the counterparty radio station, all or some of information indicating the radio communications condition obtained from the surrounding radio station, and
a radio resource parameter determining step of determining whether communications can be conducted between the network connecting radio station and the counterparty radio station and a radio resource parameter to be used when the communications are permitted, based on the information indicating the radio communications condition of the surrounding radio station, information on a measured value of the waveform feature amount that is reported from the counterparty radio station, and information on reliability, wherein
the procedure performed at the counterparty radio station includes
a waveform information extracting step of calculating, for each of one or more waveform feature amounts reported from the network connecting radio station, the measured value of the waveform feature amount of a signal received from another of the radio stations;
a reliability determining step of demodulating the signal received from the surrounding radio station and determining the reliability of the demodulated result and
a received status reporting step of reporting, to the network connecting radio station, information indicating a measured value of the waveform feature amount that is calculated in the waveform information extracting step and information indicating the reliability determined in the reliability determining step.

40. The method of radio communications as claimed in claim 39, wherein a procedure to be performed at the network connecting radio station includes
a second reliability determining step of demodulating a signal received from the surrounding radio station and determining the reliability of the demodulation, wherein
the radio resource parameter determining step determines whether communications can be conducted between the network connecting radio station and the counterparty radio station and a radio resource parameter to be used when the communications are permitted, based on the information indicating the radio communications condition of the surrounding radio station, information on the measured value of the waveform feature amount that is reported from the counterparty radio station, information on the reliability that is reported from the counterparty radio station and information on the reliability that is determined at the network connecting radio station.

41. The radio communications method as claimed in claim 39, wherein the radio resource parameter determining step determines a radio resource parameter to be used when the communications are permitted and whether communications can be conducted between the network connecting radio station and the counterparty radio station based on the information indicating the radio communications condition and a measured value of the waveform feature amount that is calculated at the waveform information extracting unit, regardless of the demodulated result, when the reliability of the demodulated result is no less than the threshold value.

42. The radio communications method as claimed in claim 39, wherein the radio resource parameter determining step estimates an amount of interference caused with the surrounding other radio station based on the information on the reliability of the demodulated result; and when the reliability of the demodulated result is no less than a threshold value, whether the communications between the network connecting radio station and the counterparty radio station can be conducted and a radio resource parameter to be used when the communications are permitted, based on the estimated result of an amount of interference caused on the surrounding other radio station.

43. A method of radio communications, the radio communications including a network connecting radio station and a counterparty radio station, the network connecting radio station being a radio station connected to a network and the counterparty radio station being in radio communications with the network connecting radio station, wherein a procedure to be performed at the network connecting radio station includes an information obtaining step of obtaining, from one or more surrounding radio stations via the network, information indicating a radio communications condition of the radio station surrounding the network connecting radio station, the information indicating a radio communications condition of the radio station including information on a frequency used by the radio station and information on a waveform feature amount which exhibits a statistical characteristic of a signal waveform transmitted by the radio station;

an information reporting step of reporting, to the counterparty radio station, all or some of information indicating the radio communications condition obtained from the surrounding radio station, and a reliability determining step of demodulating the signal received from the surrounding radio station and determining the reliability of the demodulation;

a radio resource parameter determining step of determining whether communications can be conducted between the network connecting radio station and the counterparty radio station and a radio resource parameter to be used when the communications are permitted, based on the information indicating the radio communications condition of the surrounding radio station, information on a measured value of the waveform feature amount that is reported from the counterparty radio station, and information on reliability, wherein the procedure performed at the counterparty radio station includes a waveform information extracting step of calculating, for each of the one or more waveform feature amounts reported from the network connecting radio station, the measured value of the waveform feature amount of a signal received from another of the radio stations; and a received status reporting step of reporting, to the network connecting radio station, information indicating a measured value of the waveform feature amount that is calculated in the waveform information extracting step and information indicating the reliability determined in the reliability determining step.

44. The method of radio communications as claimed in any one of claims 23, 39, 40, or 43, wherein a procedure to be performed at the network connecting radio station includes a second waveform extracting step of receiving a radio signal from the surrounding radio station and calculating a measured value of a waveform feature amount of a signal received from the other radio station for each of one or more waveform feature amounts indicated in feature amount information obtained in the information obtaining step, wherein the radio resource parameter determining step determines whether communications can be conducted between the network connecting radio station and the counterparty radio station and a radio resource parameter to be used when the communications are permitted, based on the information indicating the radio communications condition of the surrounding radio station, information on the measured value of the waveform feature amount that is reported from the counterparty radio station, and information on the measured value of the feature amount that is calculated at the network connecting radio station.

* * * * *